US012042012B2

(12) United States Patent
Braithwaite et al.

(10) Patent No.: US 12,042,012 B2
(45) Date of Patent: *Jul. 23, 2024

(54) MULTI-LAYER EXTRUDED UPPERS FOR ARTICLES OF FOOTWEAR AND OTHER FOOT-RECEIVING DEVICES

(71) Applicant: NIKE, Inc., Beaverton, OR (US)

(72) Inventors: Nathan L. Braithwaite, Cornelius, OR (US); Can Eldem, Portland, OR (US); Matthew R. Pauk, Portland, OR (US); Todd Anthony Waatti, Battleground, WA (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/091,614

(22) Filed: Dec. 30, 2022

(65) Prior Publication Data

US 2023/0145291 A1 May 11, 2023

Related U.S. Application Data

(63) Continuation of application No. 16/380,236, filed on Apr. 10, 2019, now Pat. No. 11,564,449.
(Continued)

(51) Int. Cl.
*A43B 23/02* (2006.01)
*A43B 7/12* (2006.01)
(Continued)

(52) U.S. Cl.
CPC .............. *A43B 23/024* (2013.01); *A43B 7/12* (2013.01); *A43B 23/0205* (2013.01);
(Continued)

(58) Field of Classification Search
CPC ..... A43B 23/024; A43B 7/12; A43B 23/0205; A43B 23/0235; A43B 23/0245;
(Continued)

(56) References Cited

U.S. PATENT DOCUMENTS 6,910,288 B2  6/2005  Dua
8,028,440 B2  10/2011  Sokolowski et al.
(Continued)

FOREIGN PATENT DOCUMENTS

CN  201341485 Y  11/2009
CN  102548442 A  7/2012
(Continued)

OTHER PUBLICATIONS

Jun. 26, 2019—(WO) ISR & WO—App. No. PCT/US19/026732.
(Continued)

*Primary Examiner* — Jennifer A Steele
(74) *Attorney, Agent, or Firm* — Banner & Witcoff, Ltd.

(57) ABSTRACT

Upper components for footwear include: (a) a first upper component that includes a first layer having a first material as a first filament including first plural, non-intersecting, spaced apart path segments (wherein the first filament has a width dimension of less than 3 mm wide (and in some examples, less than 2 mm wide, less than 1.5 mm wide, less than 1 mm wide, or even less than 0.75 mm wide)); and (b) a second upper component including a fabric element formed at least in part of a fusible material, wherein the fusible material of the second upper component is fused to the first material of the first upper component (e.g., in an adhesive-free manner). Additional layers of material, including additional layers including filament and/or fabric elements, e.g., of the types described above, may be included in the upper.

20 Claims, 40 Drawing Sheets

Related U.S. Application Data

(60) Provisional application No. 62/655,539, filed on Apr. 10, 2018, provisional application No. 62/655,519, filed on Apr. 10, 2018.

(51) Int. Cl.
| | | |
|---|---|---|
| *B29D 35/12* | (2010.01) | |
| *B29L 31/50* | (2006.01) | |
| *B32B 5/12* | (2006.01) | |
| *B32B 5/26* | (2006.01) | |
| *B33Y 80/00* | (2015.01) | |

(52) U.S. Cl.
CPC ...... *A43B 23/0235* (2013.01); *A43B 23/0245* (2013.01); *A43B 23/0255* (2013.01); *B29D 35/126* (2013.01); *B32B 5/26* (2013.01); *B33Y 80/00* (2014.12); *B29L 2031/505* (2013.01); *B32B 5/12* (2013.01); *B32B 2307/40* (2013.01); *B32B 2307/73* (2013.01); *B32B 2437/00* (2013.01); *B32B 2437/02* (2013.01)

(58) Field of Classification Search
CPC ... A43B 23/0255; B32B 5/12; B32B 2307/40; B32B 2307/73; B32B 2437/00; B32B 2437/02; B32B 5/26; B29D 35/126; B29L 2031/505; B33Y 80/00; B29C 64/00
See application file for complete search history.

(56) References Cited

U.S. PATENT DOCUMENTS

| | | | |
|---|---|---|---|
| 9,132,606 B2 | 9/2015 | Beraud et al. | |
| 9,635,905 B2 | 5/2017 | Dekovic | |
| 2004/0118018 A1 | 6/2004 | Dua | |
| 2007/0180730 A1* | 8/2007 | Greene | B29D 35/146 36/3 R |
| 2007/0271823 A1 | 11/2007 | Meschter | |
| 2008/0229612 A1 | 9/2008 | Sommer et al. | |
| 2009/0126225 A1 | 5/2009 | Jarvis | |
| 2010/0018075 A1 | 1/2010 | Meschter et al. | |
| 2010/0037483 A1* | 2/2010 | Meschter | A43B 3/26 36/47 |
| 2010/0043253 A1 | 2/2010 | Dojan et al. | |
| 2014/0020192 A1* | 1/2014 | Jones | B33Y 10/00 12/146 B |
| 2014/0356585 A1 | 12/2014 | Duoss et al. | |
| 2014/0377488 A1 | 12/2014 | Jamison | |
| 2015/0040428 A1* | 2/2015 | Davis | A43B 13/12 12/146 B |
| 2015/0099025 A1 | 4/2015 | Spalt | |
| 2015/0102526 A1 | 4/2015 | Ward et al. | |
| 2015/0108677 A1 | 4/2015 | Mark et al. | |
| 2015/0216253 A1 | 8/2015 | Podhajny | |
| 2015/0272274 A1 | 10/2015 | Berns et al. | |
| 2015/0321418 A1 | 11/2015 | Sterman et al. | |
| 2015/0321434 A1 | 11/2015 | Sterman et al. | |
| 2016/0066651 A1 | 3/2016 | Terai et al. | |
| 2016/0192741 A1* | 7/2016 | Mark | B33Y 10/00 36/43 |
| 2017/0129172 A1 | 5/2017 | Waatti et al. | |
| 2017/0202309 A1* | 7/2017 | Sterman | A43B 23/0235 |
| 2018/0020763 A1 | 1/2018 | Hipp et al. | |
| 2018/0177260 A1 | 6/2018 | Bell et al. | |
| 2019/0307206 A1 | 10/2019 | Braithwaite et al. | |

FOREIGN PATENT DOCUMENTS

| | | | | |
|---|---|---|---|---|
| CN | 103781377 A | | 5/2014 | |
| CN | 104106883 A | | 10/2014 | |
| CN | 104812555 A | | 7/2015 | |
| CN | 105361343 A | | 3/2016 | |
| CN | 105996284 A | | 10/2016 | |
| CN | 107105822 A | * | 8/2017 | ......... A43B 23/0215 |
| CN | 107105822 A | | 8/2017 | |
| CN | 107249374 A | | 10/2017 | |
| CN | 107438510 A | | 12/2017 | |
| CN | 107455840 A | | 12/2017 | |
| CN | 207152045 U | | 3/2018 | |
| CN | 108699738 A | | 10/2018 | |
| EP | 3075277 A2 | | 10/2016 | |
| EP | 3075277 A2 | * | 10/2016 | ............... A43B 1/04 |
| TW | 201609009 A | | 3/2016 | |
| TW | 201804924 A | | 2/2018 | |
| TW | 201808139 A | | 3/2018 | |
| WO | 2016170030 A1 | | 10/2016 | |
| WO | 2017075587 A1 | | 5/2017 | |

OTHER PUBLICATIONS

Jul. 8, 2019—(WO) ISR & WO—App. No. PCT/US19/026745.
Mar. 9, 2023 (EP) Communication pursuant to Article 94(3) EPC, App 19719121.6, 5 pages.
Dec. 12, 2022 (EP) Communication pursuant to Article 94(3) EPC—App 19719118.2, 6 pages.

* cited by examiner

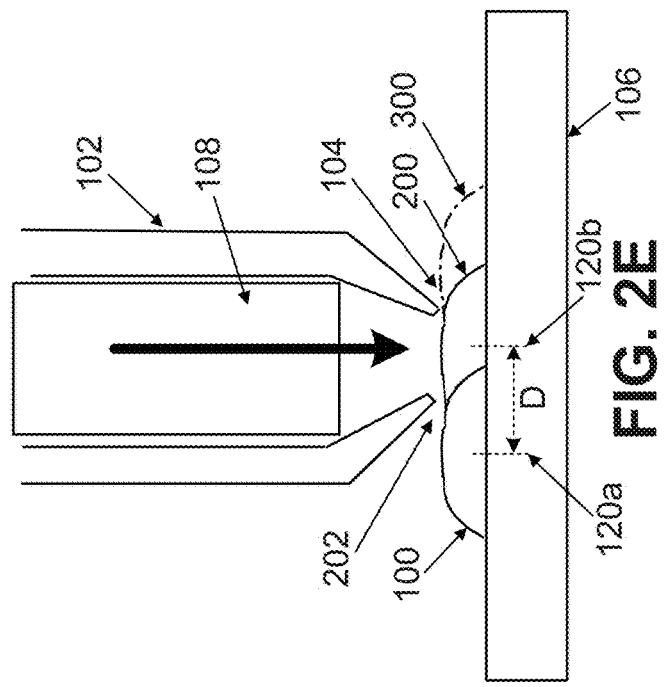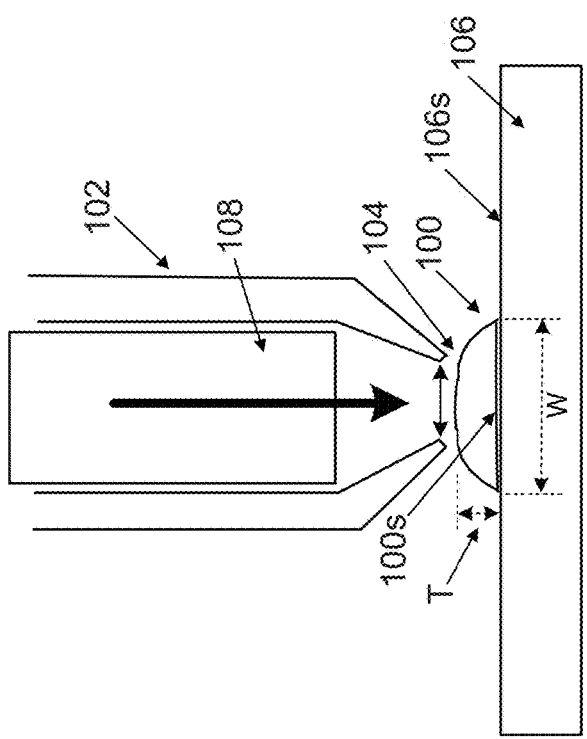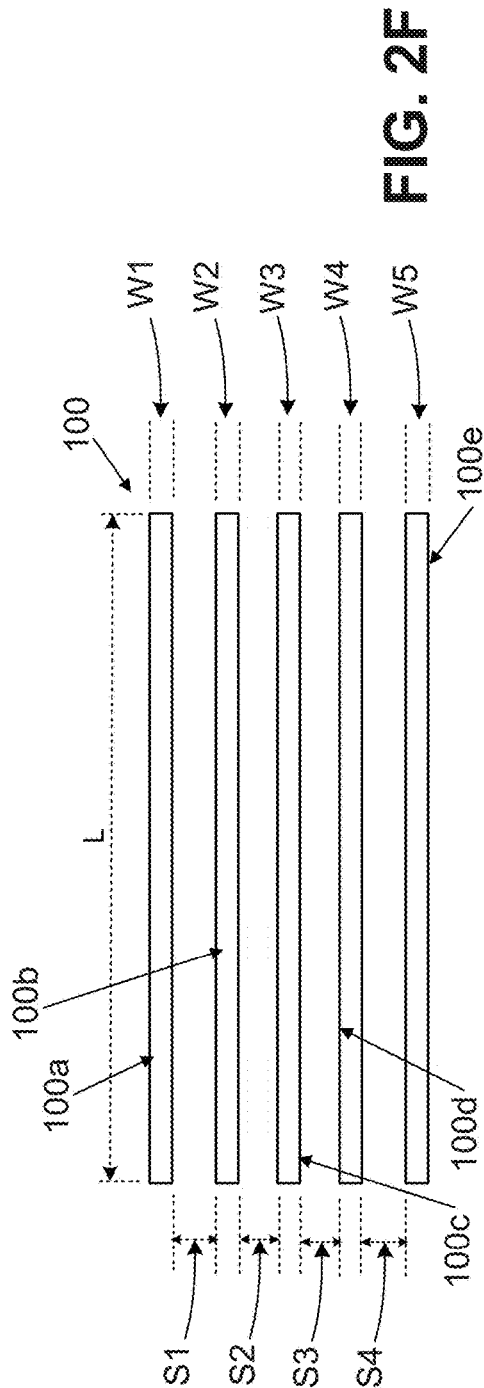

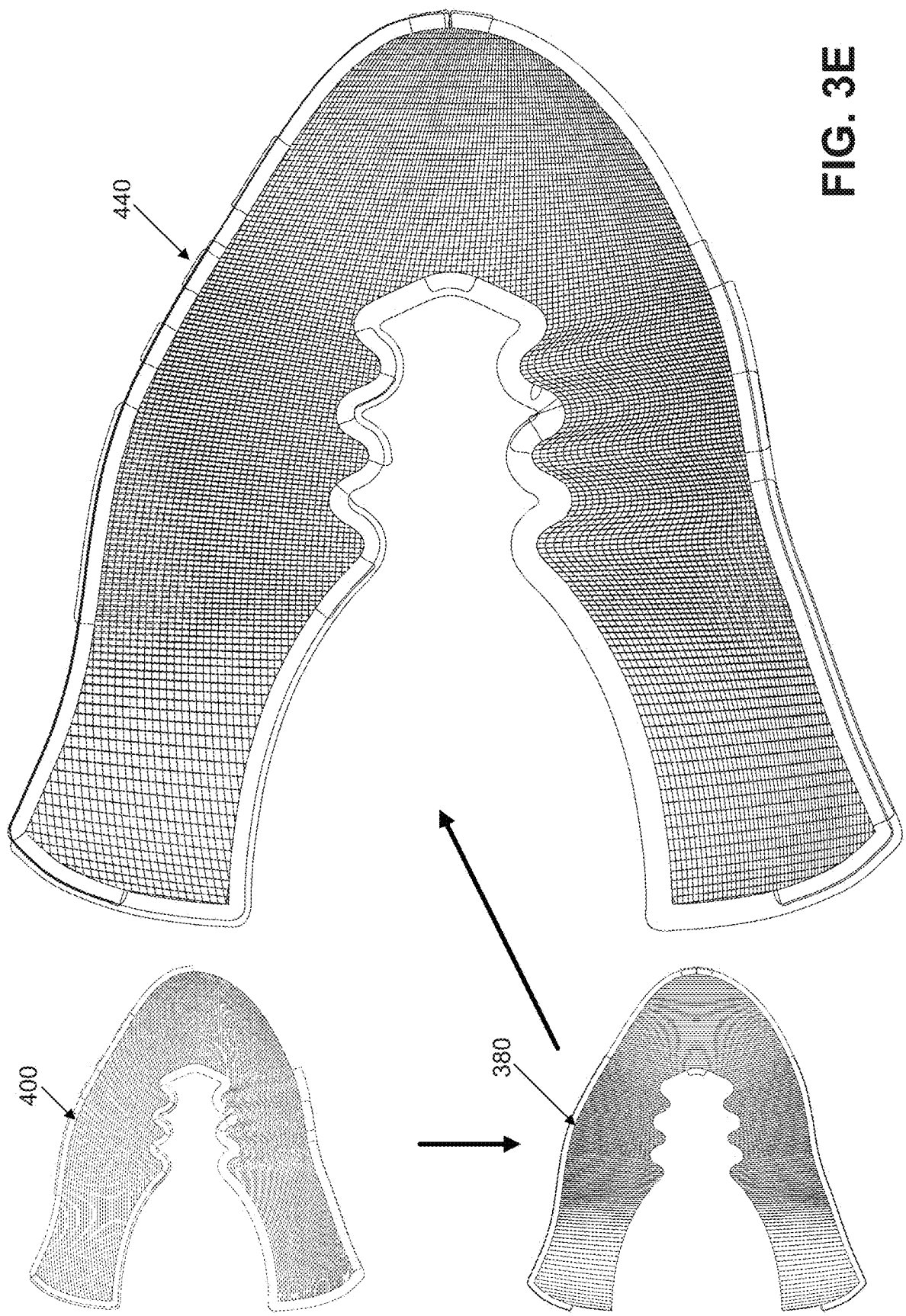

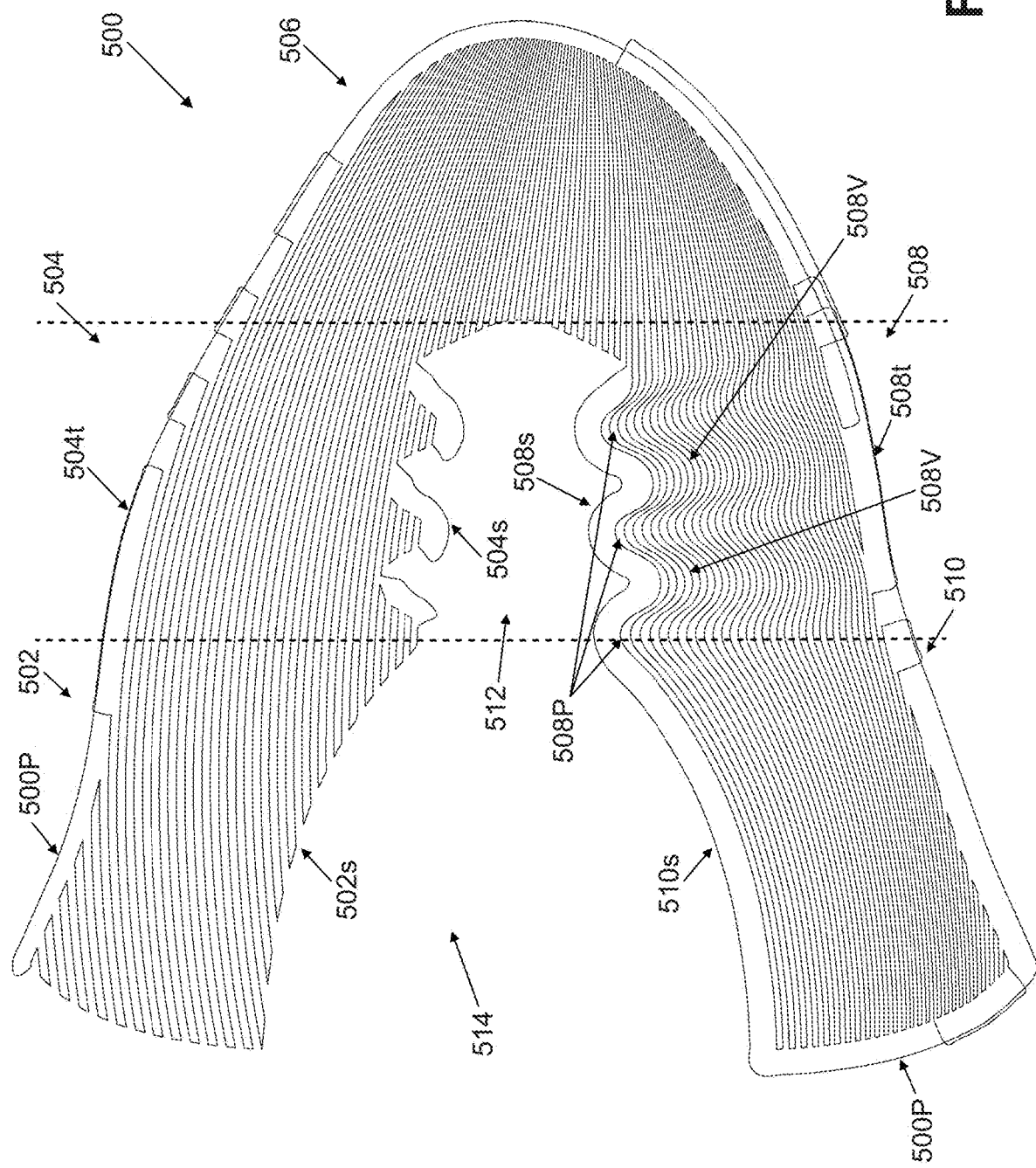

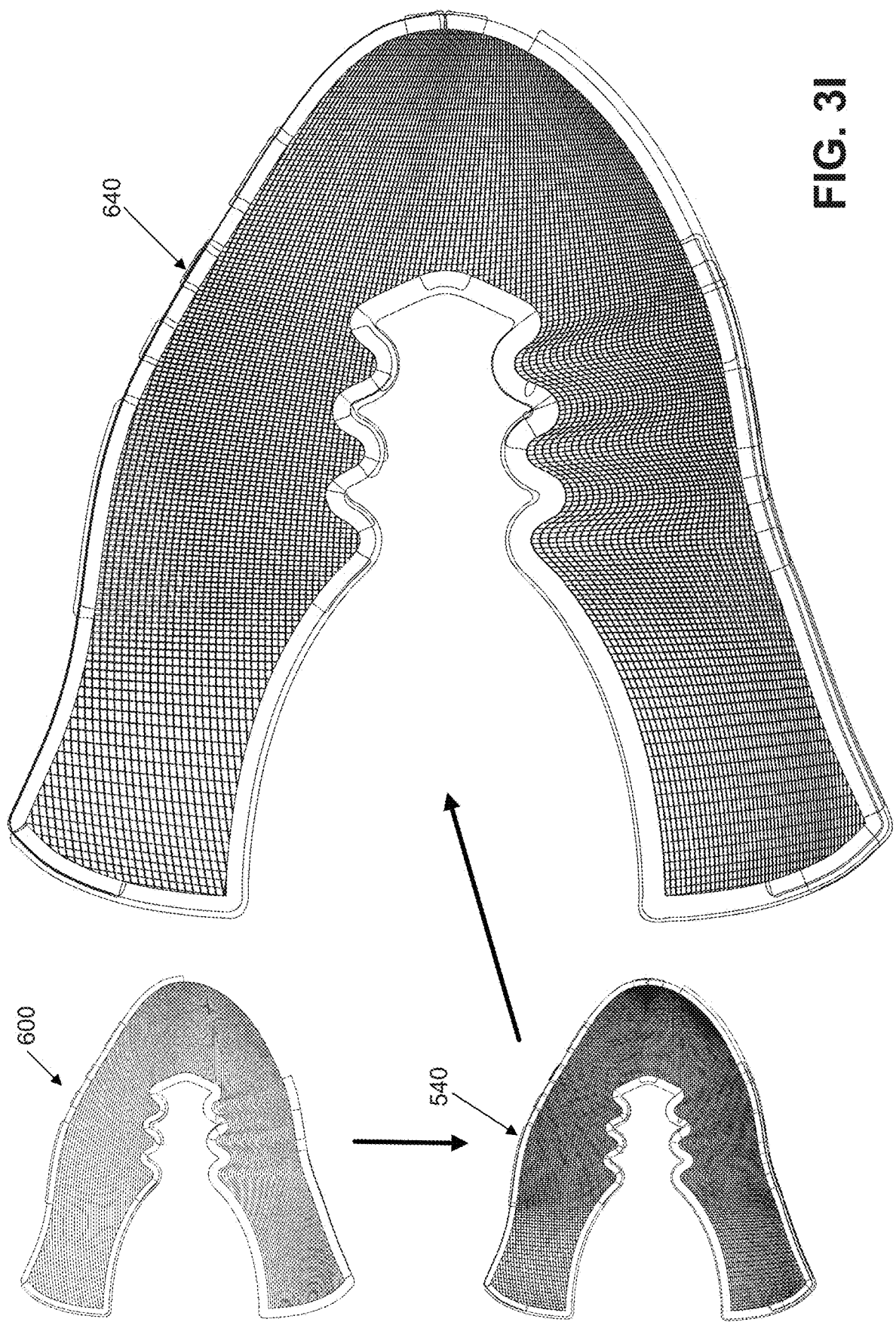

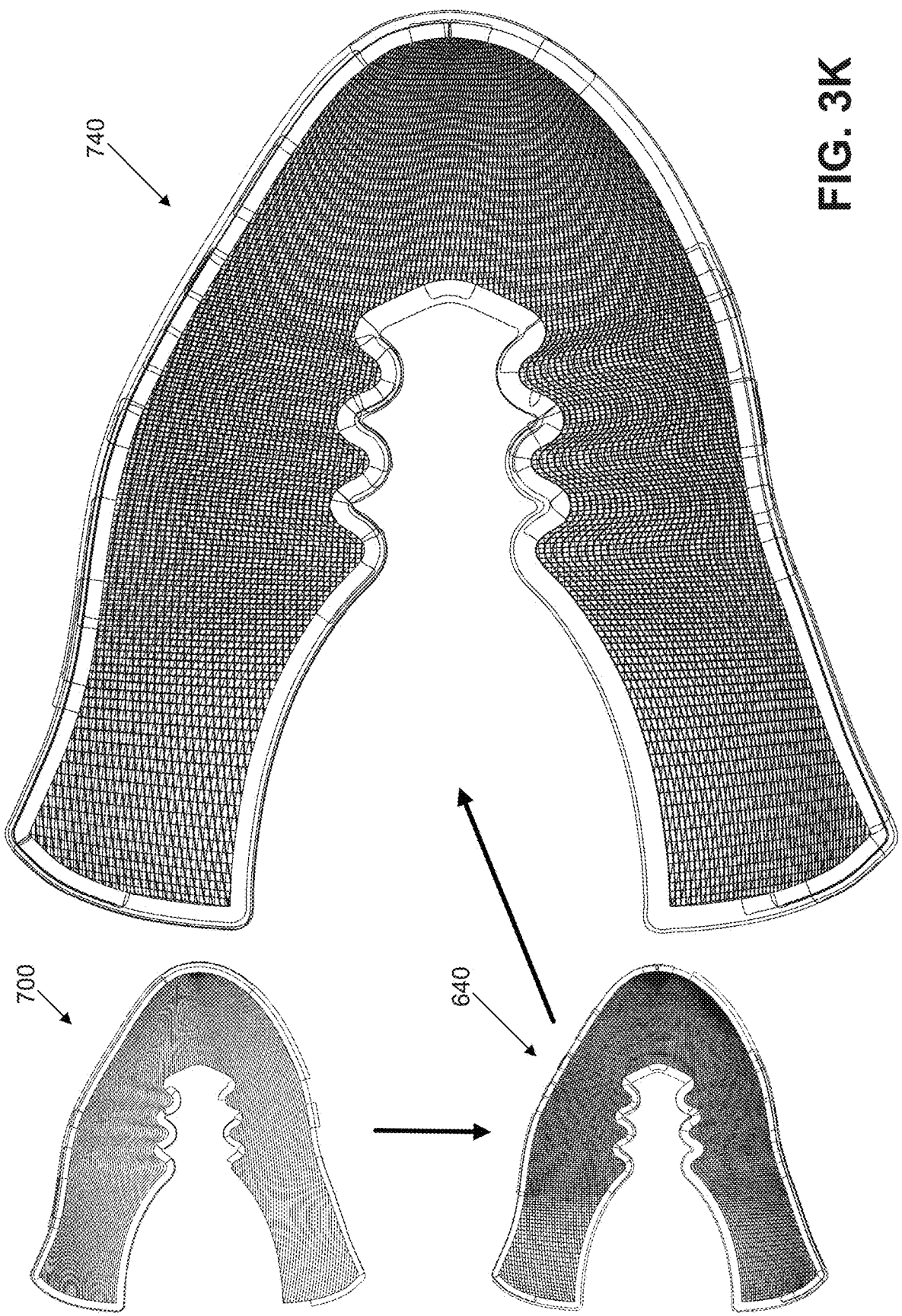

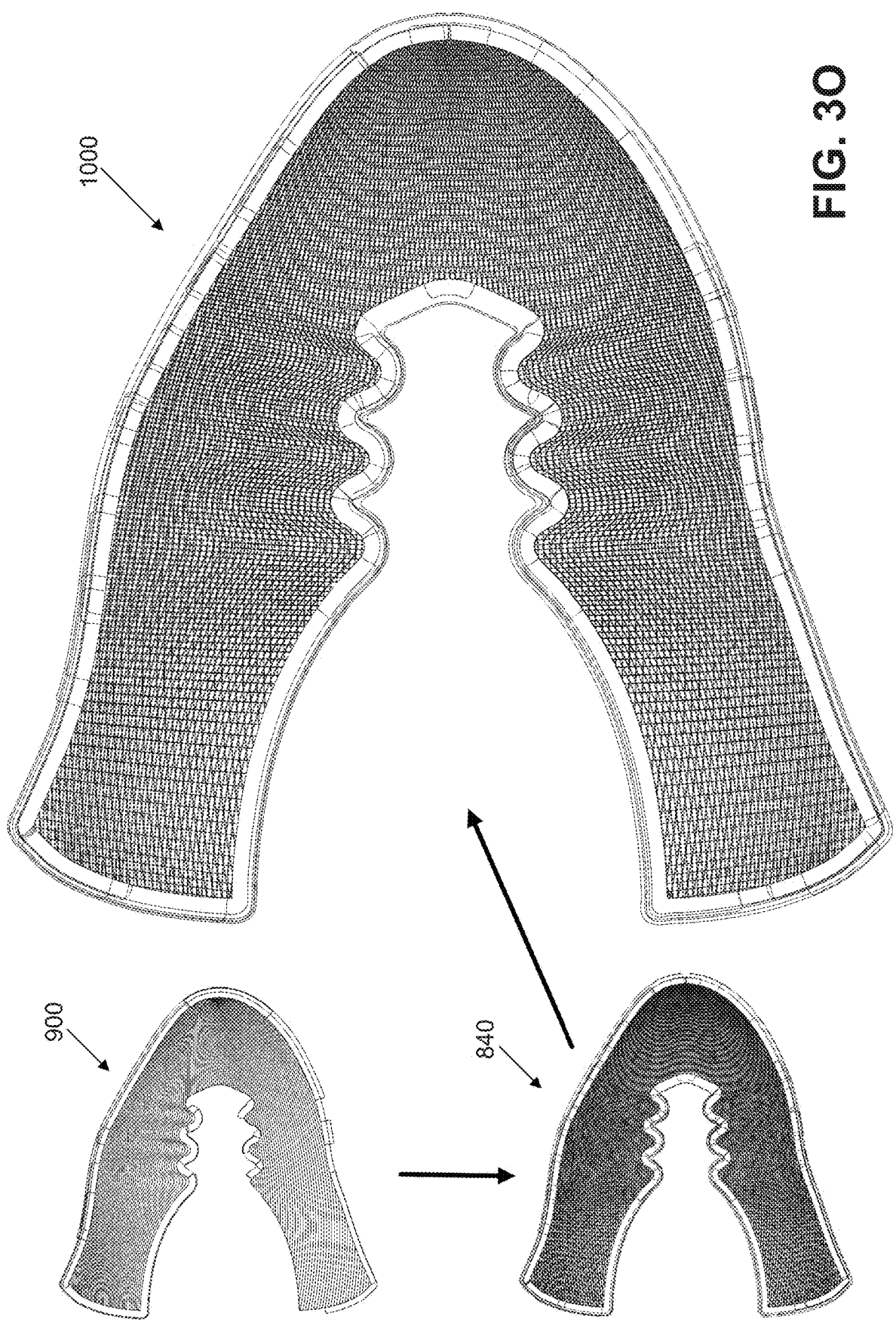

Area A

Area B

Area C

Area D

Area E

Area F

Area G

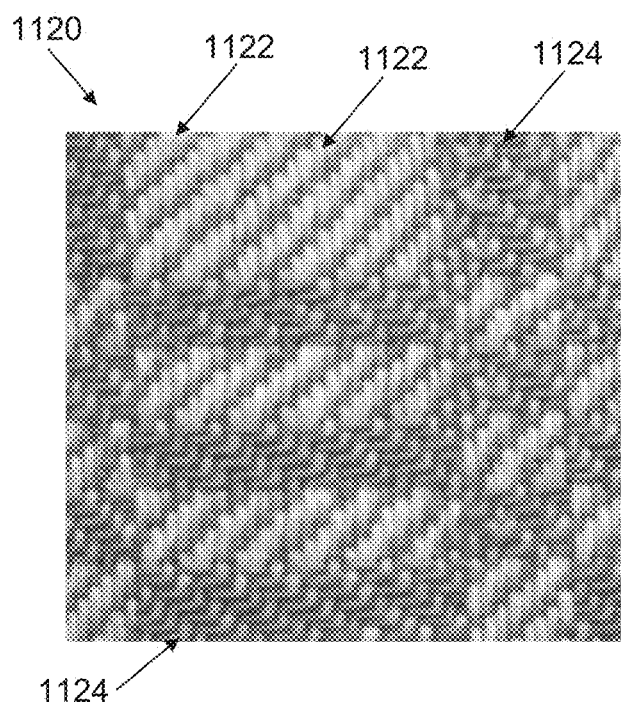
FIG. 5D
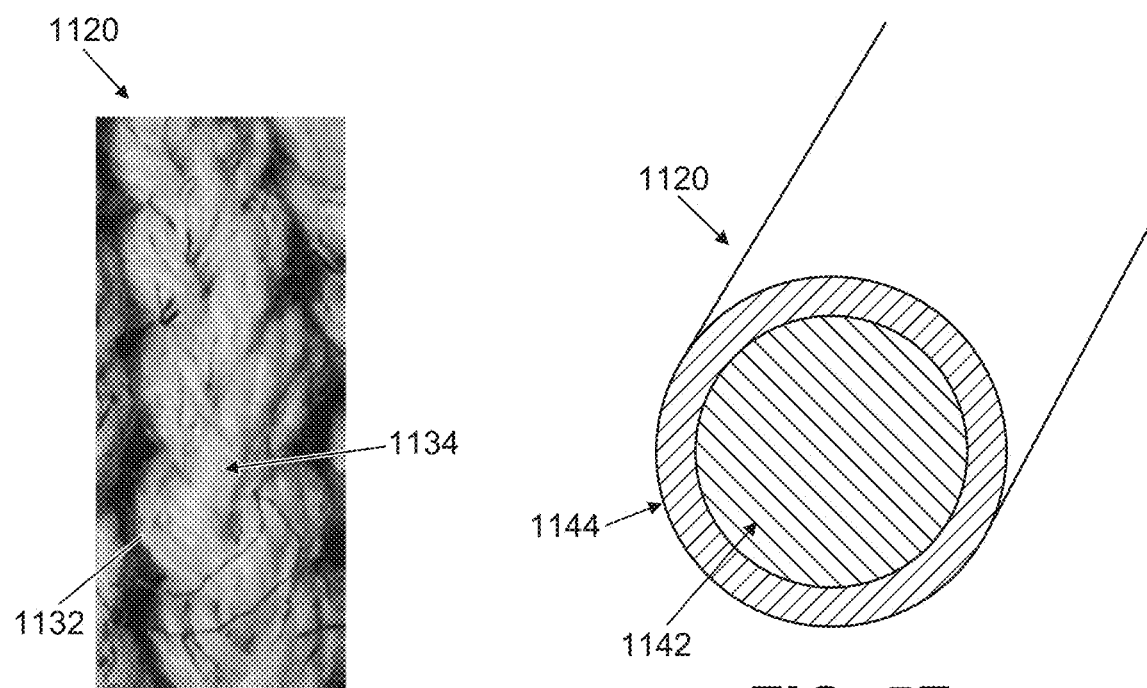
FIG. 5E
FIG. 5F

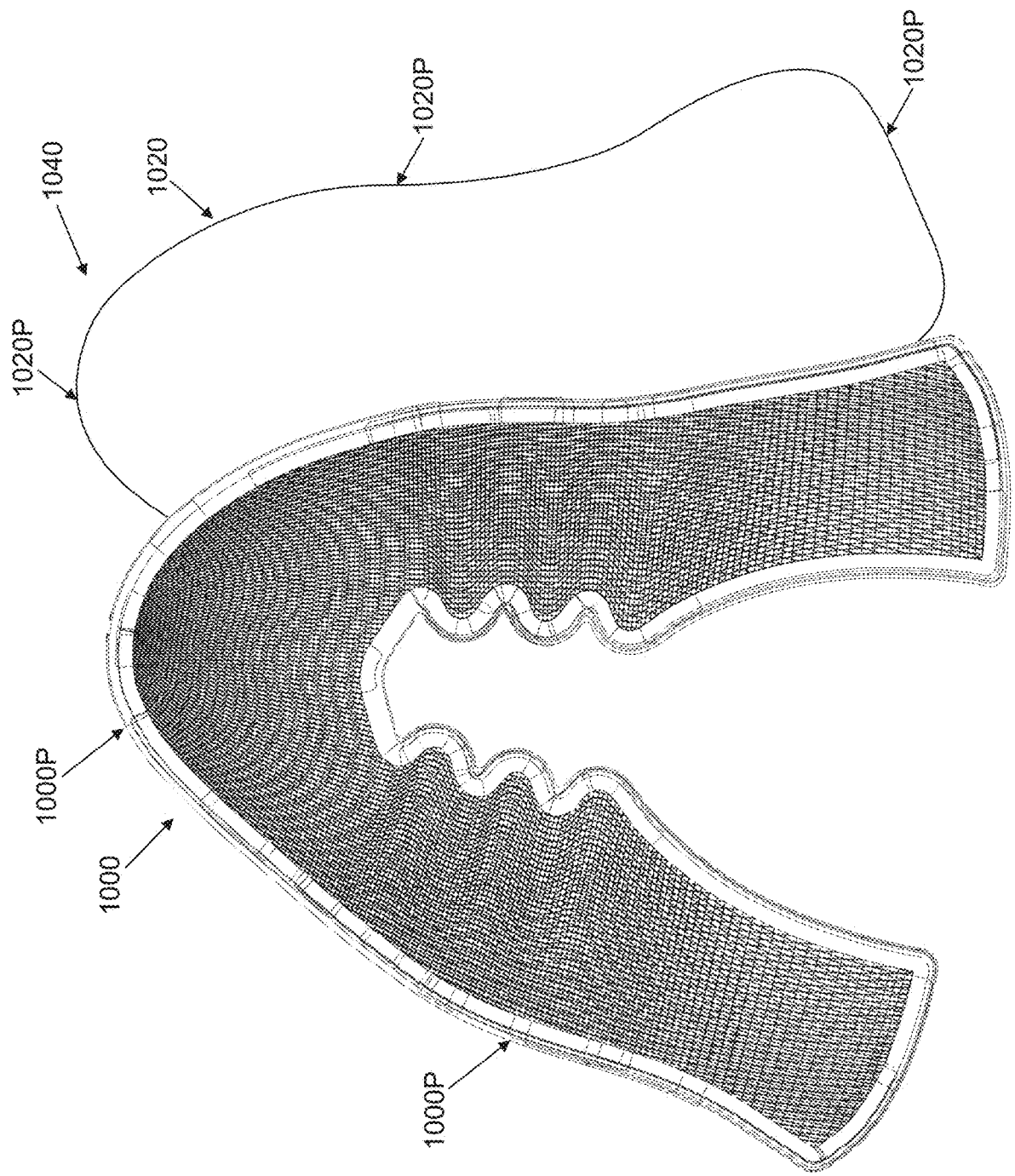

MULTI-LAYER EXTRUDED UPPERS FOR ARTICLES OF FOOTWEAR AND OTHER FOOT-RECEIVING DEVICES

CROSS-REFERENCE TO RELATED APPLICATION

This application is a continuation of U.S. patent application Ser. No. 16/380,236 filed Apr. 10, 2019, which claims priority benefits based on: (a) U.S. Provisional Patent Application No. 62/655,519 filed Apr. 10, 2018 and (b) U.S. Provisional Patent Application No. 62/655,539 filed Apr. 10, 2018, each of which entirely incorporated herein by reference.

FIELD OF THE INVENTION

The present invention relates to the field of footwear and other foot-receiving devices. More specifically, aspects of the present invention pertain to uppers for articles of footwear and other foot-receiving devices and methods of making the uppers.

BACKGROUND

Conventional articles of athletic footwear include two primary elements, an upper and a sole structure. The upper provides a covering for the foot that securely receives and positions the foot with respect to the sole structure. In addition, the upper may have a configuration that protects the foot and provides ventilation, thereby cooling the foot and removing perspiration. The sole structure is secured to a lower surface of the upper and is generally positioned between the foot and any contact surface. In addition to attenuating ground reaction forces and absorbing energy, the sole structure may provide traction and control potentially harmful foot motion, such as over pronation. General features and configurations of uppers and sole structures are discussed in greater detail below.

The upper forms a void on the interior of the footwear for receiving the foot. The void has the general shape of the foot, and access to the void is provided at an ankle or foot-insertion opening. Accordingly, the upper extends over the instep and toe areas of the foot, along the medial and lateral sides of the foot, and around the heel area of the foot. A lacing system often is incorporated into the upper to selectively change the size of the ankle opening and to permit the wearer to modify certain dimensions of the upper, particularly girth, to accommodate feet with varying proportions. In addition, the upper may include a tongue that extends under the lacing system to enhance the comfort of the footwear (e.g., to modulate pressure applied to the foot by the laces), and the upper also may include a heel counter to limit or control movement of the heel.

The sole structure generally incorporates multiple layers that are conventionally referred to as an "insole," a "midsole," and an "outsole." The insole (which also may constitute a sock liner) is a thin member located within the upper and adjacent the plantar (lower) surface of the foot to enhance footwear comfort, e.g., to wick away moisture. The midsole, which is traditionally attached to the upper along the upper's entire length, forms the middle layer of the sole structure and serves a variety of purposes that include controlling foot motions and attenuating impact forces. The outsole forms the ground-contacting element of footwear and usually is fashioned from a durable, wear-resistant material that includes texturing or other features to improve traction.

Terminology/General Information

First, some general terminology and information is provided that will assist in understanding various portions of this specification and the invention(s) as described herein. As noted above, the present invention relates to the field of footwear and other foot-receiving devices. "Foot-receiving device" means any device into which a user places at least some portion of his or her foot. In addition to all types of footwear (described below), foot-receiving devices include, but are not limited to: bindings and other devices for securing feet in snow skis, cross country skis, water skis, snowboards, and the like; bindings, clips, or other devices for securing feet in pedals for use with bicycles, exercise equipment, and the like; bindings, clips, or other devices for receiving feet during play of video games or other games; and the like. "Foot-receiving devices" may include one or more "foot-covering members" (e.g., akin to footwear upper components), which help position the foot with respect to other components or structures, and one or more "foot-supporting members" (e.g., akin to footwear sole structure components), which support at least some portion(s) of a plantar surface of a user's foot. "Securing systems" may help position and/or securely hold the user's foot in place with respect to the foot-covering member(s) and/or the foot-supporting member(s). "Footwear" means any type of wearing apparel for the feet, and this term includes, but is not limited to: all types of shoes, boots, sneakers, sandals, thongs, flip-flops, mules, scuffs, slippers, sport-specific shoes (such as cross-country shoes, golf shoes, tennis shoes, baseball cleats, soccer or football cleats, ski boots, basketball shoes, cross training shoes, track shoes, track field event shoes (e.g., for high jump, triple jump, etc.), etc.), and the like. "Foot-supporting members" may include components for and/or functioning as midsoles and/or outsoles for articles of footwear (or components providing corresponding functions in non-footwear type foot-receiving devices).

The terms "forward" or "forward direction" as used herein, unless otherwise noted or clear from the context, mean toward or in a direction toward a forward-most toe area of the footwear or foot-receiving device structure or component. The terms "rearward" or "rearward direction" as used herein, unless otherwise noted or clear from the context, mean toward or in a direction toward a rear-most heel area of the footwear or foot-receiving device structure or component. The terms "lateral" or "lateral side" as used herein, unless otherwise noted or clear from the context, mean the outside or "little toe" side of the footwear or foot-receiving device structure or component. The terms "medial" or "medial side" as used herein, unless otherwise noted or clear from the context, mean the inside or "big toe" side of the footwear or foot-receiving device structure or component.

The term "moiré effect," as used herein, means a visual perception that occurs when viewing a set of lines or dots that is superimposed on another set of lines or dots, where the sets differ in relative size, angle, or spacing. In some examples, the "moiré effect" can be seen when two sets of lines (e.g., path segments) of equal thickness and equal spacing are superimposed, but one set is angled (e.g., at a few degrees) with respect to the lines (e.g., path segments)

of the other set. The "moiré effect" can be seen in that case as a set of thick, ill-defined bars.

BRIEF DESCRIPTION OF THE DRAWINGS

The following Detailed Description, will be better understood when read in conjunction with the accompanying drawings in which like reference numerals refer to the same or similar elements in all of the various views in which that reference number appears.

FIGS. 2A-2F show various features of filament paths and filament path segments in upper layers in accordance with some examples of this invention;

FIGS. 5A-5F shows various features of a filament based upper component engaged with another upper component in an adhesive-free manner;

FIG. 9 illustrates a multi-layer upper blank integrally formed with a strobel member in accordance with some examples of this invention.

Figure 1:
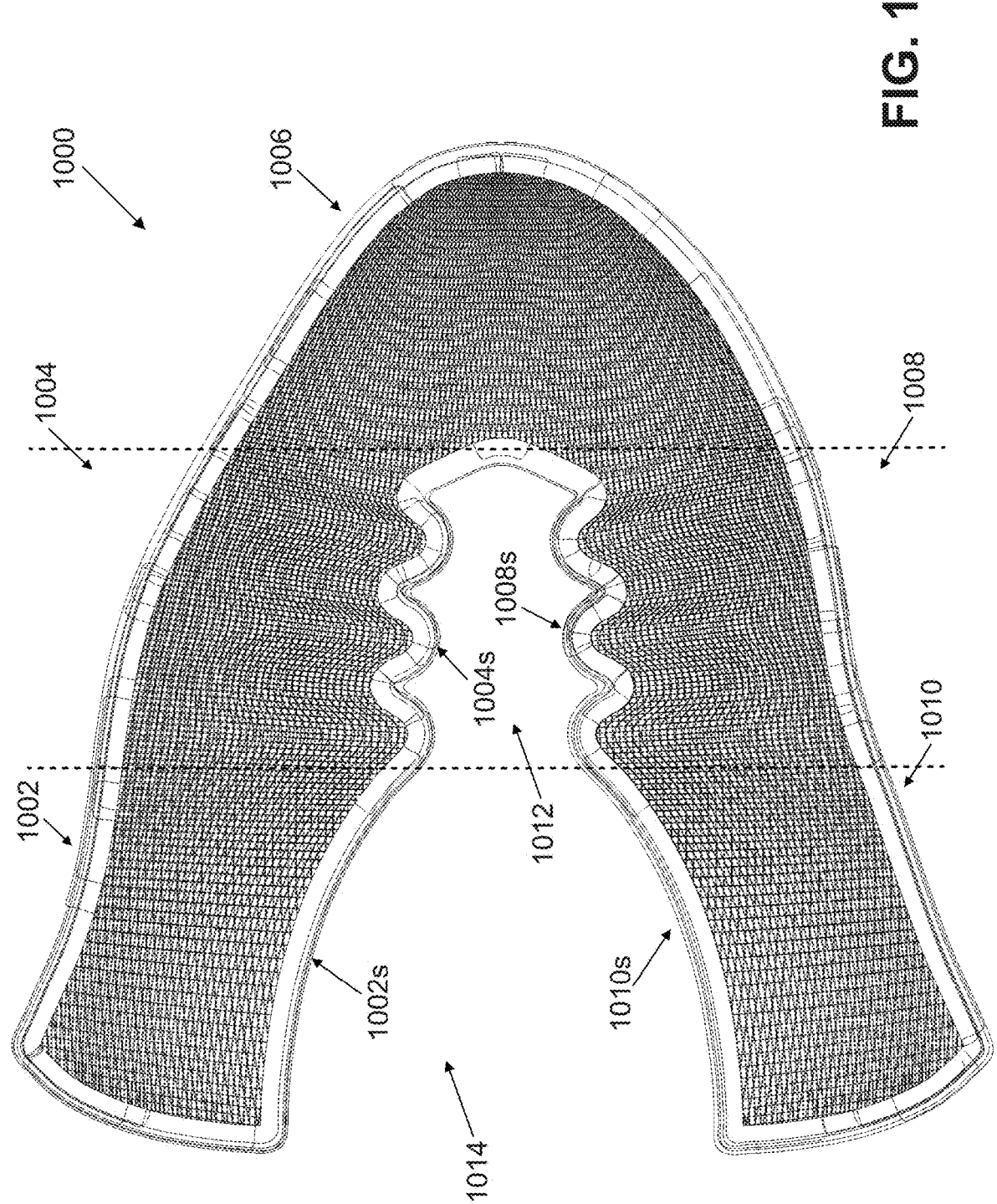
FIG. 1 shows a multi-layer upper blank made from multiple layers of extruded filaments in accordance with one example of this invention.

The reader should understand that the attached drawings are not necessarily drawn to scale.

DETAILED DESCRIPTION

In the following description of various examples of footwear and foot-receiving device structures and components according to the present invention, reference is made to the accompanying drawings, which form a part hereof, and in which are shown by way of illustration various example structures and environments in which aspects of the invention may be practiced. It is to be understood that other structures and environments may be utilized and that structural and functional modifications may be made from the specifically described structures and functions without departing from the scope of the present invention.

I. DETAILED DESCRIPTION OF EXAMPLE UPPERS OR OTHER FOOT-COVERING COMPONENTS ACCORDING TO THIS INVENTION

Referring to the figures and following discussion, various articles of footwear/foot-receiving devices and features thereof in accordance with aspects of the present invention are disclosed. The footwear depicted and discussed are athletic shoes (e.g., cross country, running, or track shoes), but the concepts disclosed with respect to this footwear may be applied to a wide range of athletic footwear styles, including, but not limited to: walking shoes, tennis shoes, soccer shoes, football shoes, basketball shoes, running shoes, track shoes, shoes for track field events (e.g., high jump, triple jump, etc.) and cross-training shoes. In addition, the concepts of the present invention may be applied to a wide range of non-athletic footwear, including work boots, sandals, loafers, and dress shoes, as well as to other foot-receiving devices.

Uppers for articles of footwear (or foot-covering components for other foot-receiving devices) in accordance with at least some examples and aspects of this invention may include: an upper component having: (a) a first layer comprising a first filament including first plural, non-intersecting, spaced apart path segments, wherein the first filament has a width dimension of less than 3 mm wide (and in some examples, less than 2 mm wide, less than 1.5 mm wide, less than 1 mm wide, or even less than 0.75 mm wide); and (b) a second layer comprising a second filament including second plural, non-intersecting, spaced apart path segments, wherein the second filament has a width dimension of less than 3 mm wide (and in some examples, less than 2 mm wide, less than 1.5 mm wide, less than 1 mm wide, or even less than 0.75 mm wide). The second layer may at least partially overlay the first layer and may be fused to the first layer at locations where the second layer contacts the first layer. Additional layers of material, including additional layers of filament, e.g., of the types described above, may be included in the upper. The filament material in the different layers may be the same or different from one another (e.g., a thermoplastic material, a thermoplastic polyurethane material, a hydrophobic material, a water-repelling material, a non-water absorbing material, etc.), and it may be extruded, e.g., formed in a solid deposition modeling process. The filament material may comprise any material as are conventionally known and used in solid deposition modeling arts as the fusible material (e.g., including thermoplastics such as acrylonitrile butadiene styrene (ABS), polylactic acid (PLA), high-impact polystyrene (HIPS), thermoplastic polyurethane (TPU), aliphatic polyamides (nylon), and/or other materials as are conventionally known and used in the solid deposition modeling arts. The term "solid deposition modeling" as used herein includes processes known in the art as "fused filament fabrication" and "fused deposition modeling."

Upper blanks for articles of footwear (or foot-covering components for other foot-receiving devices) in accordance with at least some examples and aspects of this invention may include: (a) a first layer comprising a first filament formed as a first path (e.g., a first continuous path) of extruded filament, wherein the first path (e.g., the first continuous path) of the first filament forms a first lateral rear heel portion, a first lateral midfoot portion, a first forefoot portion, a first medial midfoot portion, and a first medial rear heel portion of the first layer, and wherein the first filament has a width dimension of less than 3 mm wide (and in some examples, less than 2 mm wide, less than 1.5 mm wide, less than 1 mm wide, or even less than 0.75 mm wide); and (b) a second layer comprising a second filament formed as a second path (e.g., a second continuous path) of extruded filament, wherein the second path (e.g., the second continuous path) of the second filament forms a second lateral rear heel portion, a second lateral midfoot portion, a second forefoot portion, a second medial midfoot portion, and a second medial rear heel portion, wherein the second filament has a width dimension of less than 3 mm wide (and in some examples, less than 2 mm wide, less than 1.5 mm wide, less than 1 mm wide, or even less than 0.75 mm wide), and wherein the second layer is fused to the first layer at locations where the second layer contacts the first layer. Additional layers of material, including additional layers of filament, e.g., of the types described above, may be included in the upper blank. The filament material in the different layers may be the same or different from one another (e.g., as described above). The filament layers may be extruded, e.g., in a solid deposition modeling process.

Uppers for articles of footwear (or foot-covering components for other foot-receiving devices) in accordance with at least some examples and aspects of this invention may include: (a) a first upper component that includes a first layer including a first material as a first filament including first plural, non-intersecting, spaced apart path segments, wherein the first filament has a width dimension of less than 3 mm wide (and in some examples, less than 2 mm wide, less than 1.5 mm wide, less than 1 mm wide, or even less than 0.75 mm wide); and (b) a second upper component including a fabric element formed at least in part of a fusible material, wherein the fusible material of the second upper component is fused to the first material of the first upper component (e.g., in an adhesive-free manner). Additional layers of material, including additional layers of filament and/or additional fabric elements, e.g., of the types described above, may be included in the upper. The filament or fabric material in the different layers may be the same or different from one another (e.g., as described above).

Methods of forming uppers for articles of footwear (or foot-covering components for other foot-receiving devices) in accordance with at least some examples and aspects of this invention (and/or of the types described above) may include: (a) extruding a first material to form a first layer comprising a first extruded filament including first plural, non-intersecting, spaced apart path segments, wherein the first extruded filament has a width dimension of less than 3 mm wide (and in some examples, less than 2 mm wide, less than 1.5 mm wide, less than 1 mm wide, or even less than 0.75 mm wide); and (b) extruding a second material to form a second layer comprising a second extruded filament including second plural, non-intersecting, spaced apart path segments, wherein the second extruded filament has a width dimension of less than 3 mm wide (and in some examples, less than 2 mm wide, less than 1.5 mm wide, less than 1 mm wide, or even less than 0.75 mm wide), and wherein the step of extruding the second material includes fusing the second layer to the first layer at locations where the second layer contacts the first layer. The second layer at least partially overlaps the first layer. The filament may be deposited in a solid deposition modeling process.

Methods of forming uppers for articles of footwear (or foot-covering components for other foot-receiving devices) in accordance with at least some examples and aspects of this invention (and/or of the types described above) may include: (a) extruding a first material to form a first layer comprising a first extruded filament as a first path (e.g., a first continuous path), wherein the first path (e.g., the first continuous path) of the first extruded filament forms a first lateral rear heel portion, a first lateral midfoot portion, a first forefoot portion, a first medial midfoot portion, and a first medial rear heel portion of the first layer, and wherein the first extruded filament has a width dimension of less than 3 mm wide (and in some examples, less than 2 mm wide, less than 1.5 mm wide, less than 1 mm wide, or even less than 0.75 mm wide); and (b) extruding a second material to form a second layer comprising a second extruded filament as a second path (e.g., a second continuous path), wherein the second path (e.g., the second continuous path) of the second extruded filament forms a second lateral rear heel portion, a second lateral midfoot portion, a second forefoot portion, a second medial midfoot portion, and a second medial rear heel portion of the second layer, wherein the second extruded filament has a width dimension of less than 3 mm wide (and in some examples, less than 2 mm wide, less than 1.5 mm wide, less than 1 mm wide, or even less than 0.75 mm wide), and wherein the step of extruding the second material includes fusing the second layer to the first layer at locations where the second layer contacts the first layer. The second layer at least partially overlays the first layer, and these layers may be deposited in a solid deposition modeling process. More layers of extruded filament may be included in the upper, if desired.

Methods of forming uppers for articles of footwear (or foot-covering components for other foot-receiving devices) in accordance with at least some examples and aspects of this invention (and/or of the types described above) may include: (a) extruding a first material to form a first layer comprising a first extruded filament including first plural, non-intersecting, spaced apart path segments, wherein the first extruded filament has a width dimension of less than 3 mm wide (and in some examples, less than 2 mm wide, less than 1.5 mm wide, less than 1 mm wide, or even less than 0.75 mm wide), and wherein the first layer comprising the first extruded filament forms at least a portion of a first upper component; and (b) fusing a second upper component to the first upper component, wherein the second upper component includes a fabric element formed at least in part of a fusible material, wherein fusible material of the second upper component is fused to the first material of the first upper component, e.g., by application of heat and/or pressure, optionally in an adhesive free manner. The first upper component may include multiple layers of filament material. The extruded filament layer(s) may be deposited in a solid deposition modeling process.

Methods of forming uppers for articles of footwear (or foot-covering components for other foot-receiving devices) in accordance with at least some examples and aspects of this invention (and/or of the types described above) may include: (a) extruding a first material to form a first layer comprising a first extruded filament including first plural, non-intersecting, spaced apart path segments, wherein the first extruded filament has a width dimension of less than 3 mm wide (and in some examples, less than 2 mm wide, less than 1.5 mm wide, less than 1 mm wide, or even less than 0.75 mm wide), and wherein the first layer comprising the first extruded filament forms at least a portion of a first upper component; (b) covering a portion of the first layer with a release liner (e.g., a portion of the first layer extending inwardly from a peripheral edge of the first layer); (c) extruding a second material to form a second layer comprising a second extruded filament including second plural, non-intersecting, spaced apart path segments, wherein the second extruded filament has a width dimension of less than 3 mm wide (and in some examples, less than 2 mm wide, less than 1.5 mm wide, less than 1 mm wide, or even less than 0.75 mm wide), wherein the step of extruding the second material includes: (i) applying a first portion of the second layer to the release liner such that the release liner extends between a first portion of the first layer and the first portion of the second layer and (ii) fusing a second portion of the second layer to a second portion of the first layer at locations where the second layer contacts the first layer (e.g., at locations away from the release liner), and wherein the second layer forms a portion of the first upper component;

(d) removing the release liner from between the first portion of the first layer and the first portion of the second layer; (e) optionally, placing a portion of a second upper component between the first portion of the first layer and the first portion of the second layer, wherein the portion of the second upper component optionally includes a fabric element formed at least in part of a fusible material; and (f) optionally, engaging the second upper component with the first upper component. In examples where the second upper component includes a fabric element formed at least in part by a fusible material, the fusible material of the second upper component may be fused to the first material of the first upper component and/or to the second material of the first upper component, e.g., in an adhesive free manner. Multiple layers of filament material may be provided on either or both sides of the release liner (and the second upper component), if desired. The layers of filament material may be deposited in a solid deposition modeling process.

Two or more layers of fused filament materials in footwear uppers in accordance with examples of this invention may provide several options for designers to control properties and/or performance characteristics of a footwear upper and/or several options for designers to control properties and/or performance characteristics in different regions or zones of an individual upper. Many features or properties of an upper can be controlled or altered, including one or more of: (a) filament size (e.g., extruded diameter, extruded width, or extruded thickness) in one or more filament layers of an upper and/or in one or more zones or regions in a single layer of an upper; (b) filament material in one or more filament layers of an upper and/or in one or more zones or regions in a single layer of an upper (e.g., a filament material's elasticity, stretchability, strength, etc.); (c) filament spacing in one or more filament layers of an upper and/or in one or more zones or regions in a single layer of an upper; (d) extent of filament overlap between layers of an upper (e.g., overlap in the filament width direction and/or the filament axial direction); (e) filament ordering layer in layers of an upper; (f) the number of filament path segments in one or more filament layers of an upper and/or in one or more zones or regions in a single layer of an upper; (g) filament path direction in one or more filament layers of an upper and/or in one or more zones or regions in a single layer of an upper; etc. Fusion at the intersections of the filament layers provides different connections and interactions between layers as compared to connections between strands or yarns of knitted or woven fabric materials. In general, filaments extending in a medio-lateral direction of the upper (e.g., from side-to-side and/or from a top edge (e.g., by the foot-receiving and/or instep opening(s)) to a bottom edge (e.g., where the upper will engage the sole) will provide enhanced "lock-down" effect on the foot (e.g., hold the foot down onto the footwear sole more securely). Filaments arranged in a more curved and/or serpentine pattern and/or in diamond or parallelogram shapes may provide directional stretch features (e.g., more stretch in one direction as compared to an opposite direction). Tighter filament spacings in or more layers and/or within an individual layer of an upper will tend to provide decreased flexibility, decreased stretch, decreased permeability (e.g., for air, water, or other materials), and/or decreased breathability for that layer and/or zone (and greater filament spacings will tend to increase these properties for that layer and/or zone).

Given the above background and general description of aspects and examples of this invention, a more detailed description of specific examples of uppers, upper components, upper blanks, and/or articles of footwear in accordance with at least some examples of this invention follows.

II. DETAILED DESCRIPTION OF SPECIFIC EXAMPLE UPPERS, UPPER COMPONENTS, UPPER BLANKS, AND ARTICLES OF FOOTWEAR ACCORDING TO THIS INVENTION

FIG. 1 illustrates an upper blank 1000 for forming an upper for an article of footwear (or a foot-covering component for another type of foot-receiving device) in accordance with one example of this invention. The upper blank 1000 of this example is formed from multiple layers of extruded filament. One or more of the filament layers (and optionally each individual layer of the filament layers) of upper blank 1000 may be extruded as a continuous path of extruded filament, although one or more (or even all) of the individual layers need not be extruded as a continuous path in some examples of this invention. The extruded filament path(s) in any one or more of the layers of the upper blank 1000 may extend to form one or more of (and optionally all of): a lateral rear heel portion 1002 (e.g., extending along a lateral side 1002$s$ of the ankle/foot opening 1014 of the upper blank 1000); a lateral midfoot portion 1004 (e.g., adjacent a lateral side 1004$s$ of an instep opening 1012 of the upper blank 1000, which may include one or more structures to engage a shoe lace); a forefoot portion 1006 (e.g., which bridges from a lateral side to a medial side of the upper blank 1000, forward of the midfoot portions); a medial midfoot portion 1008 (e.g., adjacent a medial side 1008$s$ of the instep opening 1012 of the upper blank 1000, which may include one or more structures to engage a shoe lace); and a medial rear heel portion 1010 (e.g., extending along a medial side 1010$s$ of the ankle/foot opening 1014 of the upper blank 1000). The vertical dashed lines shown in FIG. 1 generally define and break the upper blank 1000 into three portions or regions: (a) a posterior third (containing the lateral rear heel portion 1002 and the medial rear heel portion 1010), (b) a central third (containing the lateral midfoot portion 1004 and the medial midfoot portion 1008), and (c) an anterior third (containing the forefoot portion 1006). In some examples of this invention, the upper blank 1000 will consist essentially of, or even consist of, the multi-layer filament structure. The white space visible in FIG. 1 for this example upper blank 1000 constitutes open space between filament path segments (e.g., where one can see completely through the upper blank 1000).

Figure 2C:
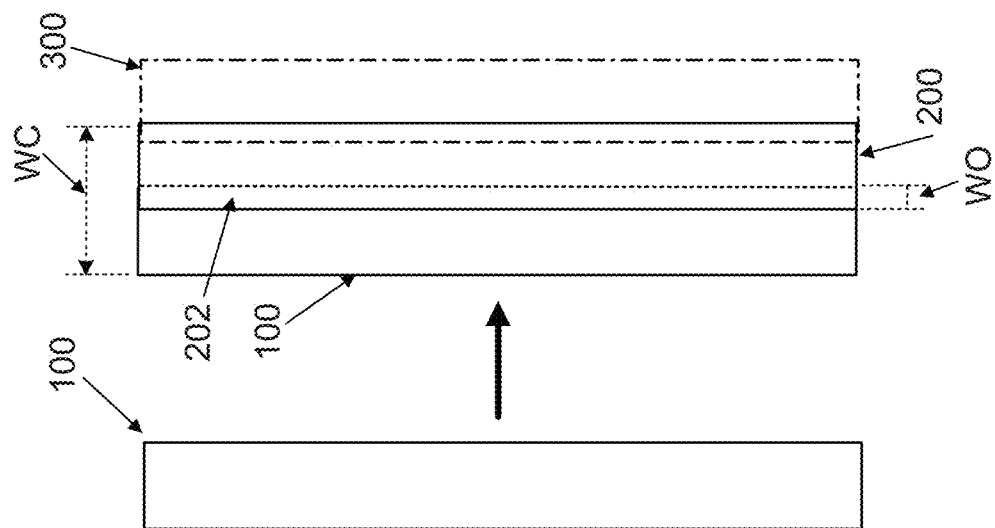

Example features of individual layers of this example multi-layer upper blank 1000 now will be described in more detail in conjunction with FIGS. 2A-2F. FIGS. 2A and 2D generally show an extruded path segment 100 as may be laid down by an extruder 102 during an upper formation process in accordance with some examples of this invention (e.g., in a solid deposition modeling or a fused deposition modeling process). As shown in these figures, an individual path segment 100 of an extruded filament generally will have an axial length L that is much greater than the width W and/or thickness T of the individual filament path segment. As some more specific examples, an individual filament (and/or at least one or more path segments 100 thereof) may have an extruded width dimension W of less than 3 mm wide, and in some examples, less than 2 mm wide, less than 1.5 mm wide, less than 1 mm wide, or even less than 0.75 mm wide. Additionally or alternatively, an individual filament (and/or at least one or more path segments 100 thereof) may have an extruded thickness dimension T of less than 3 mm thick, and in some examples, less than 2 mm thick, less than 1.5 mm thick, less than 1.25 mm thick, less than 1 mm thick, or less than 0.75 mm thick, or even less than 0.5 mm thick. For at least some path segments 100 (and optionally all path segments 100 in an upper layer and/or upper blank 1000), the width dimension W may be greater than the thickness dimension T. The path segment length dimension L and/or overall continuous path length may be at least 10 times greater (and in some examples, at least 20 times greater, at least 50 times greater, at least 75 times greater, a least 100 times greater, or even at least 150 times greater) than the width dimension W and/or the thickness dimension T of the filament/filament path. Also, as described above, an individual layer of an upper component may include plural, non-intersecting, spaced apart path segments. As some more examples, as shown in the figures, an individual layer may include at least 5 non-intersecting path segments over path segment lengths of at least 25 mm, and in some examples, at least 5 non-intersecting path segments over path segment lengths of at least 50 mm, at least 75 mm, at least 100 mm, at least 150 mm, or even more. As additional examples, an individual layer may include at least 10 non-intersecting path segments over any of the above path segment length dimensions, at least 15 non-intersecting path segments over any of the above path segment length dimensions, or even at least 20 non-intersecting path segments over any of the above path segment length dimensions.

As shown in FIG. 2D, the material 108 for forming the filament path segment 100 may be forced through the nozzle 104 of the extruder 102 onto a substrate 106, which may be formed of glass or other appropriate material. The nozzle 104 diameter may be somewhat narrower than the final extruded width W of the path segment 100, e.g., because the heated filament material 108 may tend to flatten out after being deposited as a path segment 100 (or even may be pushed downward by the extruder 102 nozzle 104). In general, increasing the temperature of the material 108 being extruded may cause the deposited path segment 100 to flatten out more (and generally increase in width W and decrease in thickness T). In one more specific example, the nozzle 104 diameter may be about 0.4 mm, although the nozzle 104 diameter may range, for example, from 0.25 mm to 2.5 mm (and in some examples, from 0.3 mm to 2 mm). The surface 106s of the substrate 106 may be smooth or otherwise textured, and the characteristics of the bottom surface 100s of the filament path segment 100 may form to and take the shape (e.g., smooth or textured characteristics) of the substrate 106 surface 106s on which it contacts and is formed.

Figure 2B:
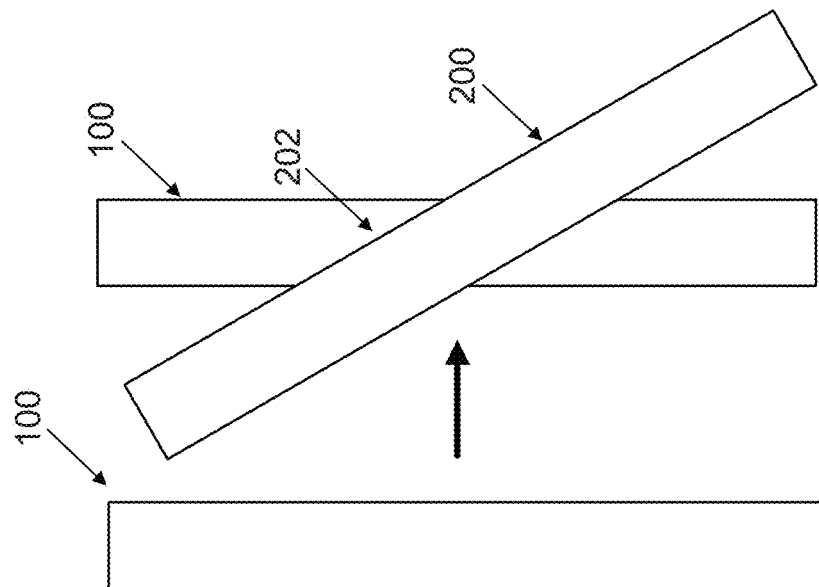
Figure 2A:
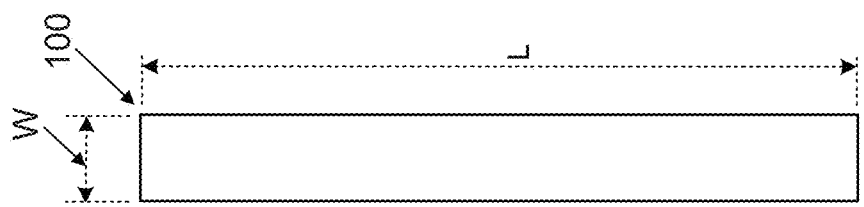

FIG. 2B illustrates a portion of an upper blank 1000 where two layers of filament are present. First, the first filament path segment 100 is extruded (e.g., having any one or more of the filament dimensions and/or structural features described above), and then a second filament path segment 200 (e.g., as a second layer of the upper/upper blank 1000) is extruded in a direction to cross or intersect the first filament path segment 100. The second filament path segment 200 may directly contact the first filament path segment 100 (at contact area 202) as it is being extruded. Heat from the material of the second filament path segment 200 during the extrusion thereof (and/or another heat source) causes the second filament path segment 200 to fuse together with the first filament path segment 100 at location(s) 202 where they contact one another (e.g., the material of the second filament path segment 200 may polymerize with and seamlessly join the material of the first filament path segment 100, and heat from the extruded second filament path segment 200 as it is being deposited can support this fusion feature). In this manner, the first layer of the upper blank 1000 (including the first filament path segment(s) 100) can be fixedly joined to the second layer of the upper blank 1000 (including the second filament path segment(s) 200) in an adhesive free manner at contact location(s) 202.

FIGS. 2C and 2E show another manner in which two (or more) layers of an upper blank 1000 may be engaged with one another. Rather than simply intersecting (as shown in FIG. 2B), the second extruded path segment(s) 200 may be extruded at locations that generally overlap (and optionally extend in parallel) with the first extruded path segment(s) 100 over at least a portion of their respective axial lengths L. This action produces an axially extending contact area 202 between path segments 200 and 100. While other options are possible, after the first path segments 100 are extruded, the second path segments 200 (optionally formed in a second layer of the upper blank 1000) can be extruded at locations offset slightly from the extrusion path(s) of the first path segments 100. As shown in FIG. 2E, when the first path segment 100 was extruded, the nozzle 104 center was located at line 120a. Then, when the second path segment 200 was extruded (e.g., with a second upper blank layer), the nozzle 104 was shifted by an offset distance D to center at line 120b. This offset distance D may be any desired amount, and in some examples of this invention, may be between 0.5 $D_N$ to 0.9 $D_N$, and in some examples, between 0.625 $D_N$ to 0.85 $D_N$, or even about 0.75 $D_N$, wherein $D_N$ represents the nozzle 104 diameter.

The overlapping (and substantially parallel) contact area 202 of the type shown in FIGS. 2C and 2E may extend any desired axial length L without departing from the invention. In some examples, the second path segment(s) 200 of the second filament (or second layer) may extend parallel to and/or partially overlap with the first path segment(s) of the first filament (or first layer) over a path segment length 100 of at least 25 mm, and in some examples, at least 50 mm, at least 75 mm, at least 100 mm, at least 150 mm, or even more. The overlapping contact area 202 may follow along curved path segment(s) as well. Additionally or alternatively, the overall layer path of the second layer (including the second path segment(s) 200): (a) may extend parallel to and/or partially overlap with the overall layer path of the first layer (including the first path segment(s) 100) over at least 10%, at least 25%, at least 50%, at least 75%, at least 85%, at least 90%, or even at least 95% of an overall path length of the second layer and/or (b) may extend parallel to and/or partially overlap with the overall layer path of the first layer (including the first path segment(s) 100) over at least 10%, at least 25%, at least 50%, at least 75%, at least 85%, at least 90%, or even at least 95% of an overall path length of the first layer.

In at least some examples of this aspect of the invention, the second path segment(s) 200 of the second filament will overlap with the first path segment(s) 100 of the first filament by an overlapped width WO that is from 5% to 50% of an overall combined width WC of the second filament and the first filament at the location(s) of overlap. See FIG. 2C. In some examples, this overlapped width WO may be from 10% to 45% or even 15% to 40% of the overall combined width WC at the location(s) of overlap. When the individual filament layers are formed as plural, non-intersecting, spaced part path segments, the plurality of the second plural, non-intersecting, spaced apart path segments (e.g., path segments 200) of the second filament may overlap with the plurality of the first plural, non-intersecting, spaced apart path segments (e.g., path segments 100) of the first filament by an overlapped width WO that is from 5% to 50% (or from 10% to 45% or even from 15% to 40%) of an overall combined width WC of: (a) the second plural, non-intersecting, spaced apart path segment and (b) the first plural, non-intersecting, spaced apart path segments at the overlapping path segment location(s). Additionally or alternatively, if desired, the overlapped width WO of one or more filaments of the second path segment(s) 200 with corresponding first path segment(s) 100 may be within 10% to 75%, within 15% to 60%, or even within 25% to 50% of the width W of the second path segment 200 (or of the width W of the first path segment 100) at the location of the overlap. Thus, WO=0.1 W to 0.75 W, or even 0.15 W to 0.6 W or 0.25 W to 0.5 W, where W is the width of either path segment 100 or 200.

While FIGS. 2C and 2E show two layers of overlapping path segments 100 and 200, if desired, a third layer and/or additional layers may be deposited to partially overlap the first segment 100 and/or the second segment 200 at or adjacent locations where the first segment 100 and the second segment 200 overlap. This feature is shown as layer path segments 300 in dot-dash lines in FIGS. 2C and 2E. The third layer of path segments 300 may overlap the first layer of path segments 100 and/or the second layer of path segments 200 over any of the overlapping width and/or length ranges described above. The overlapping and substantially parallel path segments, e.g., each of path segments 100, 200, and/or 300 shown in FIGS. 2C and 2E, may have the same or different colors. In some examples, two or more of the overlapping and substantially parallel path segments may have the same general color but different shades of that color. These color features, if desired, can contribute to the interesting aesthetic characteristics of the upper component.

FIG. 2F shows additional path segment and/or path layer features that may be provided in at least some upper blanks 1000 and/or uppers in accordance with aspects of this invention. As mentioned above, one or more of the filament layers of an upper or upper blank 1000 may be formed by the extruder 102 (optionally as a continuous path). This filament path may form one or more of a lateral rear heel portion, a lateral midfoot portion, a forefoot portion, a medial midfoot portion, and/or a medial rear heel portion of the upper, the layer, and/or the upper blank 1000. In making these portions of the upper/upper blank 1000 from the thin extruded filaments, in some areas of the upper/upper blank 1000, the path segments 100 of an individual layer may be extruded to locations that are relatively close to one another, optionally extending in parallel. As shown in FIG. 2F, in one layer, the filament may be extruded into plural, non-intersecting, spaced apart path segments including at least 3 first non-intersecting path segments (100a-100e shown in FIG. 2F). In this illustrated example, each non-intersecting path segment (100a-100e) of the set of non-intersecting path segments of the individual layer is spaced apart from each directly adjacent non-intersecting path segments in the same layer by a spacing distance (S1 to S4 in FIG. 2F) of less than 10 mm over a length dimension L of at least 25 mm. In some examples, the spacing distance(s) S may be less than 8 mm, less than 6 mm, less than 5 mm, or even less than 3 mm and/or the length dimension L may be at least 15 mm, at least 50 mm, at least 75 mm, at least 100 mm, or even at least 150 mm. The path segments 100a to 100e widths W1 to W5, respectively, shown in FIG. 2F may have any of the width characteristics described above, e.g., in conjunction with FIGS. 2A and 2D. In some examples of this invention, a second layer (or even a third or more layers) of path segments will be deposited overlapping and/or in parallel with the segments 100a-100e shown in FIG. 2F, e.g., to overlap as shown in FIGS. 2C and 2E.

The spacing distances S, the width dimensions W, and/or the overlapping length dimensions L in a given layer may be constant or changing over the overall layer of the path segments. As some more specific examples, a filament in a layer (and optionally a continuous path of filament) may have a first thickness at a first region of the upper or upper blank 1000 and a second thickness at a second region of the upper or upper blank 1000, wherein the first thickness differs from the second thickness (and optionally may be within the ranges described above). Additionally or alternatively, if desired, a filament in a layer (and optionally a continuous path of filament) may have a first diameter and/or a first width at a first region of the upper or upper blank 1000 and a second diameter and/or a second width at a second region of the upper or upper blank 1000, wherein the first diameter and/or first width differs from the second diameter and/or second width (and optionally may be within the ranges described above). The different thicknesses, widths, and/or diameters of the filament within a layer may help control the properties of the upper and/or upper blank 1000 (e.g., strength, durability, flexibility, stretchability, breathability, support, etc.).

Figure 3A:
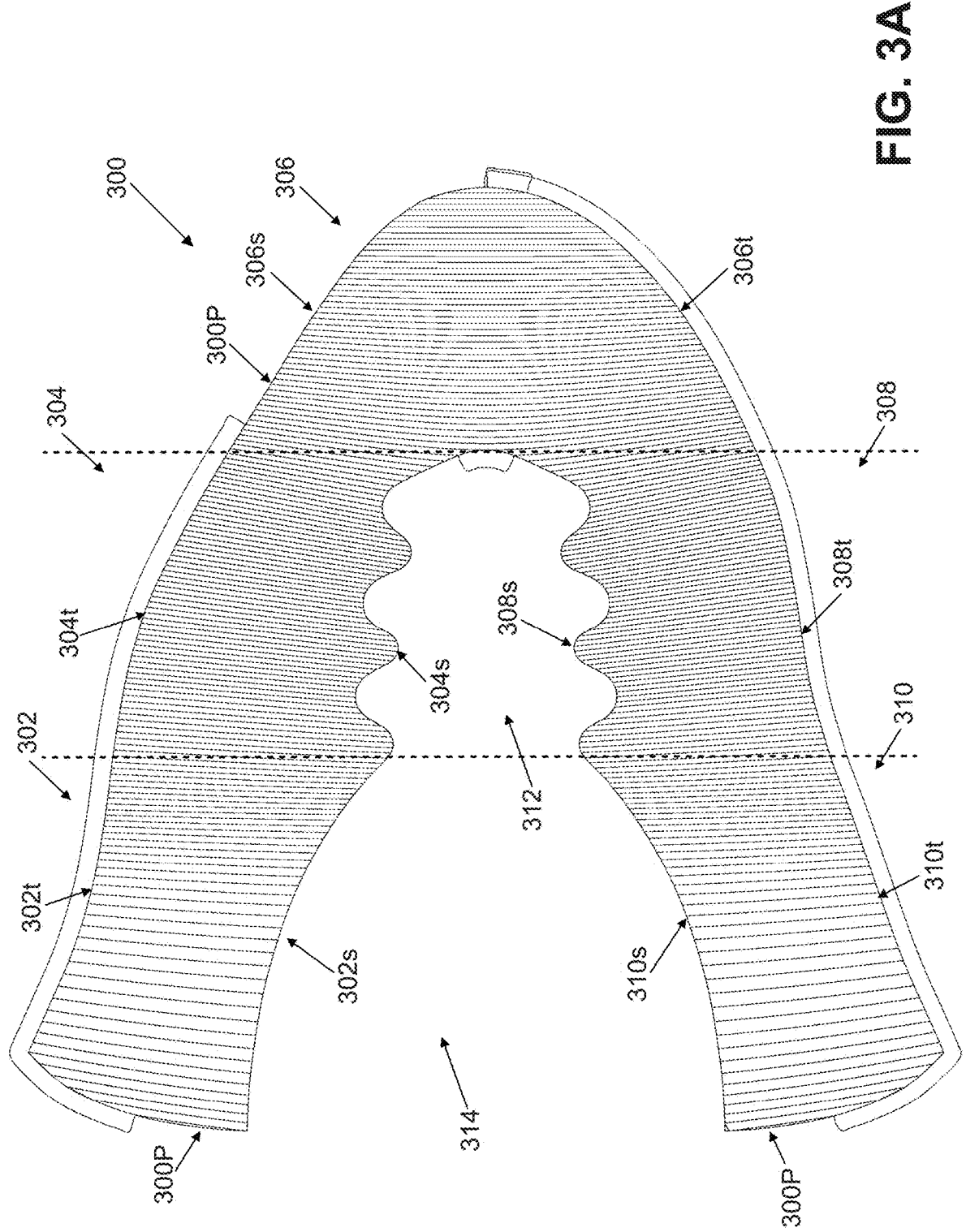
FIGS. 3A-3W show various layers of extruded filament, steps in making a multi-layer upper component from extruded filaments, and various features/properties of multi-layer upper components in accordance with examples of this invention.

Various features and examples of an upper or upper blank 1000 made from multiple layers of filament material, e.g., like that of FIG. 1, and method of making them are described in more detail below in conjunction with FIGS. 3A-3W. FIG. 3A shows an example first layer 300 of a first filament (e.g., having any of the filament features and characteristics described above) formed by extruding a first material into multiple path segments (e.g., having any of the path and/or path segment features described above), e.g., via a solid deposition modeling process. Optionally, this first layer 300 may be extruded as a first continuous path. In this illustrated example, the first path of the first filament (optionally as a continuous path) forms the following portions of the first layer 300: (a) a first lateral rear heel portion 302 (e.g., extending along and/or adjacent a lateral side 302s of the ankle/foot opening 314 of the first layer 300); (b) a first lateral midfoot portion 304 (e.g., extending along and/or adjacent a lateral side 304s (or an inner edge) of an instep opening 312 of the first layer 300); (c) a first forefoot portion 306 (e.g., which bridges from a lateral side to a medial side of the first layer 300, forward of the midfoot portions); (d) a first medial midfoot portion 308 (e.g., extending along and/or adjacent a medial side 308s (or inner edge) of the instep opening 312 of the first layer 300); and (e) a first medial rear heel portion 310 (e.g., extending along and/or adjacent a medial side 310s of the ankle/foot opening 314 of the first layer 300). The vertical dashed lines shown in FIG. 3A generally define and break the first layer 300 into three portions: (a) a posterior third (containing the lateral rear heel portion 302 and the medial rear heel portion 310), (b) a central third (containing the lateral midfoot portion 304 and the medial midfoot portion 308), and (c) an anterior third (containing the forefoot portion 306). In at least some examples of this invention, the first layer 300 will consist essentially of, or even consist of, this filament structure (optionally formed as a continuous path and/or as a one piece construction). The white space visible in FIG. 3A for this example first layer 300 constitutes open space between filament path segments (e.g., where one can see completely through the first layer 300).

While the path segments of the first layer 300 can be extruded in any desired order without departing from this invention, in some examples of this invention, the outer perimeter (e.g., 300P) may be extruded first, and then the remainder of the layer 300 can be extruded, e.g., in a "raster" like fashion, to fill in the area within the perimeter 300P. In this illustrated example, the extruded overall path of the first layer 300 lays down the first filament over much of the overall surface area of the first layer 300 as first plural, non-intersecting, spaced apart path segments that extend in a substantially medio-lateral direction of the first layer 300. Medio-lateral oriented and/or extending filaments of this type can help enhance the "lock down" features of the upper (e.g., help securely hold the foot down on the sole structure) and may help control/decrease stretchability. Along the lateral rear heel area 302 and the medial rear heel area 310, the first filament path segments extend generally from the ankle opening 302s/310s to a bottom perimeter portion 302t/310t of the first layer 300 (e.g., where the first layer 300 will meet a sole structure in a final article of footwear structure), where adjacent path segments of layer 300 extend substantially in parallel. Similarly, along the lateral midfoot area 304 and the medial midfoot area 308, the first filament path segments extend generally from the instep opening 312's inner edges 304s/308s to a bottom perimeter portion 304t/308t (outer edges) of the first layer 300 (e.g., where the first layer 300 will meet a sole structure in a final article of footwear structure), where adjacent path segments of the layer 300 extend substantially in parallel. At the forefoot region 306, the first filament path segments extend generally from the lateral bottom edge 306s to the medial bottom edge 306t of the first layer 300 (e.g., where the first layer 300 will meet a sole structure in a final article of footwear structure), where adjacent path segments of layer 300 extend substantially in parallel. The path segments in these various regions 302, 304, 306, 308, 310 may have any of the features and/or options described above for the path segments shown in FIGS. 2A-2F.

In the first layer 300, the path segments in one area need not have constant spacing from directly adjacent path segments at other areas of the first layer 300. For example, as shown in FIG. 3A, the plural, non-intersecting, spaced apart path segments in the forefoot region 306 and/or the midfoot regions 304/308 of the first layer 300 are spaced closer together than are the plural, non-intersecting, spaced apart path segments in the heel region(s) 302/310 of the first layer 300. The path segment spacings (e.g., S1 to S4 from FIG. 2E) can be selected to provide desired characteristics for individual regions of the layer 300, the upper, and/or the upper blank 1000 (e.g., desired stretchability, breathability, etc.).

Figure 3B:
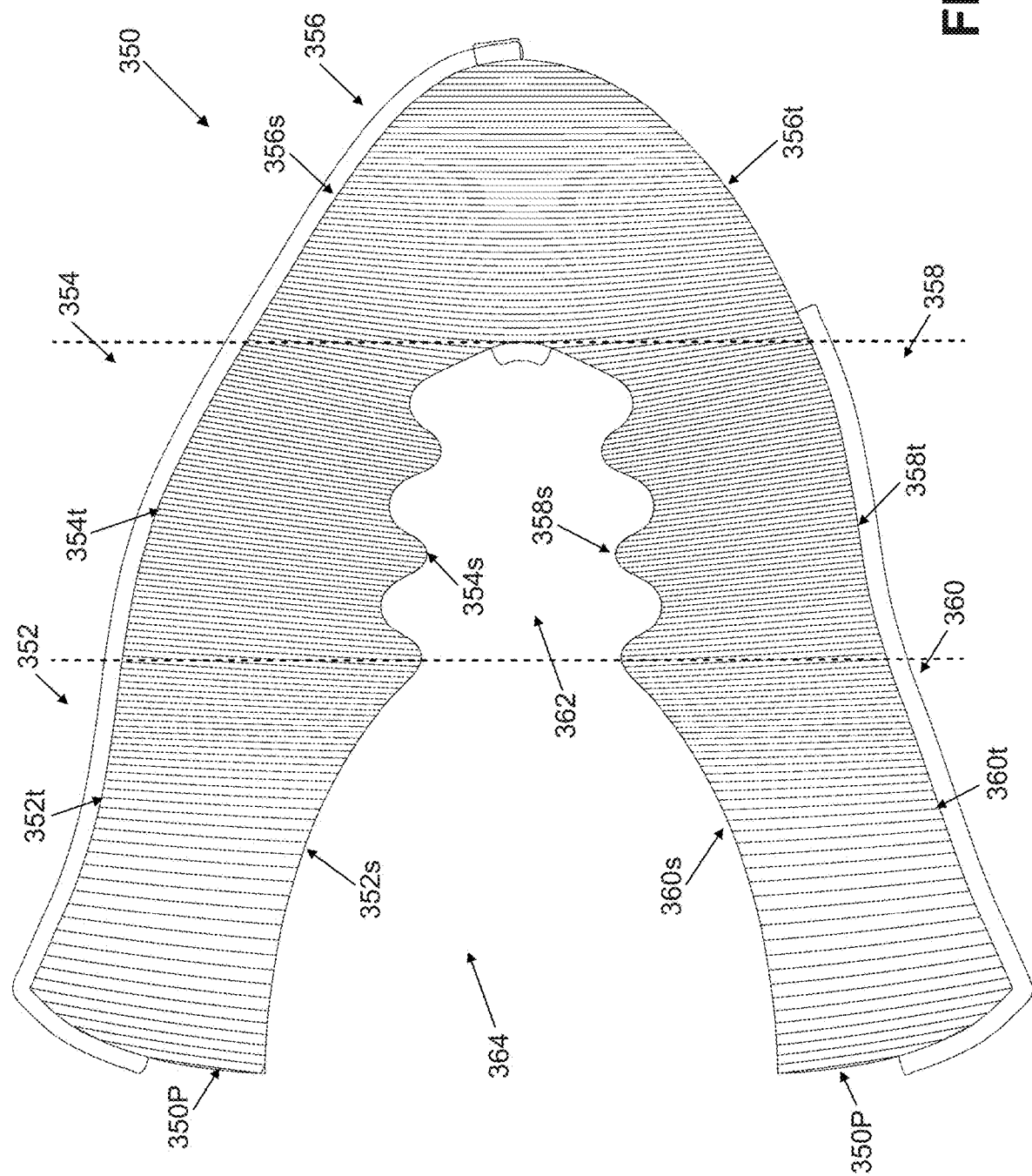
Figure 3C:
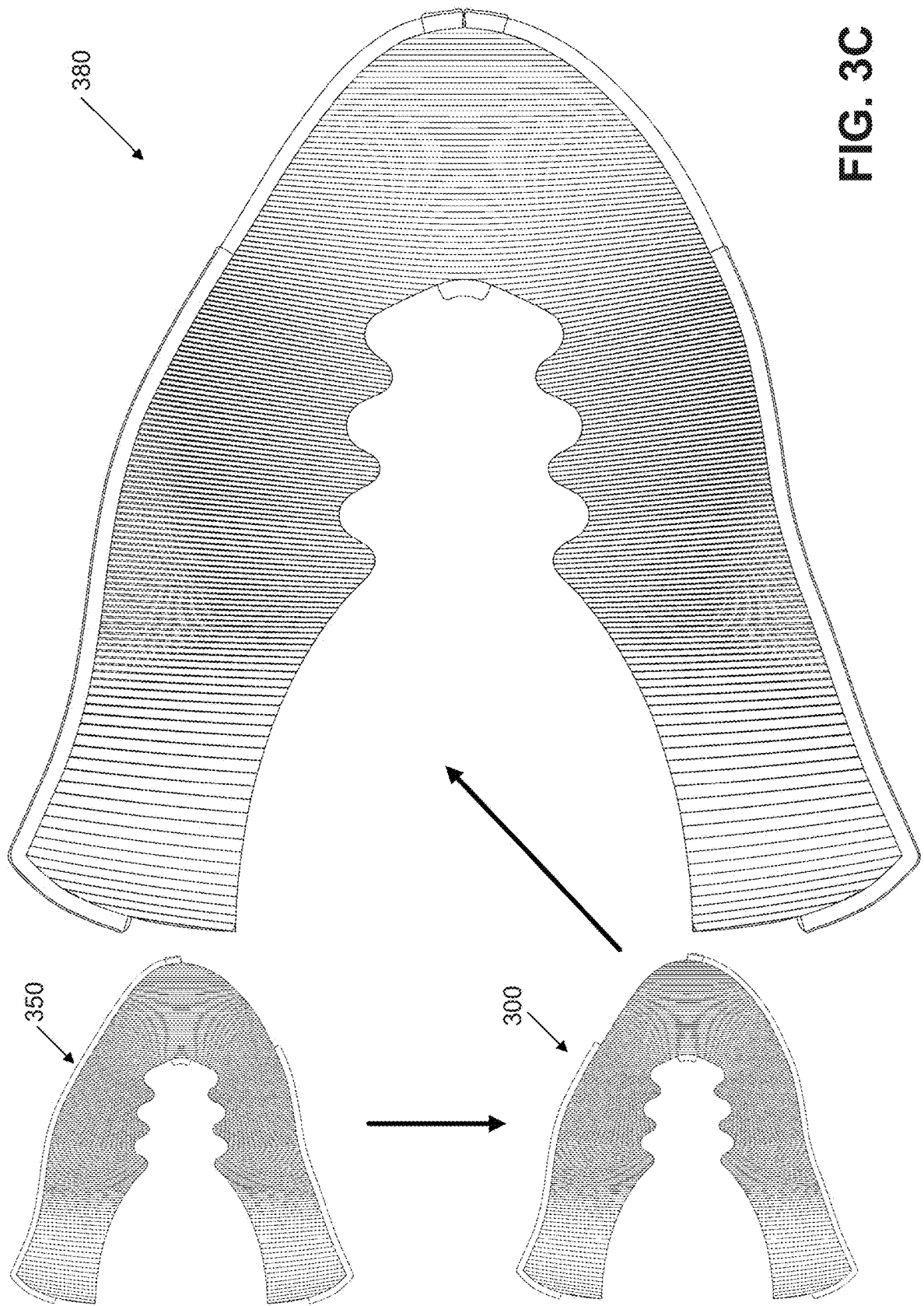

After the first layer 300 is extruded (e.g., onto a substrate 106), a second layer 350 of the overall upper or upper blank 1000 then may be applied to the first layer 300. FIG. 3B shows the individual path segments of this example second layer 350, and FIG. 3C schematically shows the production of the second layer 350 onto the previously prepared first layer 300 to create the combined first and second layers 380 of the upper or upper blank 1000. More specifically, FIG. 3B shows a second layer 350 formed of a second filament (e.g., having any of the filament features and characteristics described above) and formed by extruding a second material into multiple path segments (e.g., having any of the path and/or path segment features described above), e.g., via a solid deposition modeling process. Optionally, this second layer 350 may be extruded as a second continuous path. In this illustrated example, the second path of the second filament (optionally as a continuous path) forms the following portions of second layer 350: (a) a second lateral rear heel portion 352 (e.g., extending along and/or adjacent a lateral side 352s of the ankle/foot opening 364 of the second layer 350); (b) a second lateral midfoot portion 354 (e.g., extending along and/or adjacent a lateral side 354s of an instep opening 362 (or an inner edge) of the second layer 350); (c) a second forefoot portion 356 (e.g., which bridges from a lateral side to a medial side of the second layer 350, forward of the midfoot portions); (d) a second medial midfoot portion 358 (e.g., extending along and/or adjacent a medial side 358s of the instep opening 362 (or an inner edge) of the second layer 350); and (e) a second medial rear heel portion 360 (e.g., extending along and/or adjacent a medial side 360s of the ankle/foot opening 364 of the second layer 350). The vertical dashed lines shown in FIG. 3B generally define and break the second layer 350 into three portions: (a) a posterior third (containing the lateral rear heel portion 352 and the medial rear heel portion 360), (b) a central third (containing the lateral midfoot portion 354 and the medial midfoot portion 358), and (c) an anterior third (containing the forefoot portion 356). In at least some examples of this invention, the second layer 350 will consist essentially of, or even consist of, this filament structure (optionally formed as a continuous path and/or a one piece construction). The white space visible in FIG. 3B for this example second layer 350 constitutes open space between filament path segments (e.g., where one can see completely through the second layer 350).

While the path segments of the second layer 350 can be extruded in any desired order without departing from this invention, in some examples of this invention, the outer perimeter (e.g., 350P) may be extruded first, and then the remainder of the layer 350 can be extruded, e.g., in a "raster" like fashion, to fill in the area within the perimeter 350P. In this illustrated example, the extruded overall path of the second layer 350 lays down the second filament over much of the overall surface area of the second layer 350 as second plural, non-intersecting, spaced apart path segments that extend in a substantially medio-lateral direction of the second layer 350 (e.g., to help provide the "lock down" or other features describe above for layer 300). Along the lateral rear heel area 352 and the medial rear heel area 360, the second filament path segments extend generally from the ankle opening 352s/360s to a bottom perimeter portion 352t/360t of the second layer 350 (e.g., where the second layer 350 will meet a sole structure in a final article of footwear structure), where adjacent path segments of layer 350 extend substantially in parallel. Similarly, along the lateral midfoot area 354 and the medial midfoot area 358, the second filament path segments extend generally from the instep opening 362's inner edges 354s/358s to a bottom perimeter portion 354t/358t (outer edges) of the second layer 350 (e.g., where the second layer 350 will meet a sole structure in a final article of footwear structure), where adjacent path segments of layer 350 extend substantially in parallel. At the forefoot region 356, the second filament path segments extend generally from the lateral bottom edge 356s to the medial bottom edge 356t of the second layer 350 (e.g., where the second layer 350 will meet a sole structure in a final article of footwear structure), where adjacent path segments of layer 350 extend substantially in parallel. The path segments in these various regions 352, 354, 356, 358, 360 may have any of the features and/or options described above for the path segments shown in FIGS. 2A-2F.

In the second layer 350, the path segments in one area need not have constant spacing from directly adjacent path segments at other areas of the second layer 350. For example, as shown in FIG. 3B, the plural, non-intersecting, spaced apart path segments in the forefoot region 356 and/or the midfoot regions 354/358 of the second layer 350 are spaced closer together than are the plural, non-intersecting, spaced apart path segments in the heel region(s) 352/360 of the second layer 350. The path segment spacings (e.g., S1 to S4 from FIG. 2E) can be selected to provide desired characteristics for individual regions of the layer 350, the upper, and/or the upper blank 1000 (e.g., desired stretchability, breathability, etc.).

As evident from a comparison of FIGS. 3A and 3B, the path segments of first layer 300 and second layer 350 extend over a substantial portion of their overall paths in a generally parallel manner. Thus, the path segments of the second layer 350 may be extruded generally in parallel and/or to overlap the path segments of the first layer 300 over much of their overall path lengths in a manner as shown in FIGS. 2C and 2E. If desired: (a) at least 25% (and in some examples, at least 40%, at least 50%, at least 60%, at least 75%, at least 85%, or even at least 90%) of the overall path length of the second layer 350 will overlap with path segments of the first layer 300 in the manner shown in FIGS. 2C and 2E and/or (b) at least 25% (and in some examples, at least 40%, at least 50%, at least 60%, at least 75%, at least 85%, or even at least 90%) of the overall path length of the first layer 300 will overlap with path segments of the second layer 350 in the manner shown in FIGS. 2C and 2E. Thus, filaments of the second layer 350 will directly contact filaments of the first layer 300 (at overlapping contact area 202) as the second layer 350 is being extruded. Heat from the second layer 350 as it is being extruded (and/or another heat source) causes the second filament path segments to fuse together with the first filament path segments at location(s) 202 where they contact one another (e.g., the filament material of the second layer 350 may polymerize with and seamlessly join the filament material of the first layer 300). In this manner, the first layer 300 of the upper or upper blank 1000 can be fixedly joined to the second layer 350 of the upper or upper blank 1000 in an adhesive free manner at contact location(s) 202 to form the combined first and second layers 380 of FIG. 3C. The upper component or intermediate including the combined first and second layers 380 constitutes a unitary construction in which the first layer 300 and the second layer 350 are fixed together only in a non-adhesive fused manner. The upper component or intermediate including the combined first and second layers 380 may consist essentially of, or even consist of, the first layer 300 and the second layer 350.

Figure 3D:
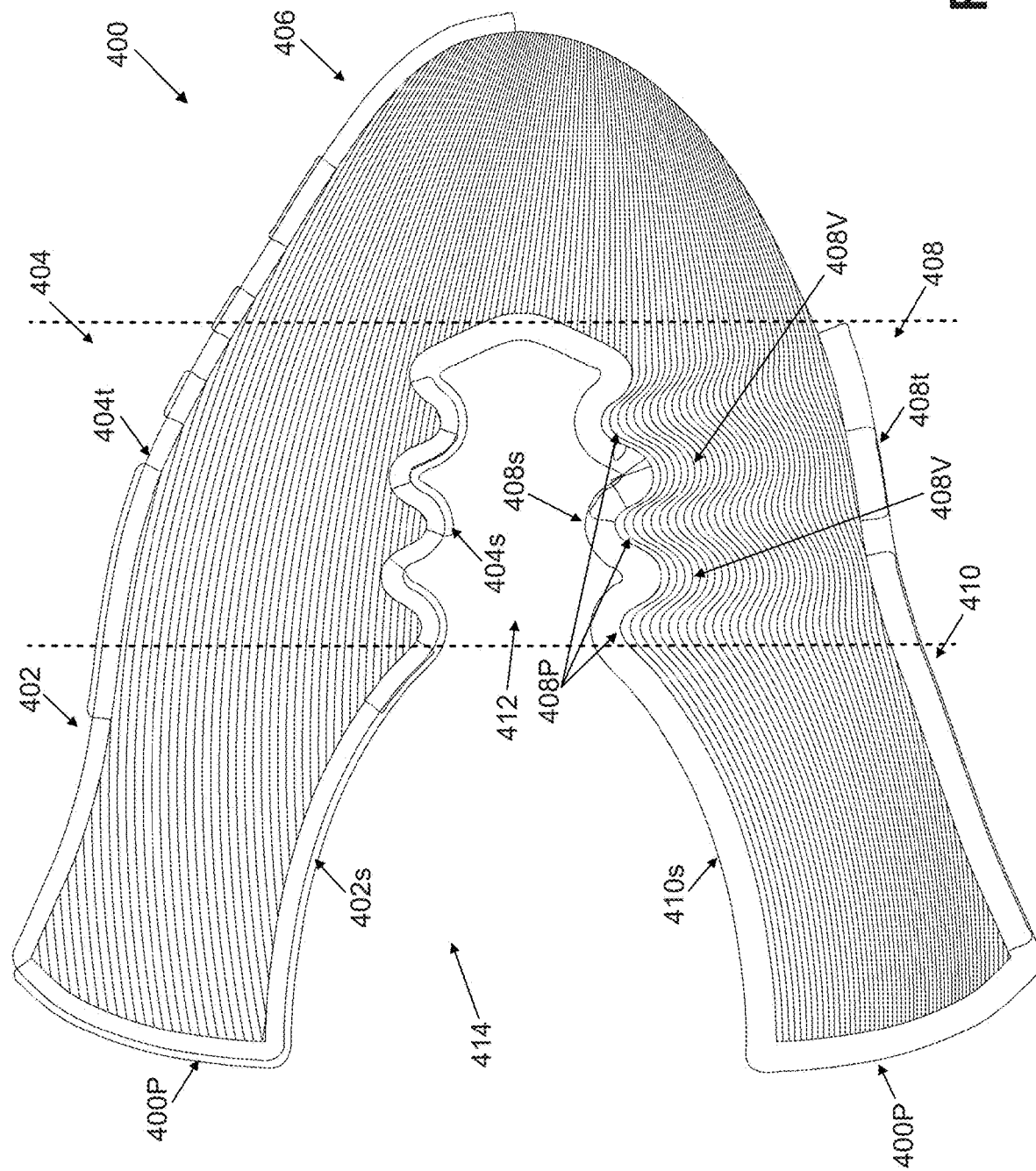

After the second layer 350 is extruded (e.g., onto first layer 300 and/or substrate 106), a third layer 400 of the overall upper or upper blank 1000 then may be applied to the combined first and second layers 380. FIG. 3D shows the individual path segments of this example third layer 400, and FIG. 3E schematically shows the production of the third layer 400 onto the previously prepared combined first and second layers 380 to create the combined first through third layers 440 of the upper or upper blank 1000. More specifically, FIG. 3D shows a third layer 400 formed of a third filament (e.g., having any of the filament features and characteristics described above) and formed by extruding a third material into multiple path segments (e.g., having any of the path and/or path segment features described above), e.g., via a solid deposition modeling process. Optionally, this third layer 400 may be extruded as a third continuous path. In this illustrated example, the third path of the third filament (optionally as a continuous path) forms the following portions of the third layer 400: (a) a third lateral rear heel portion 402 (e.g., extending along and/or adjacent a lateral side 402s of the ankle/foot opening 414 of the third layer 400); (b) a third lateral midfoot portion 404 (e.g., extending along and/or adjacent a lateral side 404s (or an inner edge) of an instep opening 412 of the third layer 400); (c) a third forefoot portion 406 (e.g., which bridges from a lateral side to a medial side of the third layer 400, forward of the midfoot portions); (d) a third medial midfoot portion 408 (e.g., extending along and/or adjacent a medial side 408s (or an inner edge) of the instep opening 412 of the third layer 400); and (e) a third medial rear heel portion 410 (e.g., extending along and/or adjacent a medial side 410s of the ankle/foot opening 414 of the third layer 400). The vertical dashed lines shown in FIG. 3D generally define and break the third layer 400 into three portions: (a) a posterior third (containing the lateral rear heel portion 402 and the medial rear heel portion 410), (b) a central third (containing the lateral midfoot portion 404 and the medial midfoot portion 408), and (c) an anterior third (containing the forefoot portion 406). In at least some examples of this invention, the third layer 400 will consist essentially of, or even consist of, this filament structure (optionally formed as a continuous path and/or one piece construction). The white space visible in FIG. 3D for this example third layer 400 constitutes open space between filament path segments (e.g., where one can see completely through the third layer 400).

While the path segments of the third layer 400 can be extruded in any desired order without departing from this invention, in some examples of this invention, the outer perimeter (e.g., 400P) may be extruded first, and then the remainder of the third layer 400 can be extruded, e.g., in a "raster" like fashion, to fill in the area within the perimeter 400P. In this illustrated example, the extruded overall path of the third layer 400 lays down the third filament over much of the overall surface area of the third layer 400 as third plural, non-intersecting, spaced apart path segments that extend in a substantially anterior-posterior direction of the third layer 400. As shown in FIG. 3D, in the lateral rear heel portion 402, the lateral midfoot portion 404, the forefoot portion 406, and the medial rear heel portion 410, the third plural, non-intersecting path segments of the third layer 400 extend in a gently curved manner in a direction from the rear heel portion 402/410 forward. In the medial midfoot portion 408, however, at least some of the third plural, non-intersecting, spaced apart path segments extend in a serpentine configuration including at least two peaks (408P) and at least two valleys (408V). The path segments in these various regions 402, 404, 406, 408, 410 may have any of the features and/or options described above for the path segments shown in FIGS. 2A-2F.

As further shown in FIG. 3D, the third path of filament defines a first inner edge at lateral instep opening edge 404s, a first outer edge 404t at lateral midfoot region 404, a second inner edge at medial instep opening edge 408s, and a second outer edge 408t at medial midfoot region 408. An instep opening 412 for the third layer 400 is defined between the first inner edge at 404s and the second inner edge at 408s. The third path of the filament in this example layer 400 includes: (a) first plural, non-intersecting, spaced apart path segments located between the first inner edge at 404s and the first outer edge 404t, wherein the first plural, non-intersecting, spaced apart path segments of the third path are linear and/or curved without defining plural peaks and valleys and/or (b) second plural, non-intersecting, spaced apart path segments located between the second inner edge at 408s and the second outer edge 408t, wherein a plurality of the second plural, non-intersecting, spaced apart path segments of the third continuous path located between the second inner edge at 408s and the second outer edge 408t extend in a serpentine configuration and have at least two peaks 408P and at least two valleys 408V. The third layer 400 of FIG. 3D may include at least 4 path segments, at least 6 path segments, at least 8 path segments, at least 10 path segments, or even at least 12 path segments that extend substantially in parallel and/or have the noted serpentine configuration.

In the third layer 400, the path segments in one area need not have constant spacing from directly adjacent path segments at other areas of the third layer 400. For example, as shown in FIG. 3D, the plural, non-intersecting, spaced apart path segments in the forefoot region 406 of the third layer 400 are spaced closer together than are the plural, non-intersecting, spaced apart path segments in the midfoot region(s) 404/408 and/or the plural, non-intersecting, spaced apart path segments in the forefoot region 406 and/or the midfoot region(s) 404/408 are spaced closer together than are the plural, non-intersecting, spaced apart path segments in the heel region(s) 402/410 of the third layer 400.

As evident from a comparison of FIG. 3D with FIGS. 3A and 3B, the path segments of third layer 400 will substantially intersect the path segments of the first layer 300 and the second layer 350 over a substantial portion of their overall paths. The intersecting path segments form a grid or generally matrix pattern, which can be seen in the combined first through third layers 440 shown in FIG. 3E. The path segments of the third layer 400 may intersect the path segments of the first layer 300 and/or the second layer 350 at any desired angles, e.g., from 5° to 175°, and in some examples, from 15° to 165°, from 25° to 155°, from 35° to 145°, from 45° to 135°, from 55° to 125°, from 60° to 120°, from 65° to 90°, etc. In at least some examples of this invention: (a) the third path of the third layer 400 will overlap the first path of the first layer 300 over less than 50% (and in some examples less than 40%, less than 30%, less than 20%, or even less than 10%) of an overall length of the third path, (b) the third path of the third layer 400 will overlap the second path of the second layer 350 over less than 50% (and in some examples less than 40%, less than 30%, less than 20%, or even less than 10%) of an overall length of the third path, (c) the third path of the third layer 400 will overlap the first path of the first layer 300 over less than 50% (and in some examples less than 40%, less than 30%, less than 20%, or even less than 10%) of an overall length of the first path, and/or (d) the third path of the third layer will overlap the second path of the second layer 350 over less than 50% (and in some examples less than 40%, less than 30%, less than 20%, or even less than 10%) of an overall length of the second path.

Thus, filaments of the third layer 400 will directly contact filaments of the first layer 300 and the filaments of the second layer (at intersecting contact area 202) as the third layer 400 is being extruded. Heat from the third layer 400 as it is being extruded (and/or another heat source) causes the third filament path segments to fuse together with either or both of the first filament path segments and/or the second filament path segments at location(s) 202 where the third filament path segments contact either or both of the first filament path segments and/or the second filament path segments (e.g., the filament material of the third layer 400 may polymerize with and seamlessly join the filament materials of the first layer 300 and/or the second layer 350). In this manner, the third layer 400 of the upper or upper blank 1000 can be fixedly joined to the first layer 300 and the second layer 350 of the upper or upper blank 1000 in an adhesive free manner at contact location(s) 202 to form the combined first through third layers 440. The upper component or intermediate including the combined first through third layers 440 constitutes a unitary construction in which the first layer 300, the second layer 350, and the third layer 400 are fixed together only in a non-adhesive fused manner. The upper component or intermediate including the combined first and third layers 440 may consist essentially of, or even consist of, the first layer 300, the second layer 350, and the third layer 400.

Figure 3G:
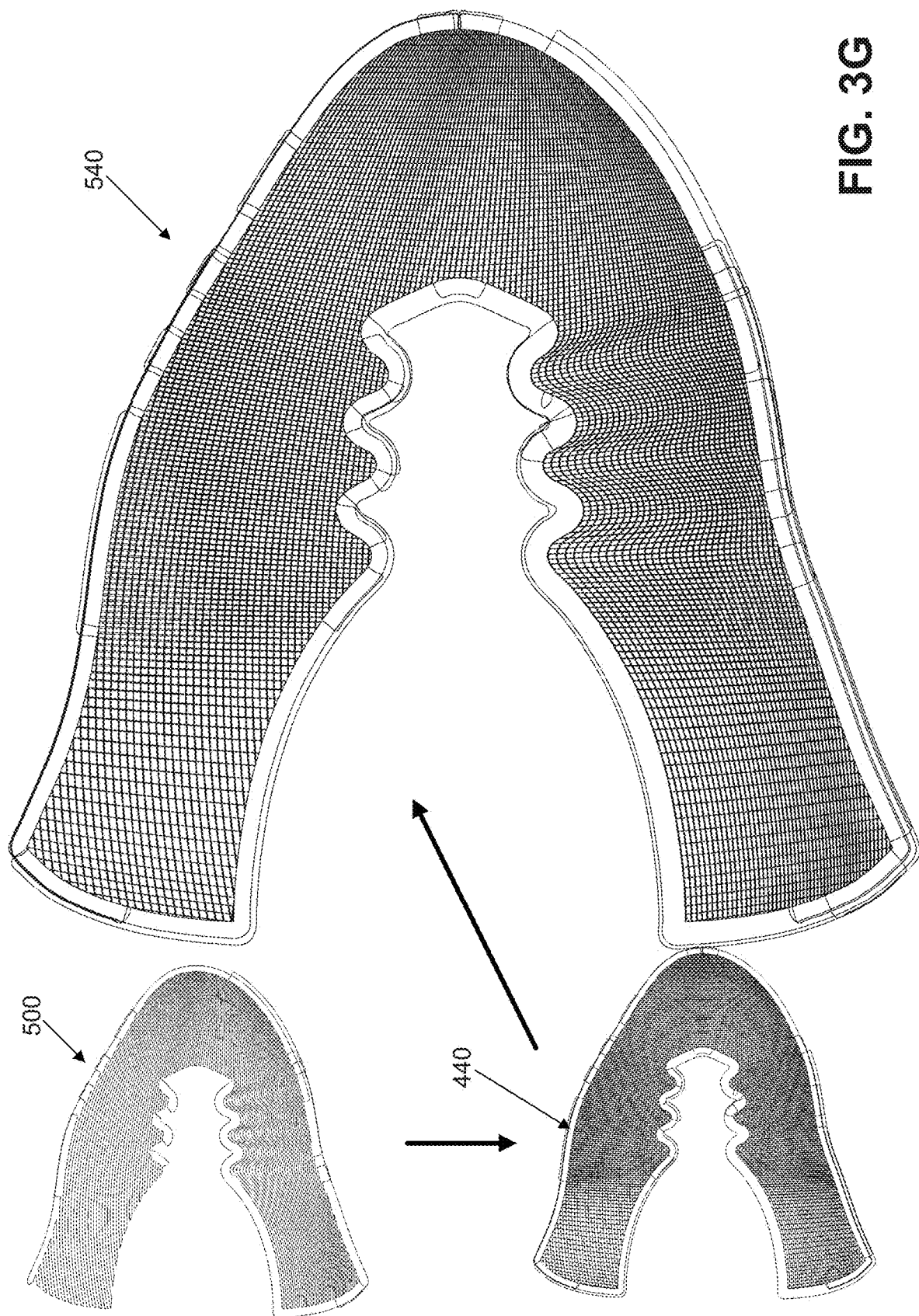

After the third layer 400 is extruded (e.g., onto first layer 300, second layer 350, and/or substrate 106), a fourth layer 500 of the overall upper or upper blank 1000 then may be applied to the combined first through third layers 440. FIG. 3F shows the individual path segments of this example fourth layer 500, and FIG. 3G schematically shows the production of the fourth layer 500 onto the previously prepared combined first through third layers 440 to create the combined first through fourth layers 540 of the upper or upper blank 1000. More specifically, FIG. 3F shows a fourth layer 500 formed of a fourth filament (e.g., having any of the filament features and characteristics described above) and formed by extruding a fourth material into multiple path segments (e.g., having any of the path and/or path segment features described above), e.g., via a solid deposition modeling process. Optionally, this fourth layer 500 may be extruded as a fourth continuous path. In this illustrated example, the fourth path of the fourth filament (optionally as a continuous path) forms the following portions of the fourth layer 500: (a) a fourth lateral rear heel portion 502 (e.g., extending along and/or adjacent a lateral side 502s of the ankle/foot opening 514 of the fourth layer 500); (b) a fourth lateral midfoot portion 504 (e.g., extending along and/or adjacent a lateral side 504s (or an inner edge) of an instep opening 512 of the fourth layer 500); (c) a fourth forefoot portion 506 (e.g., which bridges from a lateral side to a medial side of the fourth layer 500, forward of the midfoot portions); (d) a fourth medial midfoot portion 508 (e.g., extending along and/or adjacent a medial side 508s (or an inner edge) of the instep opening 512 of the fourth layer 500); and (e) a fourth medial rear heel portion 510 (e.g., extending along and/or adjacent a medial side 510s of the ankle/foot opening 514 of the fourth layer 500). The vertical dashed lines shown in FIG. 3F generally define and break the fourth layer 500 into three portions: (a) a posterior third (containing the lateral rear heel portion 502 and the medial rear heel portion 510), (b) a central third (containing the lateral midfoot portion 504 and the medial midfoot portion 508), and (c) an anterior third (containing the forefoot portion 506). In at least some examples of this invention, the fourth layer 500 will consist essentially of, or even consist of, this filament structure (optionally formed as a continuous path and/or a one piece construction). The white space visible in FIG. 3F for this example fourth layer 500 constitutes open space between filament path segments (e.g., where one can see completely through the fourth layer 500).

While the path segments of the fourth layer 500 can be extruded in any desired order without departing from this invention, in some examples of this invention, the outer perimeter (e.g., 500P) may be extruded first, and then the remainder of the fourth layer 500 can be extruded, e.g., in a "raster" like fashion, to fill in the area within the perimeter 500P. In this illustrated example, the extruded overall path of the fourth layer 500 lays down the fourth filament over much of the overall surface area of the fourth layer 500 as fourth plural, non-intersecting, spaced apart path segments that extend in a substantially anterior-posterior direction of the fourth layer 500. As shown in FIG. 3F, in the lateral rear heel portion 502, the lateral midfoot portion 504, the forefoot portion 506, and the medial rear heel portion 510, the fourth plural, non-intersecting path segments extend in a gently curved manner in a direction from the rear heel portion 502/510 forward. In the medial midfoot portion 508, however, at least some of the fourth plural, non-intersecting, spaced apart path segments of the fourth layer 500 extend in a serpentine configuration including at least two peaks (508P) and at least two valleys (508V). The path segments in these various regions 502, 504, 506, 508, 510 may have any of the features and/or options described above for the path segments shown in FIGS. 2A-2F.

As further shown in FIG. 3F, the fourth path of filament defines a first inner edge at lateral instep opening edge 504s, a first outer edge 504t at lateral midfoot region 504, a second inner edge at medial instep opening edge 508s, and a second outer edge 508t at medial midfoot region 508. An instep opening 512 for the fourth layer 500 is defined between the first inner edge at 504s and the second inner edge at 508s. The fourth path of the filament in this example layer 500 includes: (a) first plural, non-intersecting, spaced apart path segments located between the first inner edge at 504s and the first outer edge 504t, wherein the first plural, non-intersecting, spaced apart path segments of the fourth path are linear and/or curved without defining plural peaks and valleys and/or (b) second plural, non-intersecting, spaced apart path segments located between the second inner edge at 508s and the second outer edge 508t, wherein a plurality of the second plural, non-intersecting, spaced apart path segments of the fourth path located between the second inner edge at 508s and the second outer edge 508t extend in a serpentine configuration and have at least two peaks 508P and at least two valleys 508V. The fourth layer 500 of FIG. 3F may include at least 4 path segments, at least 6 path segments, at least 8 path segments, at least 10 path segments, or even at least 12 path segments that extend substantially in parallel and/or have the noted serpentine configuration.

As evident from a comparison of FIGS. 3D and 3F, the path segments of third layer 400 and fourth layer 500 extend over a substantial portion of their overall paths in a generally parallel manner. Thus, the path segments of the fourth layer 500 may be extruded generally in parallel and/or to overlap the path segments of the third layer 400 over much of their overall path lengths in a manner as shown in FIGS. 2C and 2E. If desired: (a) at least 25% (and in some examples, at least 40%, at least 50%, at least 60%, at least 75%, at least 85%, or even at least 90%) of the overall path length of the fourth layer 500 will overlap with path segments of the third layer 400 in the manner shown in FIGS. 2C and 2E and/or (b) at least 25% (and in some examples, at least 40%, at least 50%, at least 60%, at least 75%, at least 85%, or even at least 90%) of the overall path length of the third layer 400 will overlap with path segments of the fourth layer 500 in the manner shown in FIGS. 2C and 2E. In at least some examples of this invention: (a) the fourth path of the fourth layer 500 will overlap the first path of the first layer 300 over less than 50% (and in some examples less than 40%, less than 30%, less than 20%, or even less than 10%) of an overall length of the fourth path, (b) the fourth path of the fourth layer 500 will overlap the second path of the second layer 350 over less than 50% (and in some examples less than 40%, less than 30%, less than 20%, or even less than 10%) of an overall length of the fourth path, (c) the fourth path of the fourth layer 500 will overlap the first path of the first layer 300 over less than 50% (and in some examples less than 40%, less than 30%, less than 20%, or even less than 10%) of an overall length of the first path, and/or (d) the fourth path of the fourth layer 500 will overlap the second path of the second layer 350 over less than 50% (and in some examples less than 40%, less than 30%, less than 20%, or even less than 10%) of an overall length of the second path.

Thus, filaments of the fourth layer 500 will directly contact filaments of the third layer 400 (at overlapping contact area 202) as the fourth layer 500 is being extruded. Heat from the fourth layer 500 as it is being extruded (and/or another heat source) causes the fourth filament path segments to fuse together with the third filament path segments at location(s) 202 where they contact one another (e.g., the filament material of the fourth layer 500 may polymerize with and seamlessly join the filament material of the third layer 400). In this manner, the third layer 400 of the upper or upper blank 1000 can be fixedly joined to the fourth layer 500 of the upper or upper blank 1000 in an adhesive free manner at contact location(s) 202.

As also evident from a comparison of FIG. 3F with FIGS. 3A and 3B, the path segments of fourth layer 500 will substantially intersect the path segments of the first layer 300 and the second layer 350 over a substantial portion of their overall paths. The intersecting path segments form a grid or generally matrix pattern, which can be seen in the combined first through fourth layers 540 shown in FIG. 3G. The path segments of the fourth layer 500 may intersect the path segments of the first layer 300 and/or the second layer 350 at any desired angles, e.g., from 5° to 175°, and in some examples, from 15° to 165°, from 25° to 155°, from 35° to 145°, from 45° to 135°, from 55° to 125°, from 60° to 120°, from 65° to 90°, etc. Thus, filaments of the fourth layer 500 will directly contact filaments of the first layer 300 and filaments of the second layer 350 (at intersecting contact area 202) as the fourth layer 500 is being extruded. Heat from the fourth layer 500 as it is being extruded (and/or another heat source) causes the fourth filament path segments to fuse together with either or both of the first filament path segments and/or the second filament path segments at location(s) 202 where the fourth filament path segments contact either or both of the first filament path segments and/or the second filament path segments (e.g., the filament material of the fourth layer 500 may polymerize with and seamlessly join the filament materials of the first layer 300 and/or the second layer 350).

In these manners, the fourth layer 500 of the upper or upper blank 1000 can be fixedly joined to the first layer 300, the second layer 350, and the third layer 400 of the upper or upper blank 1000 in an adhesive free manner at contact location(s) 202 to form the combined first through fourth layers 540. The upper component or intermediate including the combined first through fourth layers 540 constitutes a unitary construction in which the first layer 300, the second layer 350, the third layer 400, and the fourth layer 500 are fixed together only in a non-adhesive fused manner. The upper component or intermediate including the combined first through fourth layers 540 may consist essentially of, or even consist of, the first layer 300, the second layer 350, the third layer 400, and the fourth layer 500.

In the fourth layer 500, the path segments in one area need not have constant spacing from directly adjacent path segments at other areas of the fourth layer 500. For example, as shown in FIG. 3F, the plural, non-intersecting, spaced apart path segments in the forefoot region 506 of the fourth layer 500 are spaced closer together than are the plural, non-intersecting, spaced apart path segments in the midfoot region(s) 504/508 and/or the plural, non-intersecting, spaced apart path segments in the forefoot region 506 and/or the midfoot region(s) 504/508 are spaced closer together than are the plural, non-intersecting, spaced apart path segments in the heel region(s) 502/510 of the fourth layer 500.

Figure 3H:
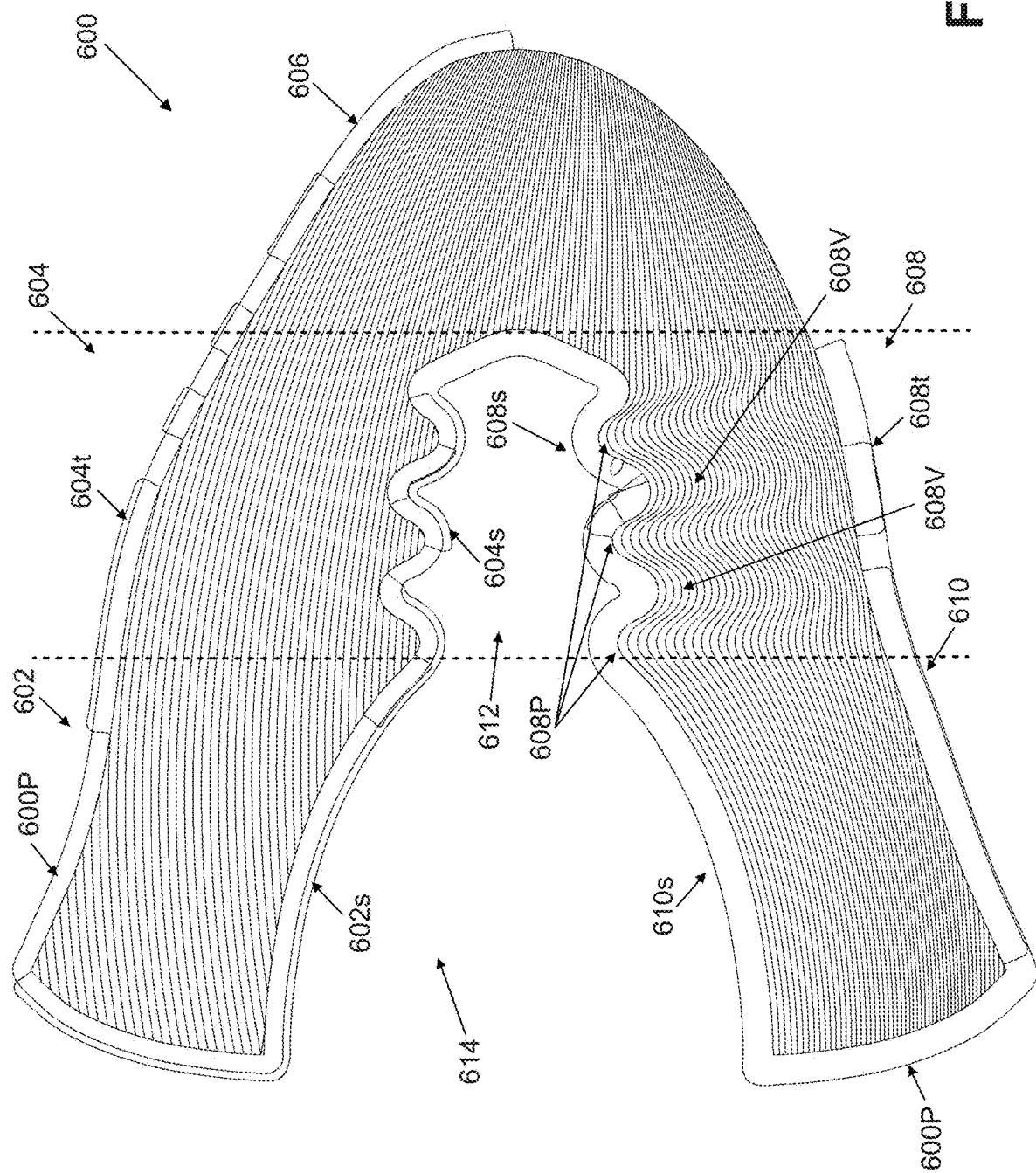

After the fourth layer 500 is extruded (e.g., onto first layer 300, second layer 350, third layer 400, and/or substrate 106), a fifth layer 600 of the overall upper or upper blank 1000 then may be applied to the combined first through fourth layers 540. FIG. 3H shows the individual path segments of this example fifth layer 600, and FIG. 3I schematically shows the production of the fifth layer 600 onto the previously prepared combined first through fourth layers 540 to create the combined first through fifth layers 640 of the upper or upper blank 1000. More specifically, FIG. 3H shows a fifth layer 600 formed of a fifth filament (e.g., having any of the filament features and characteristics described above) and formed by extruding a fifth material into multiple path segments (e.g., having any of the path and/or path segment features described above), e.g., via a solid deposition modeling process. Optionally, this fifth layer 600 may be extruded as a fifth continuous path. In this illustrated example, the fifth path of the fifth filament (optionally as a continuous path) forms the following portions of the fifth layer 600: (a) a fifth lateral rear heel portion 602 (e.g., extending along and/or adjacent a lateral side 602s of the ankle/foot opening 614 of the fifth layer 600); (b) a fifth lateral midfoot portion 604 (e.g., extending along and/or adjacent a lateral side 604s (or an inner edge) of an instep opening 612 of the fifth layer 600); (c) a fifth forefoot portion 606 (e.g., which bridges from a lateral side to a medial side of the fifth layer 600, forward of the midfoot portions); (d) a fifth medial midfoot portion 608 (e.g., extending along and/or adjacent a medial side 608s of the instep opening 612 of the fifth layer 600); and (e) a fifth medial rear heel portion 610 (e.g., extending along and/or adjacent a medial side 610s (or an inner edge) of the ankle/foot opening 614 of the fifth layer 600). The vertical dashed lines shown in FIG. 3H generally define and break the fifth layer 600 into three portions: (a) a posterior third (containing the lateral rear heel portion 602 and the medial rear heel portion 610), (b) a central third (containing the lateral midfoot portion 604 and the medial midfoot portion 608), and (c) an anterior third (containing the forefoot portion 606). In at least some examples of this invention, the fifth layer 600 will consist essentially of, or even consist of, this filament structure (optionally formed as a continuous path and/or one piece construction). The white space visible in FIG. 3H for this example fifth layer 600 constitutes open space between filament path segments (e.g., where one can see completely through the fifth layer 600).

While the path segments of the fifth layer 600 can be extruded in any desired order without departing from this invention, in some examples of this invention, the outer perimeter (e.g., 600P) may be extruded first, and then the remainder of the fifth layer 600 can be extruded, e.g., in a "raster" like fashion, to fill in the area within the perimeter 600P. In this illustrated example, the extruded overall path of the fifth layer 600 lays down the fifth filament over much of the overall surface area of the fifth layer 600 as fifth plural, non-intersecting, spaced apart path segments that extend in a substantially anterior-posterior direction of the fifth layer 600. As shown in FIG. 3H, in the lateral rear heel portion 602, the lateral midfoot portion 604, the forefoot portion 606, and the medial rear heel portion 610, the fifth plural, non-intersecting path segments of the fifth layer 600 extend in a gently curved manner in a direction from the rear heel portion 602/610 forward. In the medial midfoot portion 608, however, at least some of the fifth plural, non-intersecting, spaced apart path segments extend in a serpentine configuration including at least two peaks (608P) and at least two valleys (608V). The path segments in these various regions 602, 604, 606, 608, 610 may have any of the features and/or options described above for the path segments shown in FIGS. 2A-2F.

As further shown in FIG. 3H, the fifth path of filament defines a first inner edge at lateral instep opening edge 604s, a first outer edge 604t at lateral midfoot region 604, a second inner edge at medial instep opening edge 608s, and a second outer edge 608t at medial midfoot region 608. An instep opening 612 for the fifth layer 600 is defined between the first inner edge at 604s and the second inner edge at 608s. The fifth path of the filament in this example layer 600 includes: (a) first plural, non-intersecting, spaced apart path segments located between the first inner edge at 604s and the first outer edge 604t, wherein the first plural, non-intersecting, spaced apart path segments of the fifth path are linear and/or curved without defining plural peaks and valleys and/or (b) second plural, non-intersecting, spaced apart path segments located between the second inner edge at 608s and the second outer edge 608t, wherein a plurality of the second plural, non-intersecting, spaced apart path segments of the fifth path located between the second inner edge at 608s and the second outer edge 608t extend in a serpentine configuration and have at least two peaks 608P and at least two valleys 608V. The fifth layer 600 of FIG. 3H may include at least 4 path segments, at least 6 path segments, at least 8 path segments, at least 10 path segments, or even at least 12 path segments that extend substantially in parallel and/or have the noted serpentine configuration.

As evident from a comparison of FIGS. 3D, 3F, and 3H, the path segments of third layer 400, fourth layer 500, and fifth layer 600 extend over a substantial portion of their overall paths in a generally parallel manner. Thus, the path segments of the fifth layer 600 may be extruded generally in parallel and/or to overlap the path segments of the third layer 400 and/or the fourth layer 500 over much of their overall path lengths in a manner as shown in FIGS. 2C and 2E. If desired: (a) at least 25% (and in some examples, at least 40%, at least 50%, at least 60%, at least 75%, at least 85%, or even at least 90%) of the overall path length of the fifth layer 600 will overlap with path segments of at least one of the third layer 400 and/or the fourth layer 500 in the manner shown in FIGS. 2C and 2E and/or (b) at least 25% (and in some examples, at least 40%, at least 50%, at least 60%, at least 75%, at least 85%, or even at least 90%) of the overall path length of the third layer 400 and/or the fourth layer 500 will overlap with path segments of the fifth layer 600 in the manner shown in FIGS. 2C and 2E. In at least some examples of this invention: (a) the fifth path of the fifth layer 600 will overlap the first path of the first layer 300 over less than 50% (and in some examples less than 40%, less than 30%, less than 20%, or even less than 10%) of an overall length of the fifth path, (b) the fifth path of the fifth layer 600 will overlap the second path of the second layer 350 over less than 50% (and in some examples less than 40%, less than 30%, less than 20%, or even less than 10%) of an overall length of the fifth path, (c) the fifth path of the fifth layer 600 will overlap the first path of the first layer 300 over less than 50% (and in some examples less than 40%, less than 30%, less than 20%, or even less than 10%) of an overall length of the first path, and/or (d) the fifth path of the fifth layer 600 will overlap the second path of the second layer 350 over less than 50% (and in some examples less than 40%, less than 30%, less than 20%, or even less than 10%) of an overall length of the second path.

Thus, filaments of the fifth layer 600 will directly contact filaments of the third layer 400 and/or the fourth layer 500 (at overlapping contact area 202) as the fifth layer 600 is being extruded. Heat from the fifth layer 600 as it is being extruded (and/or another heat source) causes the fifth filament path segments to fuse together with either or both of the third filament path segments and/or the fourth filament path segments at location(s) 202 where the fifth filament path segments contact either or both of the third filament path segments and/or the fourth filament path segments (e.g., the filament material of the fifth layer 600 may polymerize with and seamlessly join the filament material of the third layer 400 and/or the fourth layer 500). In this manner, the third layer 400 and/or fourth layer 500 of the upper or upper blank 1000 can be fixedly joined to the fifth layer 500 of the upper or upper blank 1000 in an adhesive free manner at contact location(s) 202.

As also evident from a comparison of FIG. 3H with FIGS. 3A and 3B, the path segments of fifth layer 600 will substantially intersect the path segments of the first layer 300 and the second layer 350 over a substantial portion of their overall paths. The intersecting path segments form a grid or generally matrix pattern, which can be seen in the combined first through fifth layers 640 shown in FIG. 3I. The path segments of the fifth layer 600 may intersect the path segments of the first layer 300 and/or the second layer 350 at any desired angles, e.g., from 5° to 175°, and in some examples, from 15° to 165°, from 25° to 155°, from 35° to 145°, from 45° to 135°, from 55° to 125°, from 60° to 120°, from 65° to 90°, etc. Thus, filaments of the fifth layer 600 will directly contact filaments of the first layer 300 and filaments of the second layer 350 (at intersecting contact area 202) as the fifth layer 600 is being extruded. Heat from the fifth layer 600 as it is being extruded (and/or another heat source) causes the fifth filament path segments to fuse together with either or both of the first filament path segments and/or the second filament path segments at location(s) 202 where the fifth filament path segments contact either or both of the first filament path segments and/or the second filament path segments (e.g., the filament material of the fifth layer 600 may polymerize with and seamlessly join the filament materials of the first layer 300 and/or the second layer 350).

In these manners, the fifth layer 600 of the upper or upper blank 1000 can be fixedly joined to the first layer 300, the second layer 350, the third layer 400, and the fourth layer 500 of the upper or upper blank 1000 in an adhesive free manner at contact location(s) 202 to form the combined first through fifth layers 640. The upper component or intermediate including the combined first through fifth layers 640 constitutes a unitary construction in which the first layer 300, the second layer 350, the third layer 400, the fourth layer 500, and the fifth layer 600 are fixed together only in a non-adhesive fused manner. The upper component or intermediate including the combined first through fifth layers 640 may consist essentially of, or even consist of, the first layer 300, the second layer 350, the third layer 400, the fourth layer 500, and the fifth layer 600.

In the fifth layer 600, the path segments in one area need not have constant spacing from directly adjacent path segments at other areas of the fifth layer 600. For example, as shown in FIG. 3H, the plural, non-intersecting, spaced apart path segments in the forefoot region 606 of the fifth layer 600 are spaced closer together than are the plural, non-intersecting, spaced apart path segments in the midfoot region(s) 604/608 and/or the plural, non-intersecting, spaced apart path segments in the forefoot region 606 and/or the midfoot region(s) 604/608 are spaced closer together than are the plural, non-intersecting, spaced apart path segments in the heel region(s) 602/610 of the fifth layer 600.

Figure 3J:
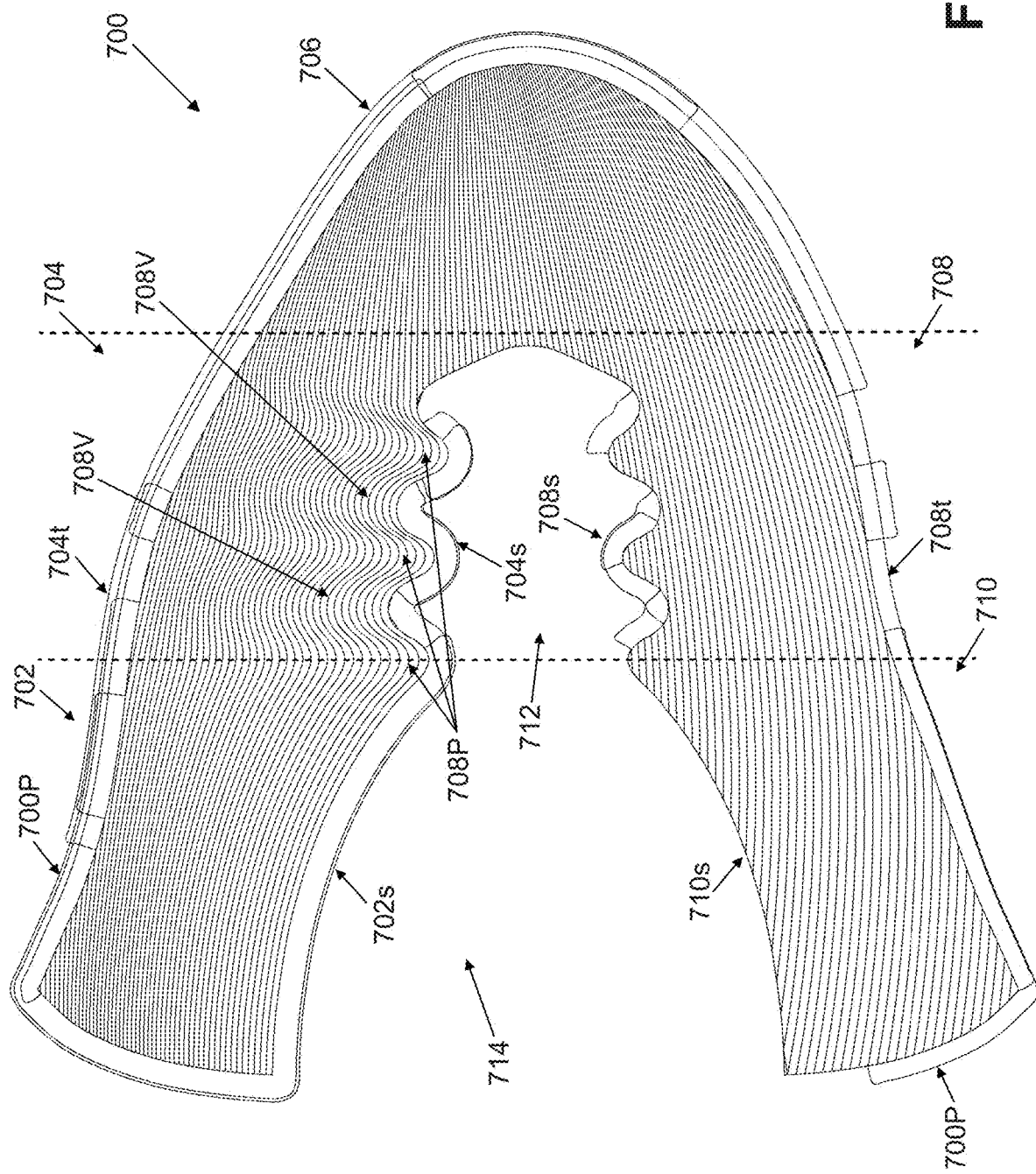

After the fifth layer 600 is extruded (e.g., onto first layer 300, second layer 350, third layer 400, fourth layer 500, and/or substrate 106), a sixth layer 700 of the overall upper or upper blank 1000 then may be applied to the combined first through fifth layers 640. FIG. 3J shows the individual path segments of this example sixth layer 700, and FIG. 3K schematically shows the production of the sixth layer 700 onto the previously prepared combined first through fifth layers 640 to create the combined first through sixth layers 740 of the upper or upper blank 1000. More specifically, FIG. 3J shows a sixth layer 700 formed of a sixth filament (e.g., having any of the filament features and characteristics described above) and formed by extruding a sixth material into multiple path segments (e.g., having any of the path and/or path segment features described above), e.g., via a solid deposition modeling process. Optionally, this sixth layer 700 may be extruded as a sixth continuous path. In this illustrated example, the sixth path of the sixth filament (optionally as a continuous path) forms the following portions of the sixth layer 700: (a) a sixth lateral rear heel portion 702 (e.g., extending along and/or adjacent a lateral side 702s of the ankle/foot opening 714 of the sixth layer 700); (b) a sixth lateral midfoot portion 704 (e.g., extending along and/or adjacent a lateral side 704s (or an inner edge) of an instep opening 712 of the sixth layer 700); (c) a sixth forefoot portion 706 (e.g., which bridges from a lateral side to a medial side of the sixth layer 700, forward of the midfoot portions); (d) a sixth medial midfoot portion 708 (e.g., extending along and/or adjacent a medial side 708s (or an inner edge) of the instep opening 712 of the sixth layer 700); and (e) a sixth medial rear heel portion 710 (e.g., extending along and/or adjacent a medial side 710s of the ankle/foot opening 714 of the sixth layer 700). The vertical dashed lines shown in FIG. 3J generally define and break the sixth layer 700 into three portions: (a) a posterior third (containing the lateral rear heel portion 702 and the medial rear heel portion 710), (b) a central third (containing the lateral midfoot portion 704 and the medial midfoot portion 708), and (c) an anterior third (containing the forefoot portion 706). In at least some examples of this invention, the sixth layer 700 will consist essentially of, or even consist of, this filament structure (optionally formed as a continuous path and/or a one piece construction). The white space visible in FIG. 3J for this example sixth layer 700 constitutes open space between filament path segments (e.g., where one can see completely through the sixth layer 700).

While the path segments of the sixth layer 700 can be extruded in any desired order without departing from this invention, in some examples of this invention, the outer perimeter (e.g., 700P) may be extruded first, and then the remainder of the sixth layer 700 can be extruded, e.g., in a "raster" like fashion, to fill in the area within the perimeter 700P. In this illustrated example, the extruded overall path of the sixth layer 700 lays down the sixth filament over much of the overall surface area of the sixth layer 700 as sixth plural, non-intersecting, spaced apart path segments that extend in a substantially anterior-posterior direction of the sixth layer 700. As shown in FIG. 3J, in the lateral rear heel portion 702, the forefoot portion 706, the medial midfoot portion 708, and the medial rear heel portion 710, the sixth plural, non-intersecting path segments of the sixth layer 700 extend in a gently curved manner in a direction from the rear heel portion 702/710 forward. In the lateral midfoot portion 704, however, at least some of the sixth plural, non-intersecting, spaced apart path segments extend in a serpentine configuration including at least two peaks (708P) and at least two valleys (708V). The path segments in these various regions 702, 704, 706, 708, 710 may have any of the features and/or options described above for the path segments shown in FIGS. 2A-2F.

As further shown in FIG. 3J, the sixth path of filament defines a first inner edge at lateral instep opening edge 704s, a first outer edge 704t at lateral midfoot region 704, a second inner edge at medial instep opening edge 708s, and a second outer edge 708t at medial midfoot region 708. An instep opening 712 for the sixth layer 700 is defined between the first inner edge at 704s and the second inner edge at 708s. The sixth path of the filament in this example layer 700 includes: (a) first plural, non-intersecting, spaced apart path segments located between the first inner edge at 704s and the first outer edge 704t, wherein a plurality of the first plural, non-intersecting, spaced apart path segments of the sixth path located between the first inner edge at 704s and the first outer edge 704t extend in a serpentine configuration and have at least two peaks 708P and at least two valleys 708V and (b) second plural, non-intersecting, spaced apart path segments located between the second inner edge at 708s and the second outer edge 708t, wherein the second, plural, non-intersecting, spaced apart path segments of the sixth path are linear and/or curved without defining plural peaks and valleys. The sixth layer 700 of FIG. 3J may include at least 4 path segments, at least 6 path segments, at least 8 path segments, at least 10 path segments, or even at least 12 path segments that extend substantially in parallel and/or have the noted serpentine configuration.

In the sixth layer 700, the path segments in one area need not have constant spacing from directly adjacent path segments at other areas of the sixth layer 700. For example, as shown in FIG. 3J, the plural, non-intersecting, spaced apart path segments in the forefoot region 706 of the sixth layer 700 are spaced closer together than are the plural, non-intersecting, spaced apart path segments in the midfoot region(s) 704/708 and/or the plural, non-intersecting, spaced apart path segments in the forefoot region 706 and/or the midfoot region(s) 704/708 are spaced closer together than are the plural, non-intersecting, spaced apart path segments in the heel region(s) 702/710 of the sixth layer 700.

As evident from a comparison of FIG. 3J with FIGS. 3A, 3B, 3D, 3F, and 3H, the path segments of sixth layer 700 will substantially intersect the path segments of the first layer 300, the second layer 350, the third layer 400, the fourth layer 500, and the fifth layer 600 over a substantial portion of their overall paths. The intersecting path segments form generally diamond shapes, which can be seen in the combined first through sixth layers 740 shown in FIG. 3K. The path segments of the sixth layer 700 may intersect the path segments of the first layer 300, the second layer 350, the third layer 400, the fourth layer 500, and/or the fifth layer 600 at any desired angles, e.g., from 5° to 175°, and in some examples, from 15° to 165°, from 25° to 155°, from 35° to 145°, from 45° to 135°, from 55° to 125°, from 60° to 120°, from 65° to 90°, etc. In at least some examples of this invention: (a) the sixth path of the sixth layer 700 will overlap with one or more of the first path of the first layer 300, the second path of the second layer 350, the third path of the third layer 400, the fourth path of the fourth layer 500, and/or the fifth path of the fifth layer 600 over less than 50% (and in some examples less than 40%, less than 30%, less than 20%, or even less than 10%) of an overall length of the sixth path, and/or (b) the sixth path of the sixth layer 700 will overlap one or more of the first path of the first layer 300, the second path of the second layer 350, the third path of the third layer 400, the fourth path of the fourth layer 500, and/or the fifth path of the fifth layer 600 over less than 50% (and in some examples less than 40%, less than 30%, less than 20%, or even less than 10%) of an overall length of the respective first path, second path, third path, fourth path, and/or fifth path.

Thus, filaments of the sixth layer 700 will directly contact filaments of the first layer 300, filaments of the second layer 350, filaments of the third layer 400, filaments of the fourth layer 500, and/or filaments of the fifth layer 600 (at intersecting contact area 202) as the sixth layer 700 is being extruded. Heat from the sixth layer 700 as it is being extruded (and/or another heat source) causes the sixth filament path segments to fuse together with any one of or any combination of the first filament path segments, the second filament path segments, the third filament path segments, the fourth filament path segments, and/or the fifth filament path segments at location(s) 202 where the sixth filament path segments contact any one of or any combination of the first filament path segments, the second filament path segments, the third filament path segments, the fourth filament path segments, and/or the fifth filament path segments (e.g., the filament material of the sixth layer 700 may polymerize with and seamlessly join the filament materials of the first layer 300, the second layer 350, the third layer 400, the fourth layer 500, and/or the fifth layer 600). In this manner, the sixth layer 700 of the upper or upper blank 1000 can be fixedly joined to the first layer 300, the second layer 350, the third layer 400, the fourth layer 500, and/or the fifth layer 600 of the upper or upper blank 1000 in an adhesive free manner at contact location(s) 202 to form the combined first through sixth layers 740. The upper component or intermediate including the combined first through sixth layers 740 constitutes a unitary construction in which the first layer 300, the second layer 350, the third layer 400, the fourth layer 500, the fifth layer 600, and the sixth layer 700 are fixed together only in a non-adhesive fused manner. The upper component or intermediate including the combined first through sixth layers 740 may consist essentially of, or even consist of, the first layer 300, the second layer 350, the third layer 400, the fourth layer 500, the fifth layer 600, and the sixth layer 700.

Figure 3L:
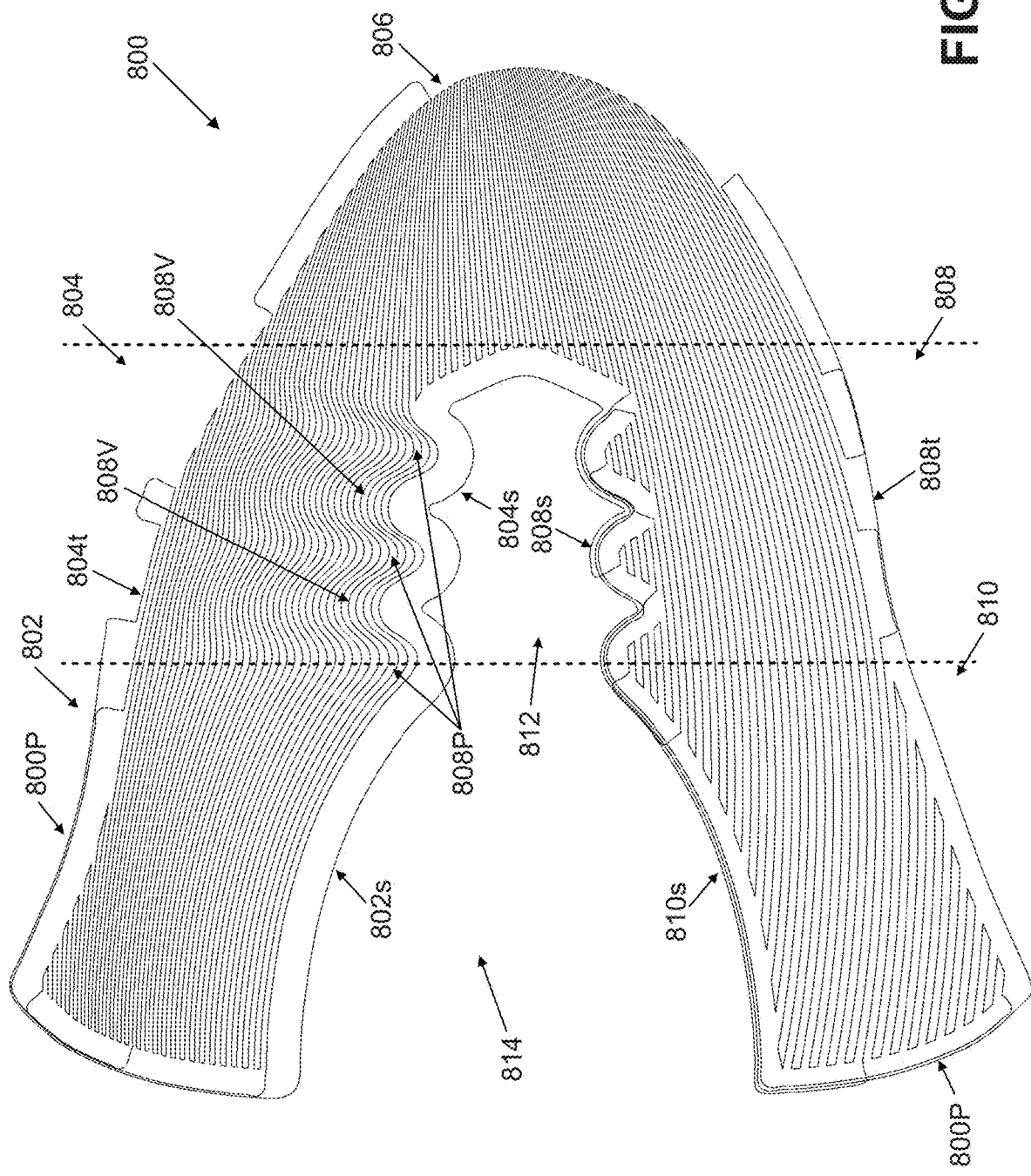
Figure 3M:
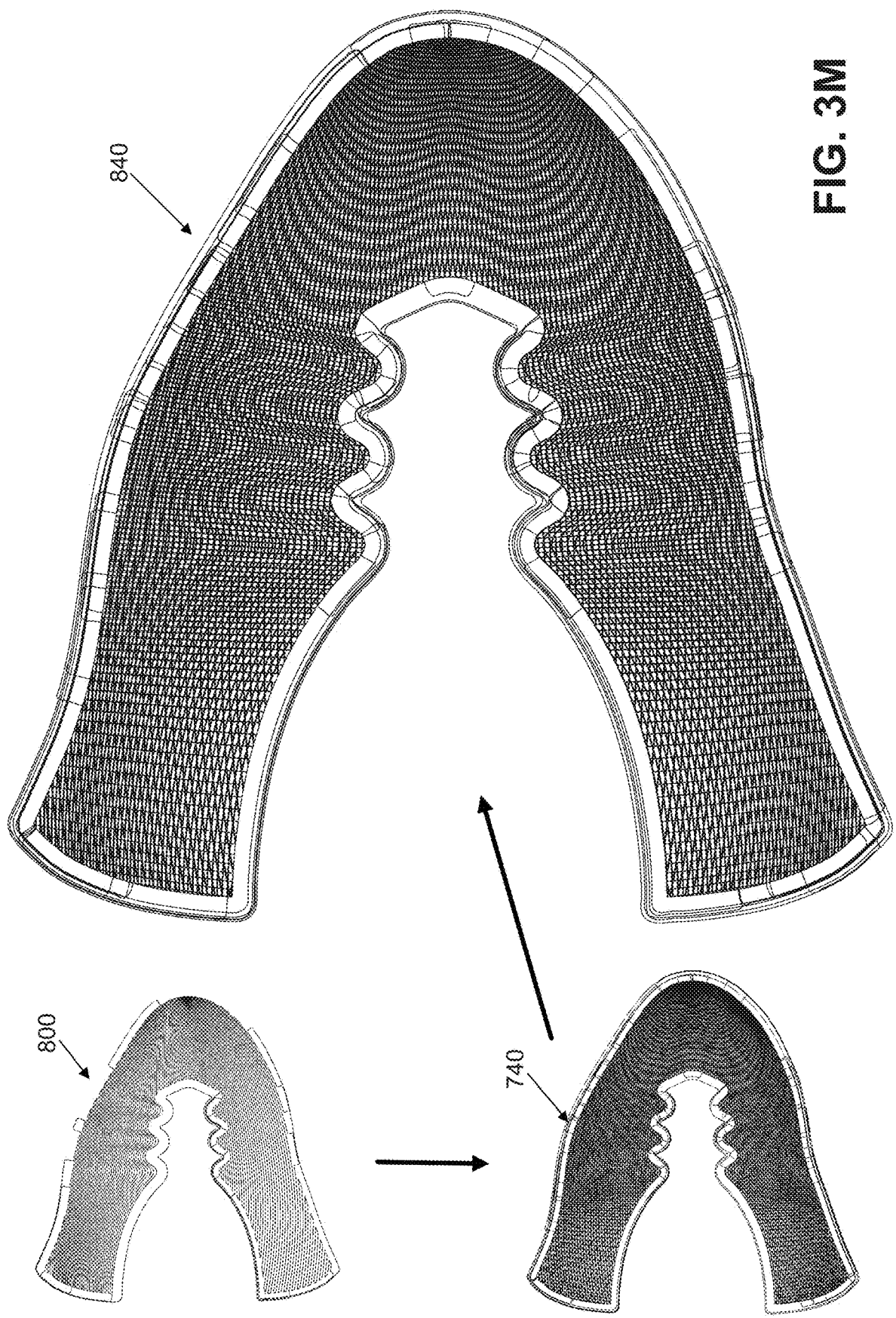

After the sixth layer 700 is extruded (e.g., onto first layer 300, second layer 350, third layer 400, fourth layer 500, fifth layer 600, and/or substrate 106), a seventh layer 800 of the overall upper or upper blank 1000 then may be applied to the combined first through sixth layers 740. FIG. 3L shows the individual path segments of this example seventh layer 800, and FIG. 3M schematically shows the production of the seventh layer 800 onto the previously prepared combined first through sixth layers 740 to create the combined first through seventh layers 840 of the upper or upper blank 1000. More specifically, FIG. 3L shows a seventh layer 800 formed of a seventh filament (e.g., having any of the filament features and characteristics described above) and formed by extruding a seventh material into multiple path segments (e.g., having any of the path and/or path segment features described above), e.g., by a solid deposition modeling process. Optionally, this seventh layer 800 may be extruded as a seventh continuous path. In this illustrated example, the seventh path of the seventh filament (optionally as a continuous path) forms the following portions of the seventh layer 800: (a) a seventh lateral rear heel portion 802 (e.g., extending along and/or adjacent a lateral side 802s of the ankle/foot opening 814 of the seventh layer 800); (b) a seventh lateral midfoot portion 804 (e.g., extending along and/or adjacent a lateral side 804s (or an inner edge) of an instep opening 812 of the seventh layer 800); (c) a seventh forefoot portion 806 (e.g., which bridges from a lateral side to a medial side of the seventh layer 800, forward of the midfoot portions); (d) a seventh medial midfoot portion 808 (e.g., extending along and/or adjacent a medial side 808s (or an inner edge) of the instep opening 812 of the seventh layer 800); and (e) a seventh medial rear heel portion 810 (e.g., extending along and/or adjacent a medial side 810s of the ankle/foot opening 814 of the seventh layer 800). The vertical dashed lines shown in FIG. 3L generally define and break the seventh layer 800 into three portions: (a) a posterior third (containing the lateral rear heel portion 802 and the medial rear heel portion 810), (b) a central third (containing the lateral midfoot portion 804 and the medial midfoot portion 808), and (c) an anterior third (containing the forefoot portion 806). In at least some examples of this invention, the seventh layer 800 will consist essentially of, or even consist of, this filament structure (optionally formed as a continuous path and/or as a one piece construction). The white space visible in FIG. 3L for this example seventh layer 800 constitutes open space between filament path segments (e.g., where one can see completely through the seventh layer 800).

While the path segments of the seventh layer 800 can be extruded in any desired order without departing from this invention, in some examples of this invention, the outer perimeter (e.g., 800P) may be extruded first, and then the remainder of the seventh layer 800 can be extruded, e.g., in a "raster" like fashion, to fill in the area within the perimeter 800P. In this illustrated example, the extruded overall path of the seventh layer 800 lays down the seventh filament over much of the overall surface area of the seventh layer 800 as seventh plural, non-intersecting, spaced apart path segments that extend in a substantially anterior-posterior direction of the seventh layer 800. As shown in FIG. 3L, in the lateral rear heel portion 802, the forefoot portion 806, the medial midfoot portion 808, and the medial rear heel portion 810, the seventh plural, non-intersecting path segments extend in a gently curved manner in a direction from the rear heel portion 802/810 forward. In the lateral midfoot portion 804, however, at least some of the seventh plural, non-intersecting, spaced apart path segments extend in a serpentine configuration including at least two peaks (808P) and at least two valleys (808V). The path segments in these various regions 802, 804, 806, 808, 810 may have any of the features and/or options described above for the path segments shown in FIGS. 2A-2F.

As further shown in FIG. 3L, the seventh path of filament defines a first inner edge at lateral instep opening edge 804s, a first outer edge 804t at lateral midfoot region 804, a second inner edge at medial instep opening edge 808s, and a second outer edge 808t at medial midfoot region 808. An instep opening 812 for the seventh layer 800 is defined between the first inner edge at 804s and the second inner edge at 808s. The seventh path of the filament in this example layer 800 includes: (a) first plural, non-intersecting, spaced apart path segments located between the first inner edge at 804s and the first outer edge 804t, wherein a plurality of the first plural, non-intersecting, spaced apart path segments of the seventh path located between the first inner edge at 804s and the first outer edge 804t extend in a serpentine configuration and have at least two peaks 808P and at least two valleys 808V and (b) second plural, non-intersecting, spaced apart path segments located between the second inner edge at 808s and the second outer edge 808t, wherein the second, plural, non-intersecting, spaced apart path segments of the seventh path are linear and/or curved without defining plural peaks and valleys. The seventh layer 800 of FIG. 3L may include at least 4 path segments, at least 6 path segments, at least 8 path segments, at least 10 path segments, or even at least 12 path segments that extend substantially in parallel and/or have the noted serpentine configuration.

As evident from a comparison of FIGS. 3J and 3L, the path segments of sixth layer 700 and seventh layer 800 extend over a substantial portion of their overall paths in a generally parallel manner. Thus, the path segments of the seventh layer 800 may be extruded generally in parallel and/or to overlap the path segments of the sixth layer 700 over much of the overall path lengths in a manner as shown in FIGS. 2C and 2E. If desired: (a) at least 25% (and in some examples, at least 40%, at least 50%, at least 60%, at least 75%, at least 85%, or even at least 90%) of the overall path length of the seventh layer 800 will overlap with path segments of the sixth layer 700 in the manner shown in FIGS. 2C and 2E and/or (b) at least 25% (and in some examples, at least 40%, at least 50%, at least 60%, at least 75%, at least 85%, or even at least 90%) of the overall path length of the sixth layer 700 will overlap with path segments of the seventh layer 800 in the manner shown in FIGS. 2C and 2E. Thus, filaments of the seventh layer 800 will directly contact filaments of the sixth layer 700 (at overlapping contact area 202) as the seventh layer 800 is being extruded. Heat from the seventh layer 800 while it is being extruded (and/or another heat source) causes the seventh filament path segments to fuse together with the sixth filament path segments at location(s) 202 where they contact one another (e.g., the filament material of the seventh layer 800 may polymerize with and seamlessly join the filament material of the sixth layer 700). In this manner, the sixth layer 700 of the upper or upper blank 1000 can be fixedly joined to the seventh layer 800 of the upper or upper blank 1000 in an adhesive free manner at contact location(s) 202.

As also evident from a comparison of FIG. 3L with FIGS. 3A, 3B, 3D, 3F, and 3H, the path segments of seventh layer 800 will substantially intersect the path segments of the first layer 300, the second layer 350, the third layer 400, the fourth layer 500, and the fifth layer 600 over a substantial portion of their overall paths. The intersecting path segments form generally diamond shapes, which can be seen in the combined first through seventh layers 840 shown in FIG. 3M. The path segments of the seventh layer 800 may intersect the path segments of the first layer 300, the second layer 350, the third layer 400, the fourth layer 500, and/or the fifth layer 600 at any desired angles, e.g., from 5° to 175°, and in some examples, from 15° to 165°, from 25° to 155°, from 35° to 145°, from 45° to 135°, from 55° to 125°, from 60° to 120°, from 65° to 90°, etc. In at least some examples of this invention: (a) the seventh path of the seventh layer 800 will overlap with one or more of the first path of the first layer 300, the second path of the second layer 350, the third path of the third layer 400, the fourth path of the fourth layer 500, and/or the fifth path of the fifth layer 600 over less than 50% (and in some examples less than 40%, less than 30%, less than 20%, or even less than 10%) of an overall length of the seventh path, and/or (b) the seventh path of the seventh layer 800 will overlap one or more of the first path of the first layer 300, the second path of the second layer 350, the third path of the third layer 400, the fourth path of the fourth layer 500, and/or the fifth path of the fifth layer 600 over less than 50% (and in some examples less than 40%, less than 30%, less than 20%, or even less than 10%) of an overall length of the respective first path, second path, third path, fourth path, and/or fifth path.

Thus, filaments of the seventh layer 800 will directly contact filaments of one or more of the first layer 300, the second layer 350, the third layer 400, the fourth layer 500, and/or the fifth layer 600 (at intersecting contact area 202) as the seventh layer 800 is being extruded. Heat from the seventh layer 800 as it is being extruded (and/or another heat source) causes the seventh filament path segments to fuse together with any one of or any combination of the first filament path segments, the second filament path segments, the third filament path segments, the fourth filament path segments, and/or the fifth filament path segments at location(s) 202 where the seventh filament path segments contact any one of or any combination of the first filament path segments, the second filament path segments, the third filament path segments, the fourth filament path segments, and/or the fifth filament path (e.g., the filament material of the seventh layer 800 may polymerize with and seamlessly join the filament materials of the first layer 300, the second layer 350, the third layer 400, the fourth layer 500, and/or the fifth layer 600).

In these manners, the seventh layer 800 of the upper or upper blank 1000 can be fixedly joined to the first layer 300, the second layer 350, the third layer 400, the fourth layer 500, the fifth layer 600, and/or the sixth layer 700 of the upper or upper blank 1000 in an adhesive free manner at contact location(s) 202 to form the combined first through seventh layers 840. The upper component or intermediate including the combined first through seventh layers 840 constitutes a unitary construction in which the first layer 300, the second layer 350, the third layer 400, the fourth layer 500, the fifth layer 600, the sixth layer 700, and the seventh layer 800 are fixed together only in a non-adhesive fused manner. The upper component or intermediate including the combined first through seventh layers 840 may consist essentially of, or even consist of, the first layer 300, the second layer 350, the third layer 400, the fourth layer 500, the fifth layer 600, the sixth layer 700, and the seventh layer 800.

In the seventh layer 800, the path segments in one area need not have constant spacing from directly adjacent path segments at other areas of the seventh layer 800. For example, as shown in FIG. 3L, the plural, non-intersecting, spaced apart path segments in the forefoot region 806 of the seventh layer 800 are spaced closer together than are the plural, non-intersecting, spaced apart path segments in the midfoot region(s) 804/808 and/or the plural, non-intersecting, spaced apart path segments in the forefoot region 806 and/or the midfoot region(s) 804/808 are spaced closer together than are the plural, non-intersecting, spaced apart path segments in the heel region(s) 802/810 of the seventh layer 800.

Figure 3N:
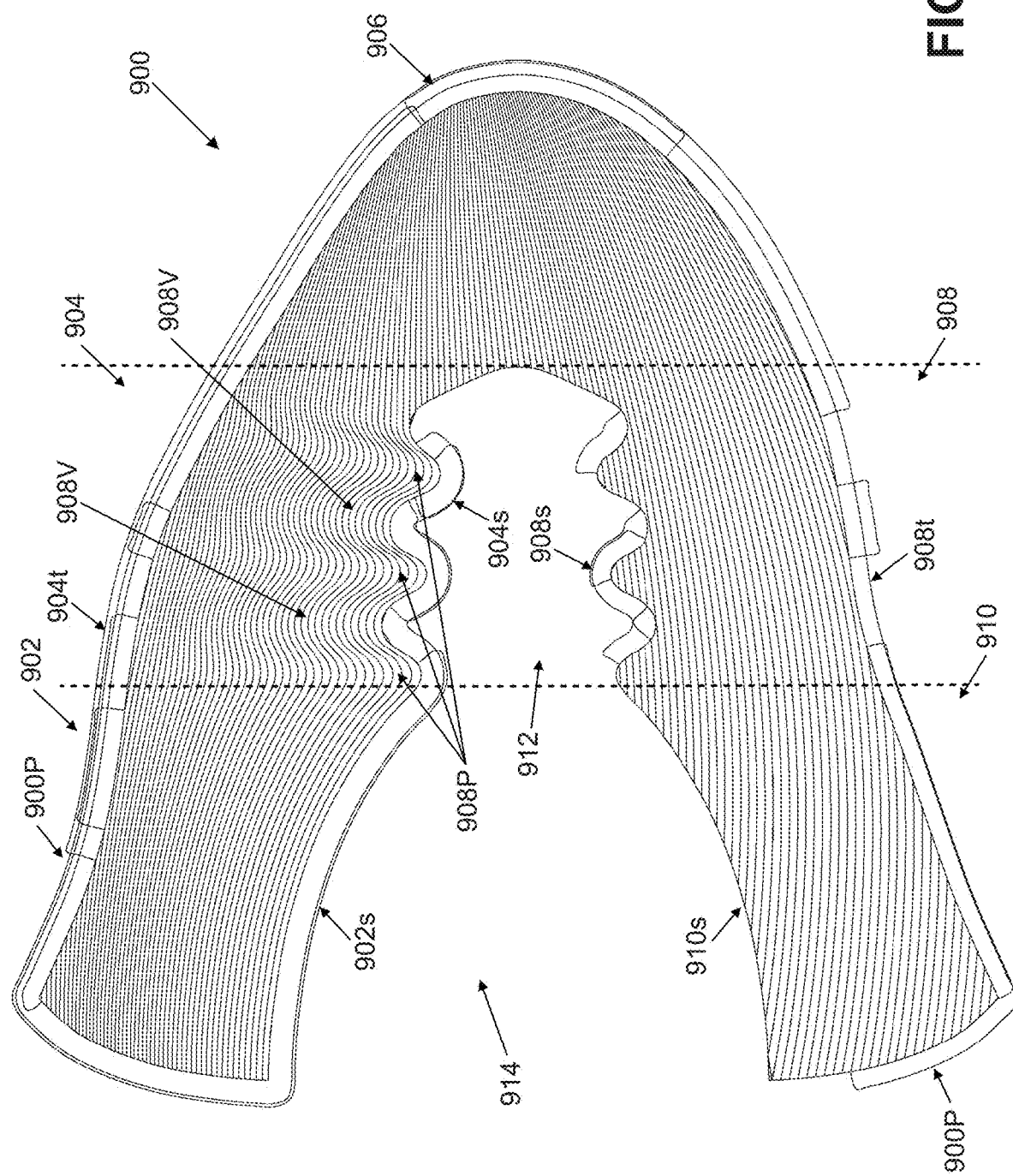

After the seventh layer 800 is extruded (e.g., onto first layer 300, second layer 350, third layer 400, fourth layer 500, fifth layer 600, sixth layer 700, and/or substrate 106), an eighth layer 900 of the overall upper or upper blank 1000 then may be applied to the combined first through seventh layers 840. FIG. 3N shows the individual path segments of this example eighth layer 900, and FIG. 3O schematically shows the production of the eighth layer 900 onto the previously prepared combined first through seventh layers 840 to create the combined first through eighth layers 1000 of the upper or upper blank 1000. More specifically, FIG. 3N shows an eighth layer 900 formed of an eighth filament (e.g., having any of the filament features and characteristics described above) and formed by extruding an eighth material into multiple path segments (e.g., having any of the path and/or path segment features described above), e.g., by a solid deposition modeling process. Optionally, this eighth layer 900 may be extruded as an eighth continuous path. In this illustrated example, the eighth path of the eighth filament (optionally as a continuous path) forms the following portions of the eighth layer 900: (a) an eighth lateral rear heel portion 902 (e.g., extending along and/or adjacent a lateral side 902s of the ankle/foot opening 914 of the eighth layer 900); (b) an eighth lateral midfoot portion 904 (e.g., extending along and/or adjacent a lateral side 904s (or an inner edge) of an instep opening 912 of the eighth layer 900); (c) an eighth forefoot portion 906 (e.g., which bridges from a lateral side to a medial side of the eighth layer 900, forward of the midfoot portions); (d) an eighth medial midfoot portion 908 (e.g., extending along and/or adjacent a medial side 908s (or an inner edge) of the instep opening 912 of the eighth layer 900); and (e) an eighth medial rear heel portion 910 (e.g., extending along and/or adjacent a medial side 910s of the ankle/foot opening 914 of the eighth layer 900). The vertical dashed lines shown in FIG. 3N generally define and break the eighth layer 900 into three portions: (a) a posterior third (containing the lateral rear heel portion 902 and the medial rear heel portion 910), (b) a central third (containing the lateral midfoot portion 904 and the medial midfoot portion 908), and (c) an anterior third (containing the forefoot portion 906). In at least some examples of this invention, the eighth layer 900 will consist essentially of, or even consist of, this filament structure (optionally formed as a continuous path and/or a one piece construction). The white space visible in FIG. 3N for this example eighth layer 900 constitutes open space between filament path segments (e.g., where one can see completely through the eighth layer 900).

While the path segments of the eighth layer 900 can be extruded in any desired order without departing from this invention, in some examples of this invention, the outer perimeter (e.g., 900P) may be extruded first, and then the remainder of the eighth layer 900 can be extruded, e.g., in a "raster" like fashion, to fill in the area within the perimeter 900P. In this illustrated example, the extruded overall path of the eighth layer 900 lays down the eighth filament over much of the overall surface area of the eighth layer 900 as eighth plural, non-intersecting, spaced apart path segments that extend in a substantially anterior-posterior direction of the eighth layer 900. As shown in FIG. 3N, in the lateral rear heel portion 902, the forefoot portion 906, the medial midfoot portion 908, and the medial rear heel portion 910, the eighth plural, non-intersecting path segments extend in a gently curved manner in a direction from the rear heel portion 902/910 forward. In the lateral midfoot portion 904, however, at least some of the eighth plural, non-intersecting, spaced apart path segments extend in a serpentine configuration including at least two peaks (908P) and at least two valleys (908V). The path segments in these various regions 902, 904, 906, 908, 910 may have any of the features and/or options described above for the path segments shown in FIGS. 2A-2F.

As further shown in FIG. 3N, the eighth path of filament defines a first inner edge at lateral instep opening edge 904s, a first outer edge 904t at lateral midfoot region 904, a second inner edge at medial instep opening edge 908s, and a second outer edge 908t at medial midfoot region 908. An instep opening 912 for the eighth layer 900 is defined between the first inner edge at 904s and the second inner edge at 908s. The eighth path of the filament in this example layer 900 includes: (a) first plural, non-intersecting, spaced apart path segments located between the first inner edge at 904s and the first outer edge 904t, wherein a plurality of the first plural, non-intersecting, spaced apart path segments of the eighth path located between the first inner edge at 904s and the first outer edge 904t extend in a serpentine configuration and have at least two peaks 908P and at least two valleys 908V and (b) second plural, non-intersecting, spaced apart path segments located between the second inner edge at 908s and the second outer edge 908t, wherein the second, plural, non-intersecting, spaced apart path segments of the eighth continuous path are linear and/or curved without defining plural peaks and valleys. The eighth layer 900 of FIG. 3N may include at least 4 path segments, at least 6 path segments, at least 8 path segments, at least 10 path segments, or even at least 12 path segments that extend substantially in parallel and/or have the noted serpentine configuration.

As evident from a comparison of FIGS. 3J, 3L, and 3N, the path segments of sixth layer 700, seventh layer 800, and eighth layer 900 extend over a substantial portion of their overall paths in a generally parallel manner. Thus, the path segments of the eighth layer 900 may be extruded generally in parallel and/or to overlap the path segments of the sixth layer 700 and/or the seventh layer 800 over much of their overall path lengths in a manner as shown in FIGS. 2C and 2E. If desired: (a) at least 25% (and in some examples, at least 40%, at least 50%, at least 60%, at least 75%, at least 85%, or even at least 90%) of the overall path length of the eighth layer 900 will overlap with path segments of at least one of the sixth layer 700 and/or the seventh layer 800 in the manner shown in FIGS. 2C and 2E and/or (b) at least 25% (and in some examples, at least 40%, at least 50%, at least 60%, at least 75%, at least 85%, or even at least 90%) of the overall path length of the sixth layer 700 and/or the seventh layer 800 will overlap with path segments of the eighth layer 900 in the manner shown in FIGS. 2C and 2E. Thus, filaments of the eighth layer 900 will directly contact filaments of the sixth layer 700 and/or the seventh layer 800 (at overlapping contact area 202) as the eighth layer 900 is being extruded. Heat from the eighth layer 900 while it is being extruded (and/or another heat source) causes the eighth filament path segments to fuse together with either or both of the sixth filament path segments and/or the seventh filament path segments at location(s) 202 where the eighth filament path segments contact either or both of the sixth filament path segments and/or the seventh filament path segments (e.g., the filament material of the eighth layer 900 may polymerize with and seamlessly join the filament material of the sixth layer 700 and/or the seventh layer 800). In this manner, the sixth layer 700 and/or seventh layer 800 of the upper or upper blank 1000 can be fixedly joined to the eighth layer 900 of the upper or upper blank 1000 in an adhesive free manner at contact location(s) 202.

As also evident from a comparison of FIG. 3N with FIGS. 3A, 3B, 3D, 3F, and 3H, the path segments of eighth layer 900 will substantially intersect the path segments of the first layer 300, the second layer 350, the third layer 400, the fourth layer 500, and the fifth layer 600 over a substantial portion of their overall paths. The intersecting path segments form generally diamond shapes, which can be seen in the combined first through eighth layers 1000 shown in FIGS. 3O and 3P. The path segments of the eighth layer 900 may intersect the path segments of the first layer 300, the second layer 350, the third layer 400, the fourth layer 500, and/or the fifth layer 600 at any desired angles, e.g., from 5° to 175°, and in some examples, from 15° to 165°, from 25° to 155°, from 35° to 145°, from 45° to 135°, from 55° to 125°, from 60° to 120°, from 65° to 90°, etc. In at least some examples of this invention: (a) the eighth path of the eighth layer 900 will overlap with one or more of the first path of the first layer 300, the second path of the second layer 350, the third path of the third layer 400, the fourth path of the fourth layer 500, and/or the fifth path of the fifth layer 600 over less than 50% (and in some examples less than 40%, less than 30%, less than 20%, or even less than 10%) of an overall length of the eighth path, and/or (b) the eighth path of the eighth layer 900 will overlap one or more of the first path of the first layer 300, the second path of the second layer 350, the third path of the third layer 400, the fourth path of the fourth layer 500, and/or the fifth path of the fifth layer 600 over less than 50% (and in some examples less than 40%, less than 30%, less than 20%, or even less than 10%) of an overall length of the respective first path, second path, third path, fourth path, and/or fifth path.

Thus, filaments of the eighth layer 900 will directly contact filaments of one or more of the first layer 300, the second layer 350, the third layer 400, the fourth layer 500, and/or the fifth layer 600 (at intersecting contact area 202) as the eighth layer 900 is being extruded. Heat from the eighth layer 900 while it is being extruded (and/or another heat source) causes the eighth filament path segments to fuse together with any one of or any combination of the first filament path segments, the second filament path segments, the third filament path segments, the fourth filament path segments, and/or the fifth filament path segments at location(s) 202 where the eighth filament path segments contact any one of or any combination of the first filament path segments, the second filament path segments, the third filament path segments, the fourth filament path segments, and/or the fifth filament path segments (e.g., the filament material of the eighth layer 900 may polymerize with and seamlessly join the filament materials of the first layer 300, the second layer 350, the third layer 400, the fourth layer 500, and/or the fifth layer 600).

In these manners, the eighth layer 900 of the upper or upper blank 1000 can be fixedly joined to the first layer 300, the second layer 350, the third layer 400, the fourth layer 500, the fifth layer 600, the sixth layer 700, and/or the seventh layer 800 of the upper or upper blank 1000 in an adhesive free manner at contact location(s) 202 to form the combined first through eighth layers 1000. The upper component or intermediate including the combined first through eighth layers 1000 constitutes a unitary construction in which the first layer 300, the second layer 350, the third layer 400, the fourth layer 500, the fifth layer 600, the sixth layer 700, the seventh layer 800, and the eighth layer 900 are fixed together only in a non-adhesive fused manner. The upper component or upper blank 1000 may consist essentially of, or even consist of, the first layer 300, the second layer 350, the third layer 400, the fourth layer 500, the fifth layer 600, the sixth layer 700, the seventh layer 800, and the eighth layer 900.

In the eighth layer 900, the path segments in one area need not have constant spacing from directly adjacent path segments at other areas of the eighth layer 900. For example, as shown in FIG. 3N, the plural, non-intersecting, spaced apart path segments in the forefoot region 906 of the eighth layer 900 are spaced closer together than are the plural, non-intersecting, spaced apart path segments in the midfoot region(s) 904/908 and/or the plural, non-intersecting, spaced apart path segments in the forefoot region 906 and/or the midfoot region(s) 904/908 are spaced closer together than are the plural, non-intersecting, spaced apart path segments in the heel region(s) 902/910 of the eighth layer 900.

After all desired layers of the upper or upper blank 1000 are formed, the extruded and fused layers form a fused upper component (e.g., an upper blank 1000). Then, the fused upper component 1000 may be removed from the base substrate 106 onto which it was extruded, optionally trimmed (e.g., around its perimeter edges, if needed) or otherwise processed (e.g., coated, painted, etc.), optionally engaged with another upper component, and/or incorporated into a footwear structure, as will be explained in more detail below. As described above, if desired, the surface 106s of the substrate 106 onto which the layer(s) of filament are extruded may be smooth or otherwise textured. The surface (e.g., individual filaments) of the upper blank 1000 that contacted the substrate 106 surface 106s then may take on the smoothness (or textured) characteristics of the substrate 106 surface 106s on which it contacts and is formed. Thus, in some examples of this invention, one surface (e.g., the inner surface or bottom surface) of the upper blank 1000 may be smooth or textured to correspond to texture on the surface 106s of the substrate 106 while the opposite surface (e.g., the outer surface or top surface) of the upper blank 1000 may have texture corresponding to the multiple overlapping layers of filament.

Figure 3P:
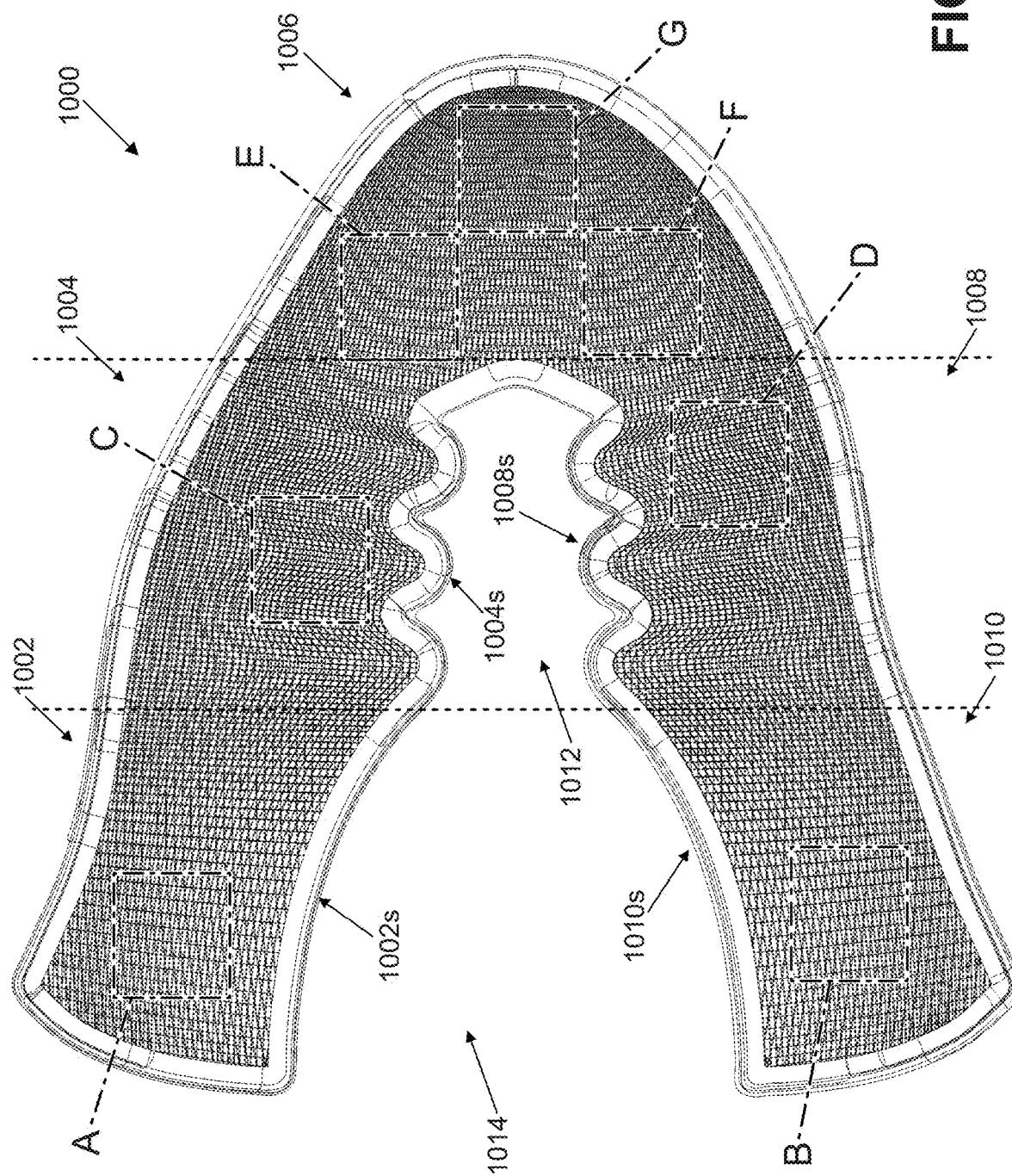
Figure 3Q:
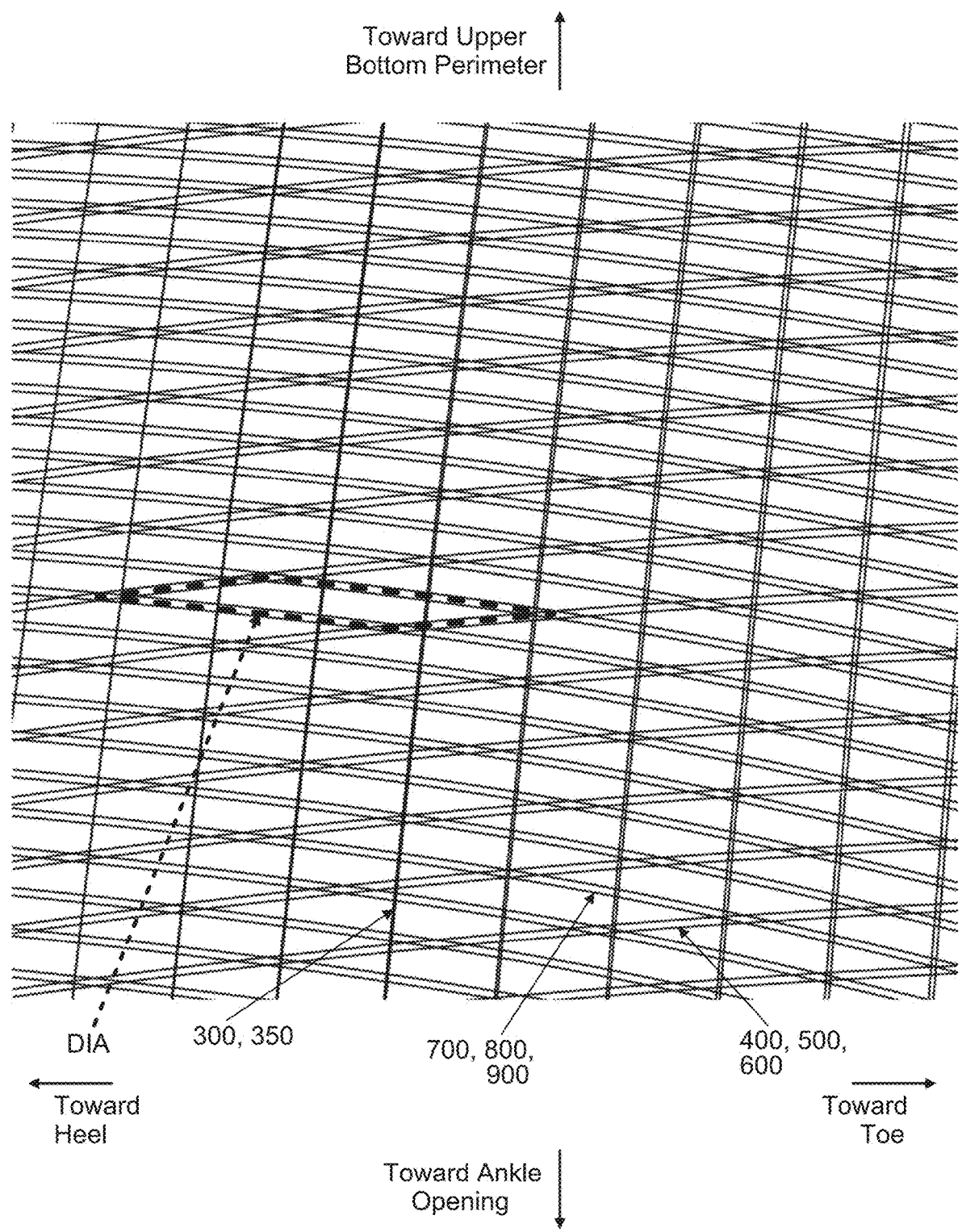
Figure 3R:
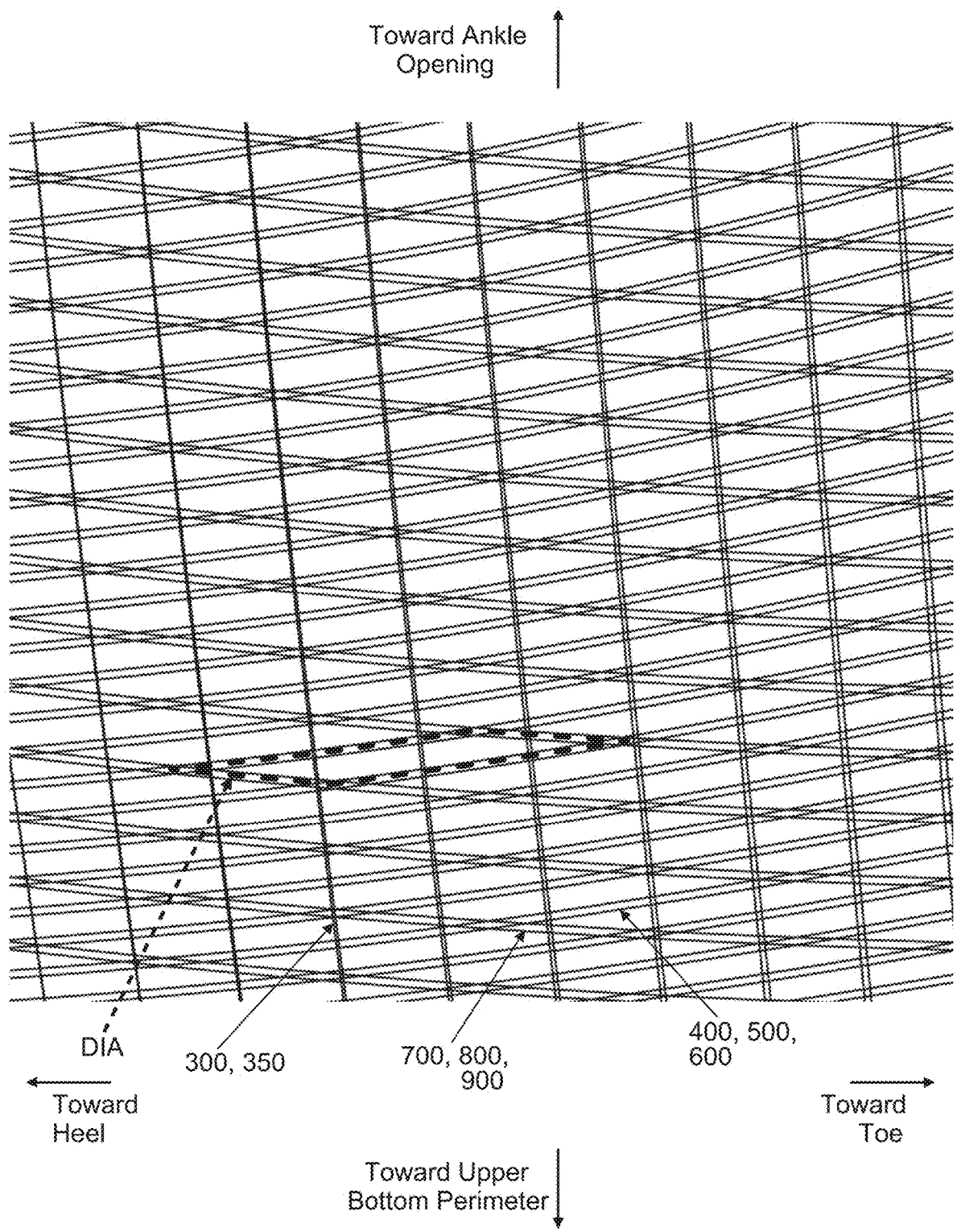
Figure 3S:
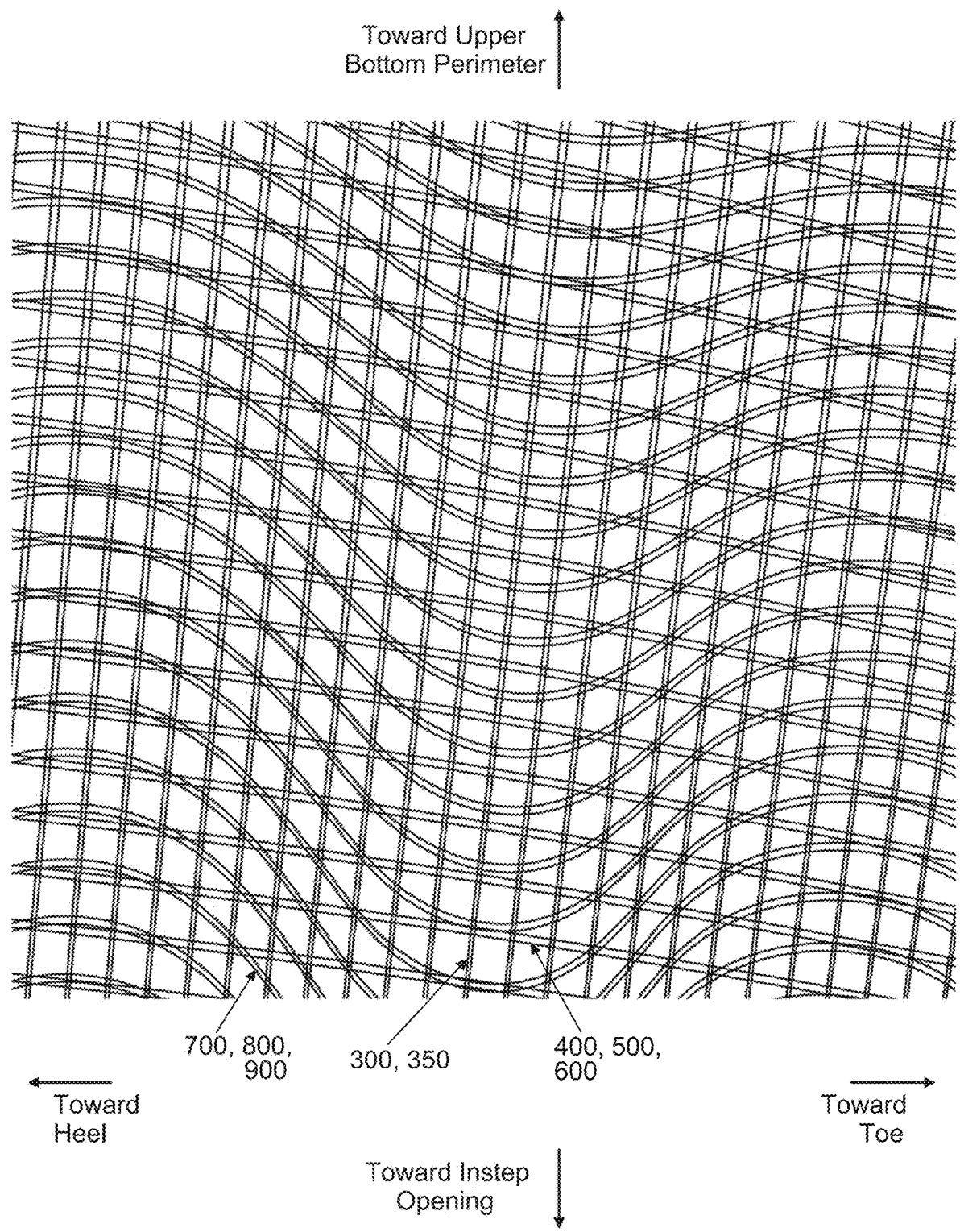
Figure 3T:
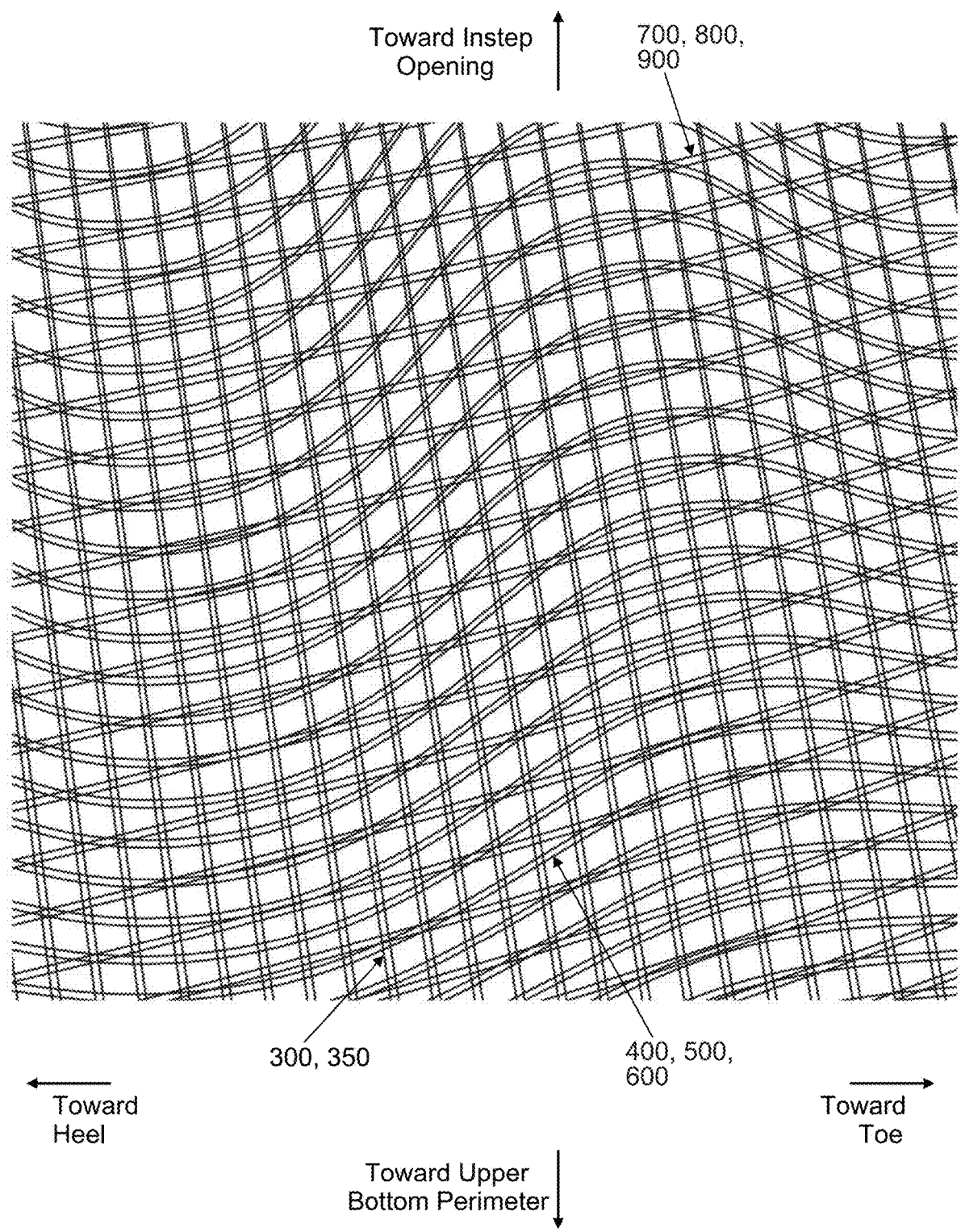
Figure 3U:
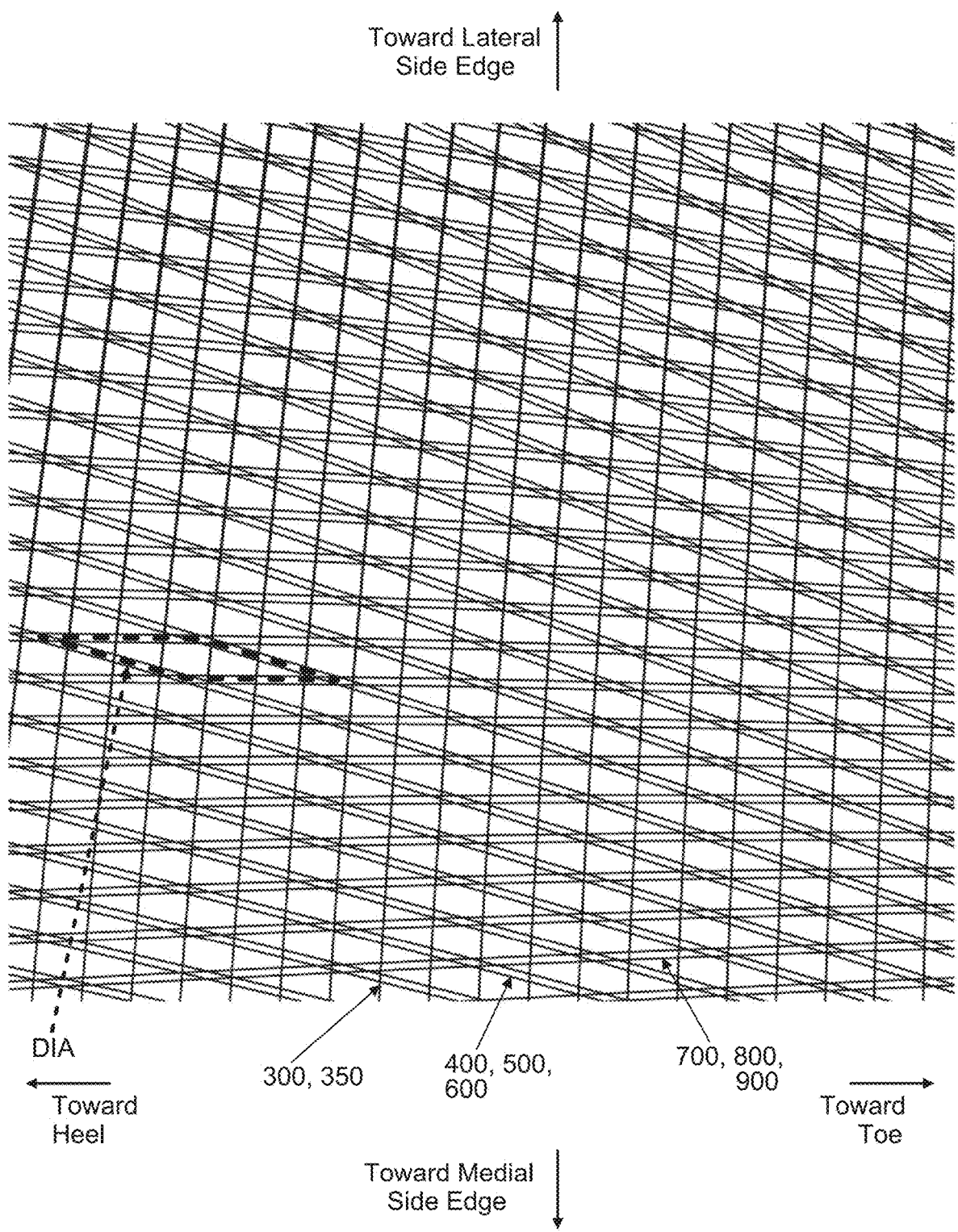
Figure 3V:
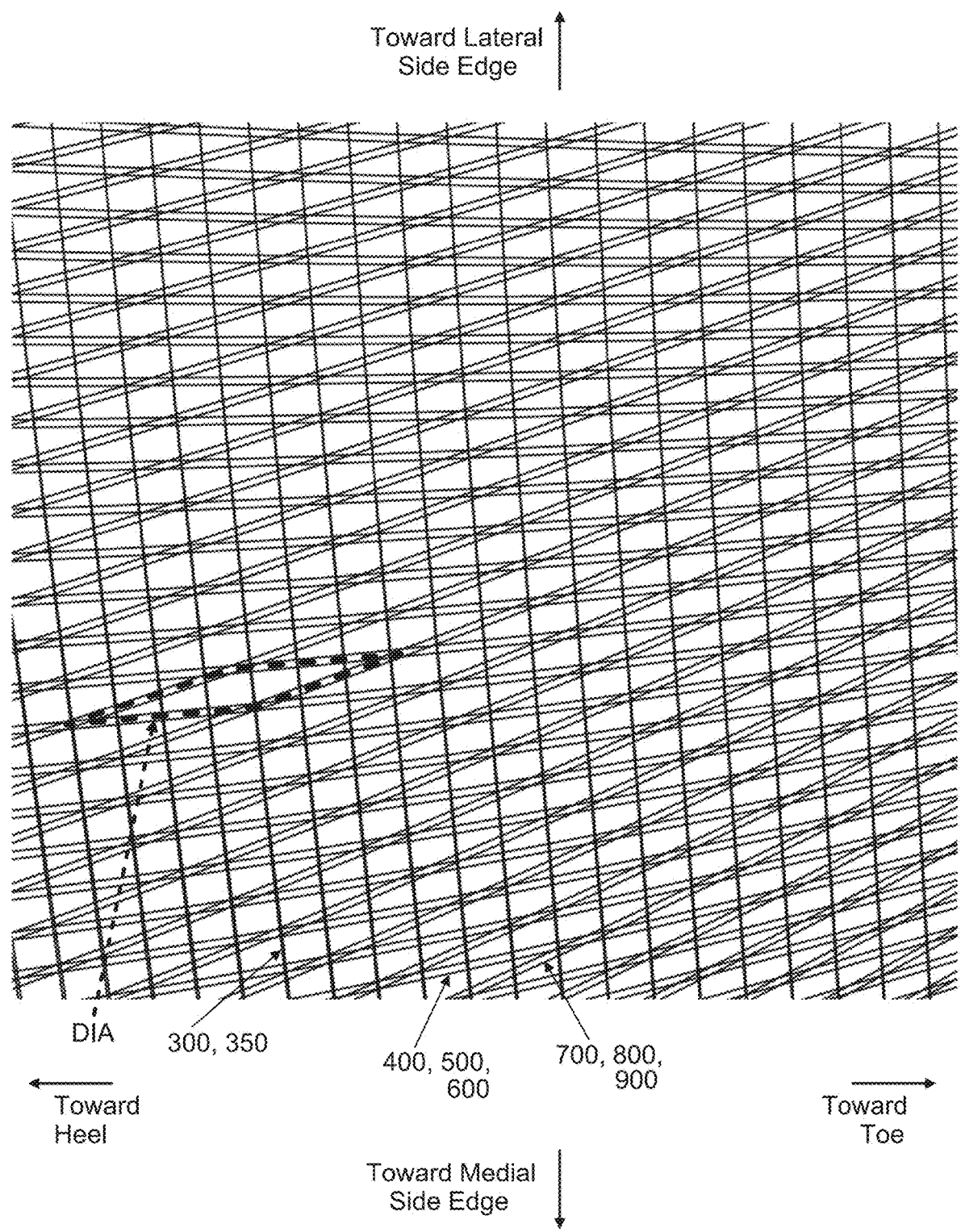
Figure 3W:
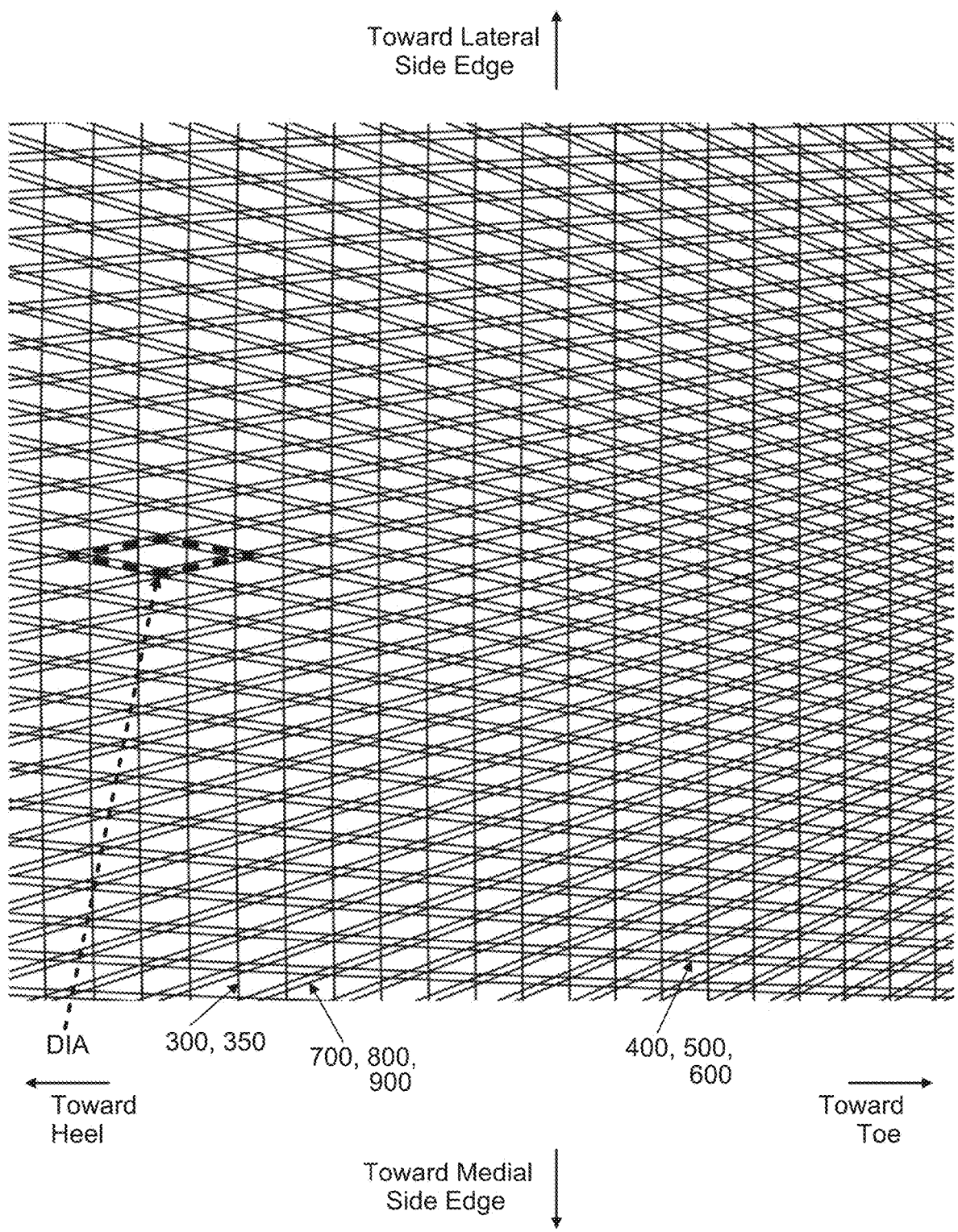

FIGS. 3Q to 3W provide enlarged views of portions of the upper blank 1000 at areas A-G shown in FIG. 3P to show more details of these example structures. FIGS. 3Q and 3R provide enlarged views of the upper blank 1000 at the lateral rear heel portion 1002 and the medial rear heel portion 1010 (areas A and B, respectively); FIGS. 3S and 3T provide enlarged views of the upper blank 1000 at the lateral midfoot portion 1004 and the medial midfoot portion 1008 (areas C and D, respectively); and FIGS. 3U, 3V, and 3W provide enlarged views of the upper blank 1000 at the lateral forefoot portion, the medial forefoot portion, and the extreme forefoot portion (areas E, F, and G, respectively).

As shown in FIG. 3Q, the filaments of the first layer 300 and the second layer 350 at this location of the upper blank 1000 (which may be substantially parallel and/or overlapping over much of their lengths) generally extend in a direction between the ankle opening 1014 and the bottom perimeter edge of the upper blank 1000 (e.g., in a mediolateral direction). The filaments of the third layer 400, the fourth layer 500, and the fifth layer 600 generally curve (and are substantially in parallel and/or overlapping) and extend in an anterior-posterior direction. Similarly, the filaments of the sixth layer 700, the seventh layer 800, and the eighth layer 900 generally curve (and are substantially in parallel and/or overlapping) and extend in an anterior-posterior direction. The filaments of the first layer 300 and second layer 350 intersect the filaments of the third layer 400, fourth layer 500, and fifth layer 600 and form generally parallelogram or diamond shapes (e.g., with angles between 60° and 120°). Similarly, the filaments of the first layer 300 and second layer 350 intersect the filaments of the sixth layer 700, seventh layer 800, and eighth layer 900 and form generally parallelogram or diamond shapes (e.g., with angles between 60° and 120°). The filaments of the third layer 400, fourth layer 500, and fifth layer 600 intersect the filaments of the sixth layer 700, seventh layer 800, and eighth layer 900 and form generally parallelogram or diamond shapes (e.g., with two angles between 5° and 600 and two angles between 120° and 175°). When formed as parallelogram and/or diamond shapes, a long axis of the parallelogram/diamond shapes formed by the filaments of layers 400/500/600 and the filaments of layers 700/800/900 may extend in generally an anterior-posterior direction of the upper blank 1000 (e.g., as shown by diamond DIA highlighted in FIG. 3Q).

As shown in FIG. 3R, the filaments of the first layer 300 and the second layer 350 at this location of the upper blank 1000 (which may be substantially parallel and/or overlapping over much of their lengths) generally extend in a direction between the ankle opening 1014 and the bottom perimeter edge of the upper blank 1000 (e.g., in a mediolateral direction). The filaments of the third layer 400, the fourth layer 500, and the fifth layer 600 generally curve (and are substantially in parallel and/or overlapping) and extend in an anterior-posterior direction. Similarly, the filaments of the sixth layer 700, the seventh layer 800, and the eighth layer 900 generally curve (and are substantially in parallel and/or overlapping) and extend in an anterior-posterior direction. The filaments of the first layer 300 and second layer 350 intersect the filaments of the third layer 400, fourth layer 500, and fifth layer 600 and form a generally parallelogram or diamond shaped pattern (e.g., with angles between 60° and 120°). Similarly, the filaments of the first layer 300 and second layer 350 intersect the filaments of the sixth layer 700, seventh layer 800, and eighth layer 900 and form generally parallelogram or diamond shapes (e.g., with angles between 60° and 120°). The filaments of the third layer 400, fourth layer 500, and fifth layer 600 intersect the filaments of the sixth layer 700, seventh layer 800, and eighth layer 900 and form generally parallelogram or diamond shapes (e.g., with two angles between 5° and 600 and two angles between 120° and 175°). When formed as parallelogram and/or diamond shapes, a long axis of the parallelogram/diamond shapes formed by the filaments of layers 400/500/600 and the filaments of layers 700/800/900 may extend in generally an anterior-posterior direction of the upper blank 1000 (e.g., as shown by diamond DIA highlighted in FIG. 3R).

As shown in FIG. 3S, the filaments of the first layer 300 and the second layer 350 at this location of the upper blank 1000 (which may be substantially parallel and/or overlapping over much of their lengths) generally extend in a direction between the instep opening 1012 and the bottom perimeter edge of the upper blank 1000 (e.g., in a mediolateral direction). The filaments of the third layer 400, the fourth layer 500, and the fifth layer 600 generally curve (and are substantially in parallel and/or overlapping) and extend in an anterior-posterior direction. The filaments of the sixth layer 700, the seventh layer 800, and the eighth layer 900 in this area of the upper blank 1000 form the serpentine pattern described above (and are substantially in parallel and/or overlapping), and generally extend in an anterior-posterior direction. The intersecting filaments of the various layers may have any of the angular properties described above in conjunction with FIGS. 3Q and 3R. At this particular area of the upper blank 1000, the intersecting filaments define some more "square" or rectangular openings through the upper blank 1000.

As shown in FIG. 3T, the filaments of the first layer 300 and the second layer 350 at this location of the upper blank 1000 (which may be substantially parallel and/or overlapping over much of their lengths) generally extend in a direction between the instep opening 1012 and the bottom perimeter edge of the upper blank 1000 (e.g., in a mediolateral direction). The filaments of the third layer 400, the fourth layer 500, and the fifth layer 600 in this area of the upper blank 1000 form the serpentine pattern described above (and are substantially in parallel and/or overlapping), and generally extend in an anterior-posterior direction. The filaments of the sixth layer 700, the seventh layer 800, and the eighth layer 900 generally curve (and are substantially in parallel and/or overlapping) and extend in an anterior-posterior direction. The intersecting filaments of the various layers may have any of the angular properties described above in conjunction with FIGS. 3Q and 3R. At this particular area of the upper blank 1000, the intersecting filaments define some more "square" or rectangular openings through the upper blank 1000.

As shown in FIG. 3U, the filaments of the first layer 300 and the second layer 350 at this location of the upper blank 1000 (which may be substantially parallel and/or overlapping over much of their lengths) generally extend in a medio-lateral direction across the upper blank 1000 (from the medial side toward the lateral side). The filaments of the third layer 400, the fourth layer 500, and the fifth layer 600 generally curve (and are substantially in parallel and/or overlapping) and extend in an anterior-posterior direction. Similarly, the filaments of the sixth layer 700, the seventh layer 800, and the eighth layer 900 generally curve (and are substantially in parallel and/or overlapping) and extend in an anterior-posterior direction. The filaments of the first layer 300 and second layer 350 intersect the filaments of the third layer 400, fourth layer 500, and fifth layer 600 and form generally parallelogram or diamond shapes (e.g., with angles between 60° and 120°). Similarly, the filaments of the first layer 300 and second layer 350 intersect the filaments of the sixth layer 700, seventh layer 800, and eighth layer 900 and form generally parallelogram or diamond shapes (e.g., with angles between 60° and 120°). The filaments of the third layer 400, fourth layer 500, and fifth layer 600 intersect the filaments of the sixth layer 700, seventh layer 800, and eighth layer 900 and form generally parallelogram or diamond shapes (e.g., with two angles between 5° and 60° and two angles between 120° and 175°). When formed as parallelogram and/or diamond shapes, a long axis of the parallelogram/diamond shapes formed by the filaments of layers 400/500/600 and the filaments of layers 700/800/900 may extend in generally an anterior-posterior direction of the upper blank 1000 (e.g., as shown by diamond DIA highlighted in FIG. 3U).

As shown in FIG. 3V, the filaments of the first layer 300 and the second layer 350 at this location of the upper blank 1000 (which may be substantially parallel and/or overlapping over much of their lengths) generally extend in a medio-lateral direction across the upper blank 1000 (from the medial side toward the lateral side). The filaments of the third layer 400, the fourth layer 500, and the fifth layer 600 generally curve (and are substantially in parallel and/or overlapping) and extend in an anterior-posterior direction. Similarly, the filaments of the sixth layer 700, the seventh layer 800, and the eighth layer 900 generally curve (and are substantially in parallel and/or overlapping) and extend in an anterior-posterior direction. The filaments of the first layer 300 and second layer 350 intersect the filaments of the third layer 400, fourth layer 500, and fifth layer 600 and form generally parallelogram or diamond shapes (e.g., with angles between 60° and 120°). Similarly, the filaments of the first layer 300 and second layer 350 intersect the filaments of the sixth layer 700, seventh layer 800, and eighth layer 900 and form generally parallelogram or diamond shapes (e.g., with angles between 60° and 120°). The filaments of the third layer 400, fourth layer 500, and fifth layer 600 intersect the filaments of the sixth layer 700, seventh layer 800, and eighth layer 900 and form generally parallelogram or diamond shapes pattern (e.g., with two angles between 5° and 60° and two angles between 120° and 175°). When formed as parallelogram and/or diamond shapes, a long axis of the parallelogram/diamond shapes formed by the filaments of layers 400/500/600 and the filaments of layers 700/800/900 may extend in generally an anterior-posterior direction of the upper blank 1000 (e.g., as shown by diamond DIA highlighted in FIG. 3V).

As shown in FIG. 3W, the filaments of the first layer 300 and the second layer 350 at this location of the upper blank 1000 (which may be substantially parallel and/or overlapping over much of their lengths) generally extend in a medio-lateral direction across the upper blank 1000 (from the medial side toward the lateral side). The filaments of the third layer 400, the fourth layer 500, and the fifth layer 600 generally curve (and are substantially in parallel and/or overlapping) and extend in an anterior-posterior direction. Similarly, the filaments of the sixth layer 700, the seventh layer 800, and the eighth layer 900 generally curve (and are substantially in parallel and/or overlapping) and extend in an anterior-posterior direction. The filaments of the first layer 300 and second layer 350 intersect the filaments of the third layer 400, fourth layer 500, and fifth layer 600 and form generally parallelogram or diamond shapes (e.g., with angles between 60° and 120°). Similarly, the filaments of the first layer 300 and second layer 350 intersect the filaments of the sixth layer 700, seventh layer 800, and eighth layer 900 and form generally parallelogram or diamond shapes (e.g., with angles between 60° and 120°). The filaments of the third layer 400, fourth layer 500, and fifth layer 600 intersect the filaments of the sixth layer 700, seventh layer 800, and eighth layer 900 and form generally parallelogram or diamond shapes (e.g., with two angles between 5° and 60° and two angles between 120° and 175°). When formed as parallelogram and/or diamond shapes, a long axis of the parallelogram/diamond shapes formed by the filaments of layers 400/500/600 and the filaments of layers 700/800/900 may extend in generally an anterior-posterior direction of the upper blank 1000 (e.g., as shown by diamond DIA highlighted in FIG. 3W).

As evident from a comparison of FIGS. 3Q-3V with 3W, the spacings between directly adjacent filaments in a given layer generally become smaller at the forefoot area of this example upper blank 1000 as compared to the spacings between directly adjacent filaments in the same layer at the rear heel and/or midfoot portions of the upper blank 1000. Also, as shown in these figures, the diamond shaped openings formed by intersections between (a) the filaments of the third layer 400, fourth layer 500, and fifth layer 600 and (b) the filaments of the sixth layer 700, seventh layer 800, and eighth layer 900 become smaller toward the forefoot area of the upper blank 1000 as compared to the corresponding diamond shaped openings provided at the rear heel and/or midfoot portions of the upper blank 1000. These features provide improved support, durability, lock-down, and less stretchability at the forefoot area of the upper blank 1000 as compared to at least some other areas. As further evident from the enlarged views of FIGS. 3Q-3W, much of the space within the perimeter of the upper or upper blank constitutes open space between intersections of the filaments in the layers of the upper or upper blank 1000. In at least some examples of this invention, the upper or upper blank 1000 may constitute at least 15% open space between filaments of the various layers, and in some examples, at least 25%, at least 30%, at least 40%, or even at least 50% open space may be present between filaments in the upper or upper blank 1000.

Many variations in the upper or upper blank 1000 structure and/or individual upper layers of filament are possible without departing from this invention. As some examples, an upper or upper blank 1000 could include more or fewer upper layers than the eight layers described above (e.g., from 2 to 24 layers, and in some examples, from 3 to 20 layers, from 4 to 16 layers, from 5 to 12 layers, etc.). As additional or alternative examples, the layering order of the filament layers described above could be changed in some examples of this invention. Additionally or alternatively, while FIGS. 3D, 3F, and 3H show the serpentine configurations formed at the medial midfoot portions of the third layer 400, the fourth layer 500, and the fifth layer 600, respectively, and Figs. FIGS. 3J, 3L, and 3N show the serpentine configurations formed at the lateral midfoot portions of the sixth layer 700, the seventh layer 800, and the eighth layer 900, respectively, an upper or upper blank in accordance with some examples of this invention may include more of fewer of this same type of "serpentine" configurations, e.g., in one or more of the forefoot area, the rear heel areas, etc. More or fewer layers of an upper blank 1000 also may include this type of "serpentine" configuration. The curved and serpentine configurations of the filament layers provide enhanced flexibility.

The filament materials provided in the various layers of a single upper or upper blank 1000 may be the same or different without departing from this invention. As some more specific examples, the upper or upper blank and/or the individual layers thereof may have one or more of the following properties or characteristics: (a) the filament materials on all layers of an upper or upper blank may be the same material; (b) the filament material in one layer of an upper or upper blank may differ from the filament material in one or more other layers of the upper or upper blank; (c) the filament material may be different in each layer of an upper or upper blank; (d) the filaments on all layers of an upper or upper blank may be the same color; (e) the filament color in one layer of an upper or upper blank may differ from the filament color in one or more other layers of the upper or upper blank; (f) the filament colors may be different in each layer of an upper or upper blank; (g) the filament in one or more layers of an upper or upper blank may be made from a transparent or translucent material; (h) the filament in one or more layers of the upper or upper blank (and optionally in each layer of the upper or upper blank) may be made from a thermoplastic material (e.g., a thermoplastic polyurethane material); (i) the filament in one or more layers of the upper or upper blank (and optionally in each layer of the upper or upper blank) may be made from a material that does not substantially absorb water; (j) the filament in one or more layers of the upper or upper blank (and optionally in each layer of the upper or upper blank) may be made from a hydrophobic material; (k) the filament in one or more layers of the upper or upper blank (and optionally in each layer of the upper or upper blank) may be made from a material capable of fusing to material(s) of the other layers, e.g., in an adhesive free manner, such as via a solid deposition modeling technique; (l) the filament materials on all layers of an upper or upper blank may have the same diameter, width, and/or thickness (or other dimensions); and/or (m) the filament material in one layer of an upper or upper blank may differ in diameter, width, and/or thickness (or other dimensions) from the filament material in one or more other layers of the upper or upper blank. In some examples of this invention, the upper or upper blank (e.g., two or more layers thereof cooperatively) may produce a moiré effect, e.g., as shown in FIGS. 1 and 3A-3P.

As described above, in at least some examples of this invention, one or more of the various upper layers (e.g., layers 300, 350, 400, 500, 600, 700, 800, and/or 900) may be formed as a continuous path of extruded filament. For example, in some examples of this invention, the entire upper layer (e.g., as shown in each of one or more of FIG. 3A (first layer 300), FIG. 3B (second layer 350), FIG. 3D (third layer 400), FIG. 3F (fourth layer 500), FIG. 3H (fifth layer 600), FIG. 3J (sixth layer 700), FIG. 3L (seventh layer 800), and FIG. 3N (eighth layer 900)) may be formed by beginning extrusion at one location of the individual upper layer and extruding material continuously (including through all necessary turns of the extruder nozzle 104/head) until the entire layer is completely extruded (e.g., into the form shown in one or more of FIGS. 3A, 3B, 3D, 3F, 3H, 3J, 3L, and 3N). This type of continuous extrusion path (with one start and one stop in extruding an entire layer), however, is not a requirement. Rather, in at least some examples of this invention, an individual upper layer (e.g., like those shown in FIGS. 3A, 3B, 3D, 3F, 3H, 3J, 3L, and 3N) may be formed in a discontinuous manner (e.g., with two or more pairs of extrusion start/stop actions per individual layer). The extrusion nozzle 104/head may be moved between the extrusion starts and stops (while extrusion is stopped) to another desired location of the upper layer so that the extrusion path segments of the layer can begin/end at any desired locations.

Further, FIGS. 3A-3P show that each individual layer 300, 350, 400, 500, 600, 700, 800, 900 in this illustrated upper or upper blank 1000 includes individual path segments throughout each of the lateral rear heel portion, lateral midfoot portion, forefoot portion, medial midfoot portion, and medial rear heel portion. This is not a requirement. Rather, if desired, in accordance with some examples of this invention, an individual upper layer (e.g., one or more of 300, 350, 400, 500, 600, 700, 800, and/or 900) need not extend into and/or throughout all of the noted regions. As some more specific examples, if desired: (a) one or more layers of the upper may be present in only the forefoot region of the overall upper; (b) one or more layers may be present in only the lateral midfoot region and/or medial midfoot region of the overall upper; (c) one or more layers may be present in the forefoot region and one or both of the lateral midfoot region and/or medial midfoot region of the overall upper; (d) one or more layers may be omitted at one or both of the lateral rear heel region and/or the medial rear heel region; (e) only a small amount of filament may be present in some portions or regions of an individual layer; etc. Selective inclusion of filament at less than all regions of an upper layer can allow one to selectively control properties in that region of the overall upper or upper blank (e.g., control breathability, stretchability, permeability, lock down, etc.). When one or more layers are omitted in an individual area or region, the layers of filament that are included in that individual area or region need not be extruded consecutively in the overall upper production process. For example, if desired, an individual area or region of an upper or upper blank may include the first layer 300, the second layer 350, the fourth layer 500, the sixth layer 700, and the seventh layer 800 (or any desired number and/or combination of layers, including layers having different paths from the specific examples shown in the figures).

FIGS. 3A-3P further show an example with upper layers laid down as filaments in a specific order, i.e., layer 300, then layer 350, then layer 400, then layer 500, then layer 600, then layer 700, then layer 800, then layer 900. The order in which layers are put down can influence the characteristics and/or properties of the overall upper or upper blank 1000. For example, if layers with larger filament spacings are laid down closer to the upper interior and layers with smaller filament spacings are laid down closer to the upper exterior, this may enhance the overall upper's ability to shed water (or other materials) and/or resist introduction of water (or other materials) inside and/or within the upper as compared to an upper with the same layers formed in a different order with larger filament spacings located closer to the upper exterior. Changing layer orders also may affect zonal or overall performance of the upper (e.g., affect lockdown, directional stretch, breathability, permeability, etc.) By changing the layer orders, the intersections of the different layers may be altered and/or changed in locations, and thus the fusion of one layer to the other layers may be altered and/or changed to different locations and/or positions. These changes may affect overall properties, performance, and/or feel of the upper (e.g., lockdown, directional stretch, breathability, permeability, etc.).

Figure 4A:
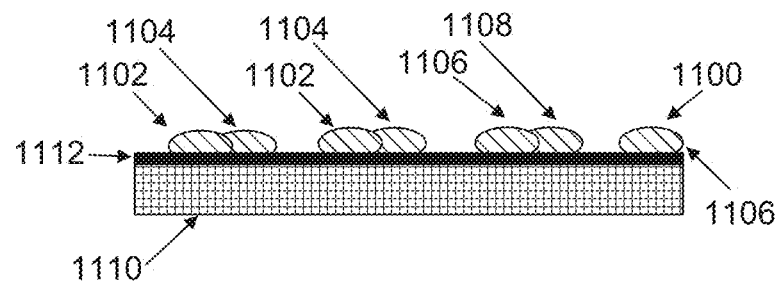
FIGS. 4A-4C shows various features of a filament based upper component engaged with another upper component by an adhesive.
Figure 4B:
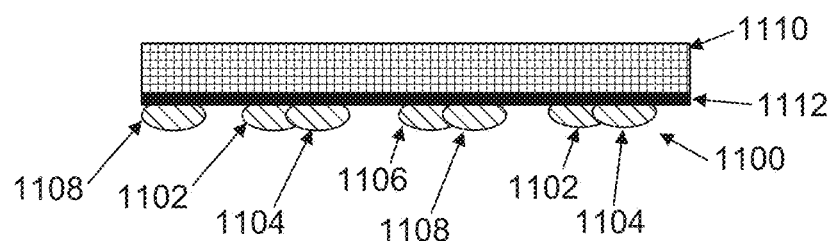
Figure 4C:
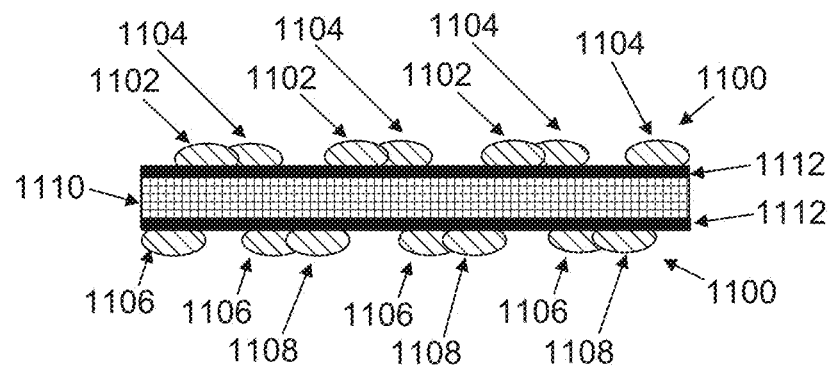

As mentioned above, if desired, the upper blank 1000 or an upper component built from one or more layers of extruded filaments of the types described above may be engaged with one or more other upper components. FIGS. 4A through 4C illustrate examples in which the filament(s) 1102, 1104, 1106, 1108 of one or more layers of an extruded filament based upper component 1100 are engaged with another upper component 1110, e.g., by an adhesive or cement 1112. The extruded filament based upper component 1100 may be made of one or more layers of extruded filament, e.g., including one of more layers, including any one or more of the various layers 300, 350, 400, 500, 600, 700, 800, and/or 900 described above. The upper component 1110 may be any desired type of upper component, including upper components as conventionally known and used in the footwear arts, such as fabrics, textiles, elastic materials, knitted components, woven components, leathers (natural or synthetic), thermoplastic materials, thermoplastic polyurethanes, other polymer materials, etc. The extruded filament based upper component 1100: (a) may be located outside the other upper component 1110 toward the footwear exterior and away from the wearer's foot (FIG. 4A); (b) may be located inside the other upper component 1110 toward the footwear interior and closer to (and optionally adjacent or in contact with) the wearer's foot (FIG. 4B); and/or (c) may be both inside and outside the other upper component 1110 (FIG. 4C). The additional upper component(s) 1110 may provide additional support at desired areas (e.g., a heel counter, a toe box, structural support, shape support, lace engaging support along the instep opening 1012, structure for engaging a sole component, etc.); a soft foot contact surface (e.g., around the ankle opening 1014, as a "tongue" member across the instep opening 1012, etc.); support for engaging another footwear component; etc. The combined upper components 1100/1110 may be incorporated into an overall footwear structure, as will be described in more detail below.

Figure 5A:
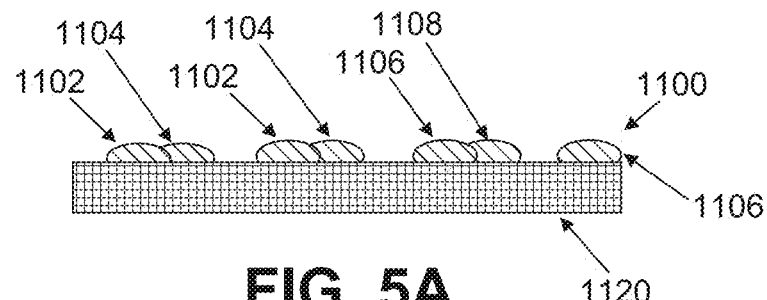
Figure 5B:
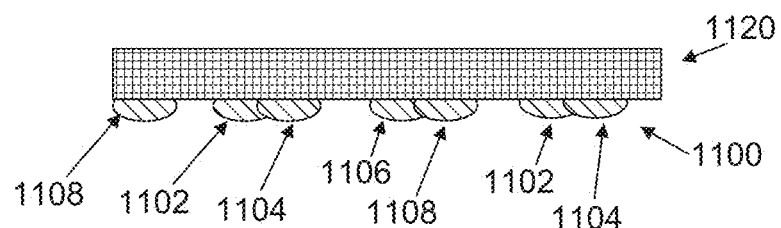
Figure 5C:
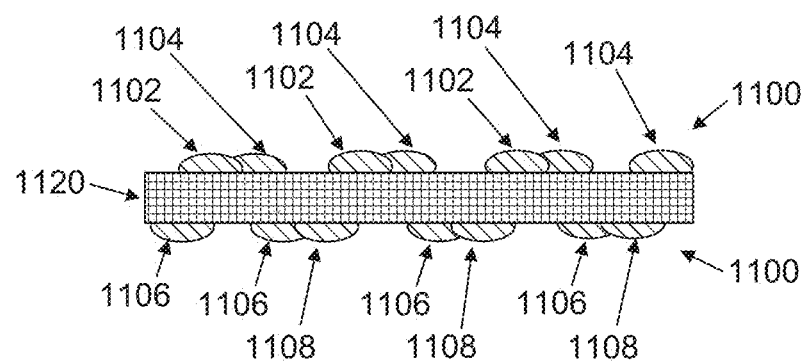

FIGS. 5A through 5C, however, illustrate engagement of an extruded filament based upper component 1100 with another upper component 1120 in an adhesive free manner, by fusing (or fuse bonding) the filament(s) in the upper component 1100 directly with the material of the other upper component 1120. Such combined upper components 1100/1120 may include: (a) a first upper component 1100 that includes at least a first layer formed to include a first material as a first filament 1102 (four filaments 1102, 1104, 1106, and 1108 are shown in FIGS. 5A-5C), optionally including first plural, non-intersecting, spaced apart path segments of the filament, wherein the first extruded filament has a width dimension of less than 3 mm wide (and in some examples, less than 2 mm wide, less than 1.5 mm wide, less than 1 mm wide, or even less than 0.75 mm wide); and (b) a second upper component 1120 including a fabric element (e.g., of any of the types described above for upper component 1110, such as fabrics, textiles, elastic materials, thermoplastic materials, etc.) formed at least in part of a fusible material.

The extruded filament based upper component 1100 may be made of one or more layers of extruded filament, e.g., including one of more layers like layers 300, 350, 400, 500, 600, 700, 800, and/or 900 described above. In such structures, the fusible material of the second upper component 1120 is fused to the filaments 1102, 1104, 1106, and/or 1108 of the first upper component 1100. If necessary or desired, heat and/or pressure may be applied to the combined upper components 1100/1120 to fuse the filament containing upper component 1100 to the fabric element upper component 1120. The fusing between components 1100 and 1120 may be a result of the material of one or more filaments 1102-1108 polymerizing with and seamlessly joining the fusible material of the fabric element 1120.

FIGS. 5A through 5C illustrate examples in which the filament(s) 1102, 1104, 1106, 1108 of one or more layers of an extruded filament upper component 1100 are engaged with an upper component 1120 that includes a fusible material as part of a fabric element. The extruded filament upper component 1100: (a) may be located outside the other upper component 1120 toward the footwear exterior and away from the wearer's foot (FIG. 5A); (b) may be located inside the other upper component 1120 toward the footwear interior and closer to (and optionally adjacent or in contact with) the wearer's foot (FIG. 5B); and/or (c) may be both inside and outside the other upper component 1120 (FIG. 5C). The additional upper component(s) 1120 may provide additional support at desired areas (e.g., a heel counter, a toe box, structural support, shape support, lace engaging support along the instep opening 1012, structure for engaging a sole component, etc.); a soft foot contact surface (e.g., around the ankle opening 1014, as a "tongue" member across the instep opening 1012, etc.); structure for engaging another footwear component; etc. The combined upper components 1100/1120 may be incorporated into an overall footwear structure, as will be described in more detail below.

FIGS. 5D through 5F provide examples of manners in which a fusible material may be incorporated into a fabric element 1120. As one example, as shown in FIG. 5D, a fabric element 1120 may be formed as a woven, knitted, or unwoven structure in which at least one strand (e.g., yarn) of the fabric element 1120 is formed of a fusible material compatible to fuse with the material of one or more of the filaments of upper component 1100. In FIG. 5D, the yarn 1122 of one color is a traditional fabric material (e.g., made from a polyester, cotton, elastomeric material, etc.) and the yarn 1124 of the other color is made from the fusible material of the types described above for the fusible material in the filaments, such as a thermoplastic polyurethane material or other thermoplastic material. In this arrangement, the yarn 1124 can directly fuse to the filament(s) 1102, 1104, 1106, 1108 of the filament based upper component 1100.

As another option, as shown in FIG. 5E, a fabric element 1120 may be formed as a woven, knitted, or unwoven structure that includes at least one yarn of the fabric element structure 1120 formed of: (a) a strand 1132 made of a traditional fabric material (e.g., made from a polyester, cotton, elastomeric material, etc.) intertwined with (b) a strand 1134 made from the fusible material of the types described above for the fusible material in the filaments, such as a thermoplastic polyurethane material or other thermoplastic material. In this arrangement, the fusible yarn strand 1134 can directly fuse to the filament(s) 1102, 1104, 1106, 1108 of the filament based upper component 1100.

As yet another option, FIG. 5F provides a cross sectional view of a yarn or strand that may be used to make a fabric element 1120, e.g., as a woven, knitted, or unwoven structure. This strand or yarn is formed as a coaxial element over at least a portion of its axial length, including: (a) an inner core 1142 made of a traditional fabric material (e.g., made from a polyester, cotton, elastomeric material, etc.) coated (e.g., co-extruded or otherwise formed) with (b) an outer cover 1144 made from the fusible material of the types described above for the fusible material in the filaments, such as a thermoplastic polyurethane material or other thermoplastic material. In this arrangement, the fusible outer cover 1144 can directly fuse to the filament(s) 1102, 1104, 1106, 1108 of the filament based upper component 1100.

Figure 6A:
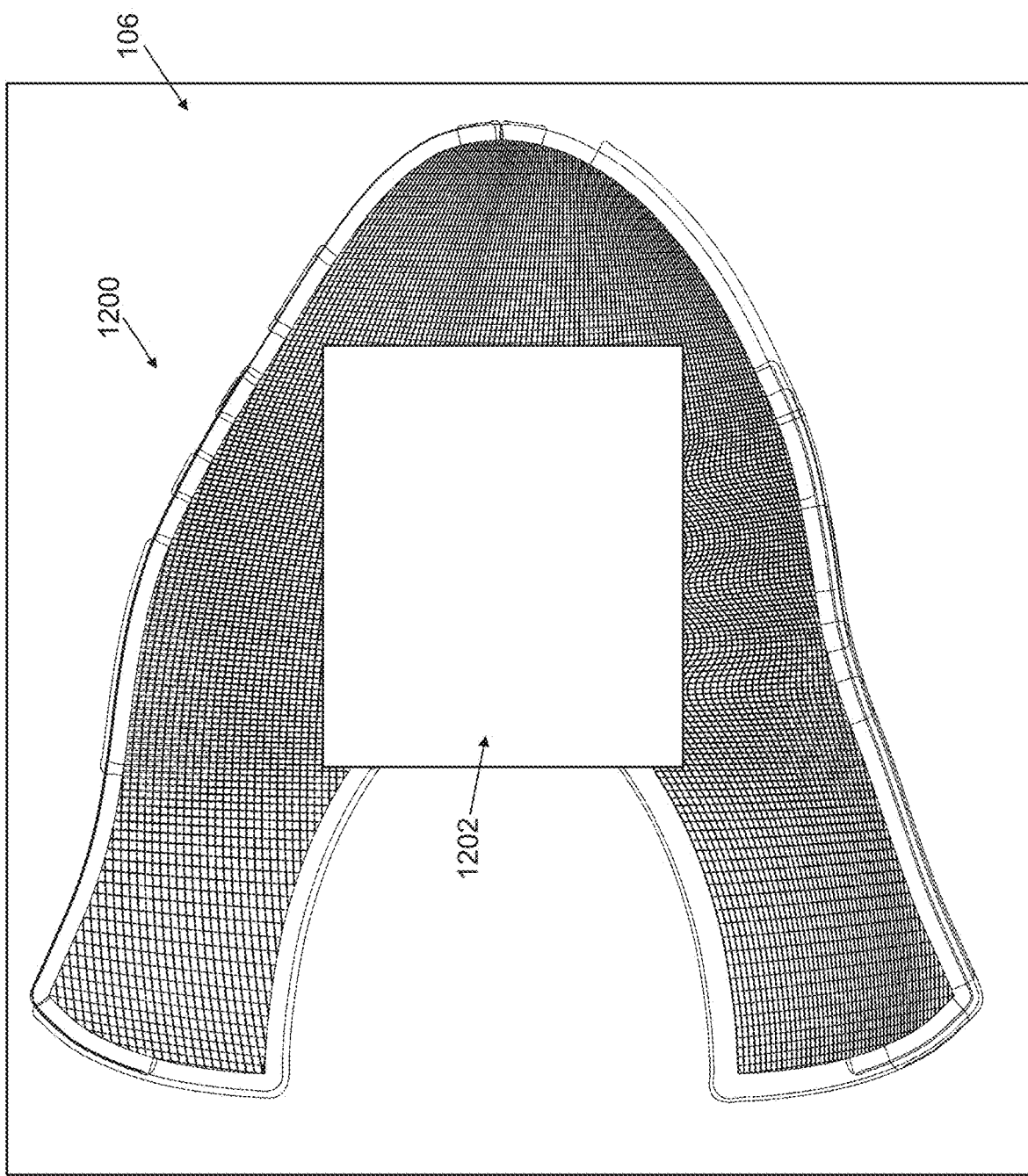
FIGS. 6A-6E illustrate example steps of engaging a filament based upper component with another upper component.

FIGS. 6A through 6E illustrate an example of a manner in which a conventional fabric element (or other footwear component) 1110 and/or a fabric element 1120 including a fusible material (e.g., of the types described above in conjunction with FIGS. 5D-5F) can be engaged with a multi-layered fusible upper component 1100 (e.g., of the types described above in conjunction with FIGS. 1A-3W). First, an upper blank intermediate 1200 can be made including one or more layers of extruded filament formed as described above (e.g., by a solid deposition modeling technique, as a continuous path, with plural, non-intersecting path segments, etc.). FIG. 6A shows an upper blank intermediate 1200 formed to include the first four layers 300, 350, 400, 500 of filament as described above, e.g., which can be formed in the same manners as described above. Any desired number of filament layers, having any desired filament paths and arrangements, may be provided as upper blank intermediate 1200 without departing from this invention (including one or more filament based layers and/or any individual layer and/or combination of layers described above).

Once the desired upper blank intermediate 1200 has been prepared including one or more filament layers (e.g., by extrusion, solid deposition modeling, etc.) on the extruder substrate 106, a release liner 1202 may be applied, e.g., to cover a portion of the top surface of the upper blank intermediate 1200 (e.g., a portion of the first layer extending inwardly from a peripheral edge of the first layer may be covered with the release liner 1202, such as a portion around one or both sides of the instep opening, a portion around one or both sides of the ankle opening, a portion around the bottom edge where the upper will meet a sole structure, etc.). The release liner 1202 may be made from paper, plastic, or any type of material, provided that the release liner 1202 does not become permanently fixed to the filament material(s) to be included in the upper component in the steps to follow.

Figure 6B:
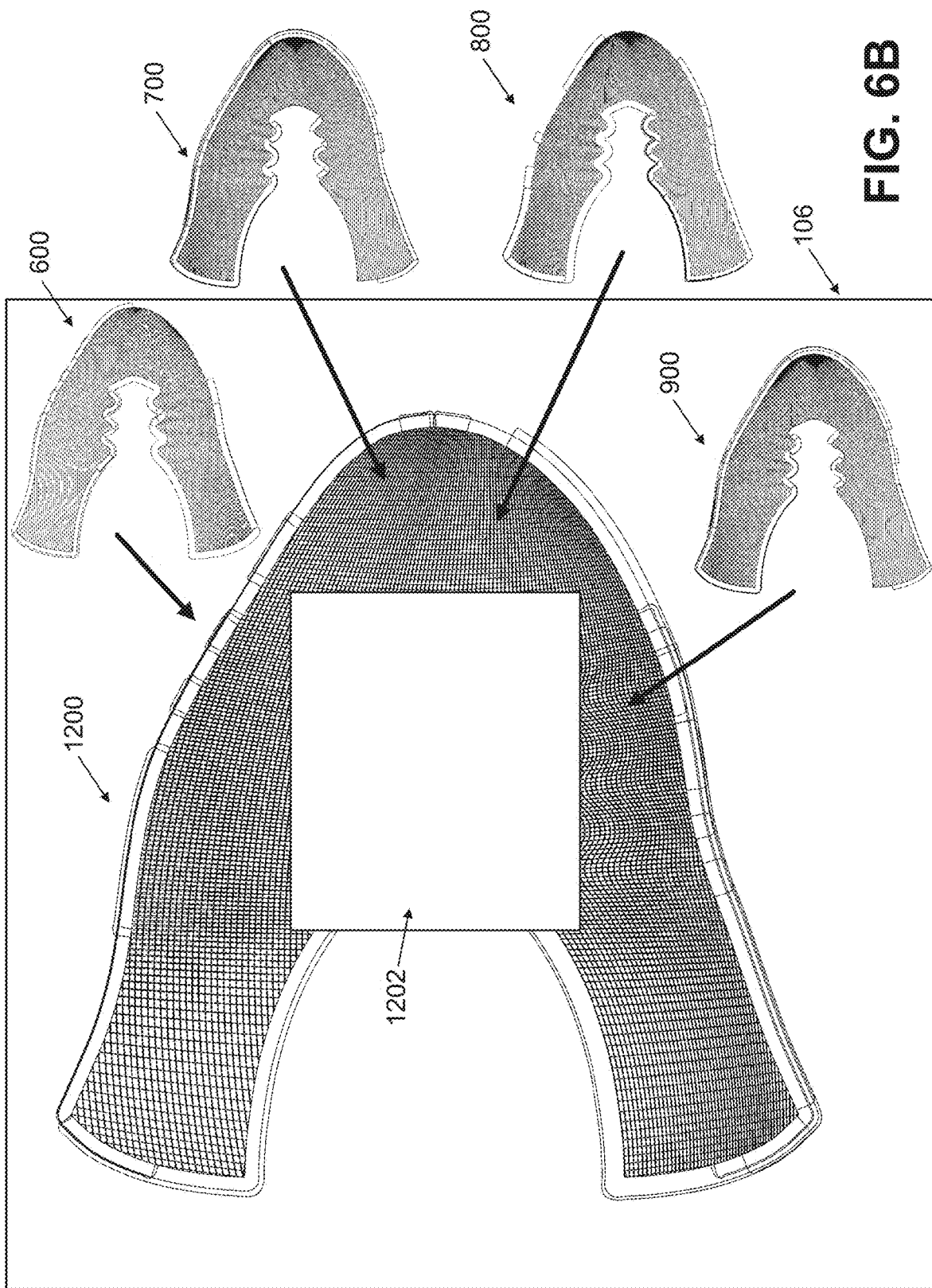

With the release liner 1202 in place, one or more additional layers of filament may be extruded to form one or more additional layers of the upper component. For example, as shown in FIG. 6B, the fifth layer 600, sixth layer 700, seventh layer 800, and/or the eighth layer 900 described above may be extruded onto the release liner 1202 and the upper intermediate 1200 (which may include the first layer 300, second layer 350, third layer 400, and/or fourth layer 500 described above). In this illustrated example, one or more additional materials are extruded to form one or more additional layers of extruded filament, optionally including additional plural, non-intersecting, spaced apart path segments in the individual layer(s). The additional extruded filament(s) may have any of the dimensional and/or other filament characteristics described above. The additional layer extruding step(s) of this example may include: (a) applying a first portion of the additional filament layer(s) to the release liner 1202 such that the release liner 1202 extends between a first portion of the previously extruded filament layer(s) (in upper intermediate 1200) and the first portion of the additional layer(s) of filament and (b) fusing a second portion of the additional layer(s) of filament to a second portion of the previously extruded filament layer(s) (in upper intermediate 1200) at locations where the more recently extruded filament layer(s) contact the previously extruded filament layers. In this manner, the additional filament layer(s) applied after the release liner 1202 is positioned will join to (in an adhesive free manner) to the previously extruded filament layer(s) at areas away from the release liner 1202 to provide a unitary upper component (e.g., an overall upper component, like upper blank 1000 described above).

Figure 6C:
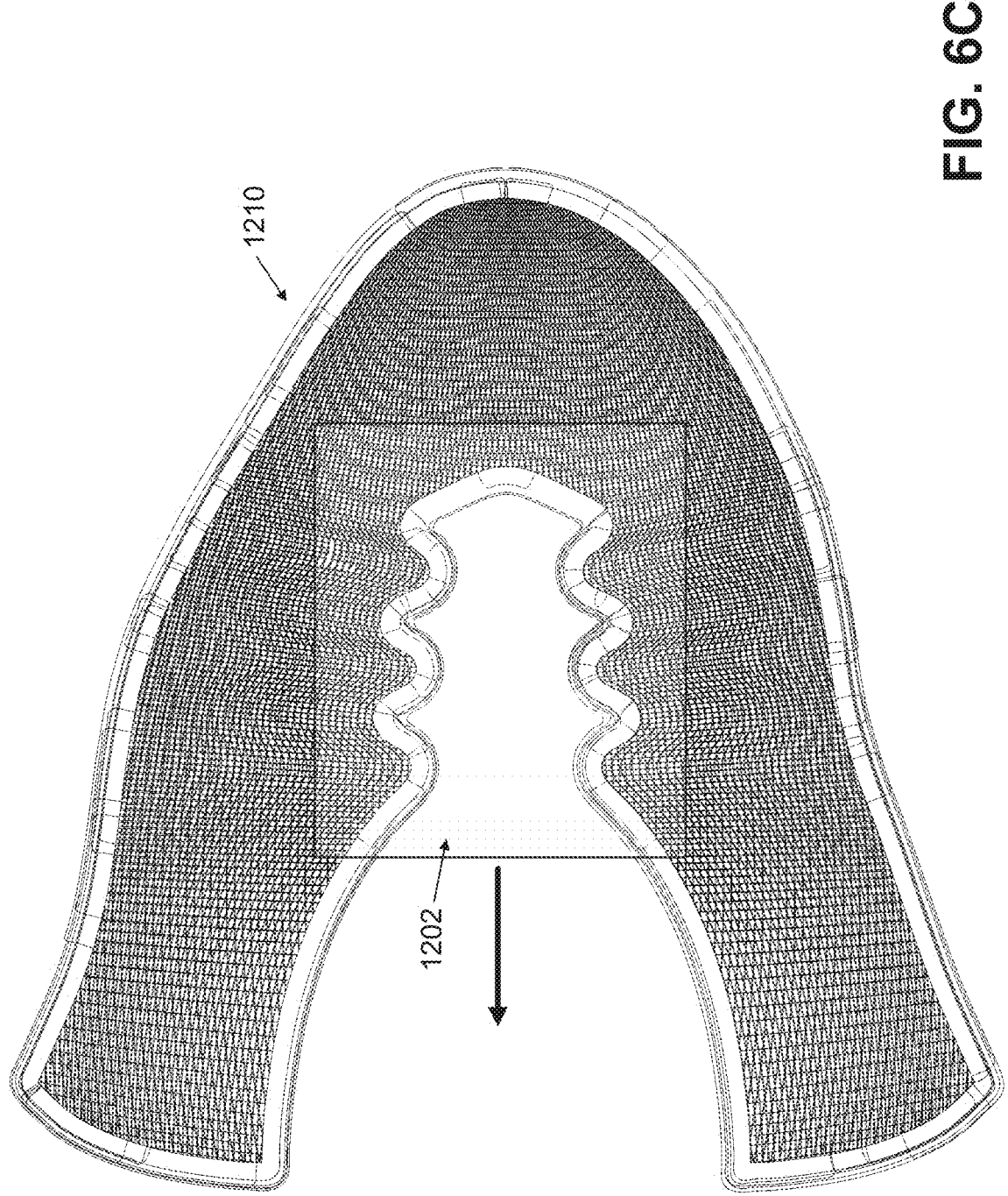

Once all of the desired additional filament layers are extruded and joined to the previously extruded filament layers of upper intermediate 1200, a combined upper component 1210 and release liner 1202 combination is present, e.g., as shown in FIG. 6C. At this time, one or more of the upper component 1210 filament layers are located below a bottom surface of the release liner 1202 and one or more of the upper component 1210 filament layers are located above a top surface of the release liner 1202. At this time, the upper component 1210 and release liner 1202 can be removed from the extruder substrate 106, and the release liner 1202 can be removed from its location between the first portion of the lower filament layer(s) of the upper component 1210 (e.g., layers 300, 350, 400, 500) and the first portion of the upper filament layer(s) of the upper component 1210 (e.g., layers 600, 700, 800, 900). Because of the previous presence of the release liner 1202, the first portion of the lower filament layer(s) of the upper component 1210 (e.g., layers 300, 350, 400, 500) will remain unfixed to the first portion of the upper filament layer(s) of the upper component 1210 (e.g., layers 600, 700, 800, 900) at the location where the release liner 1202 was present (although all layers 300-900 may be fixed together at the "second portions" thereof, where the release liner 1202 was not present). In other words, the presence and removal of the release liner 1202 forms a "pocket" between layers of the upper component 1210.

Figure 6D:
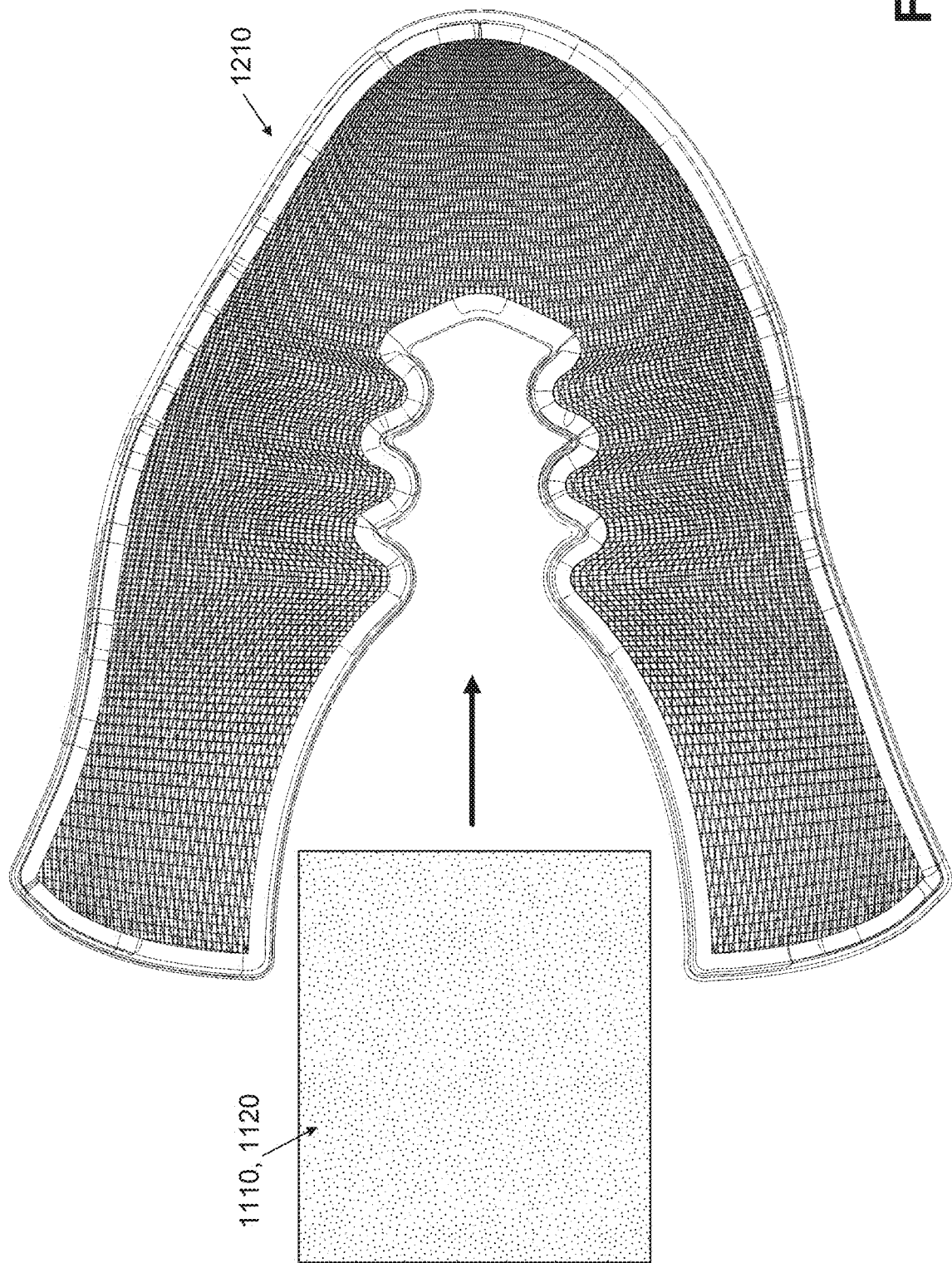
Figure 6E:
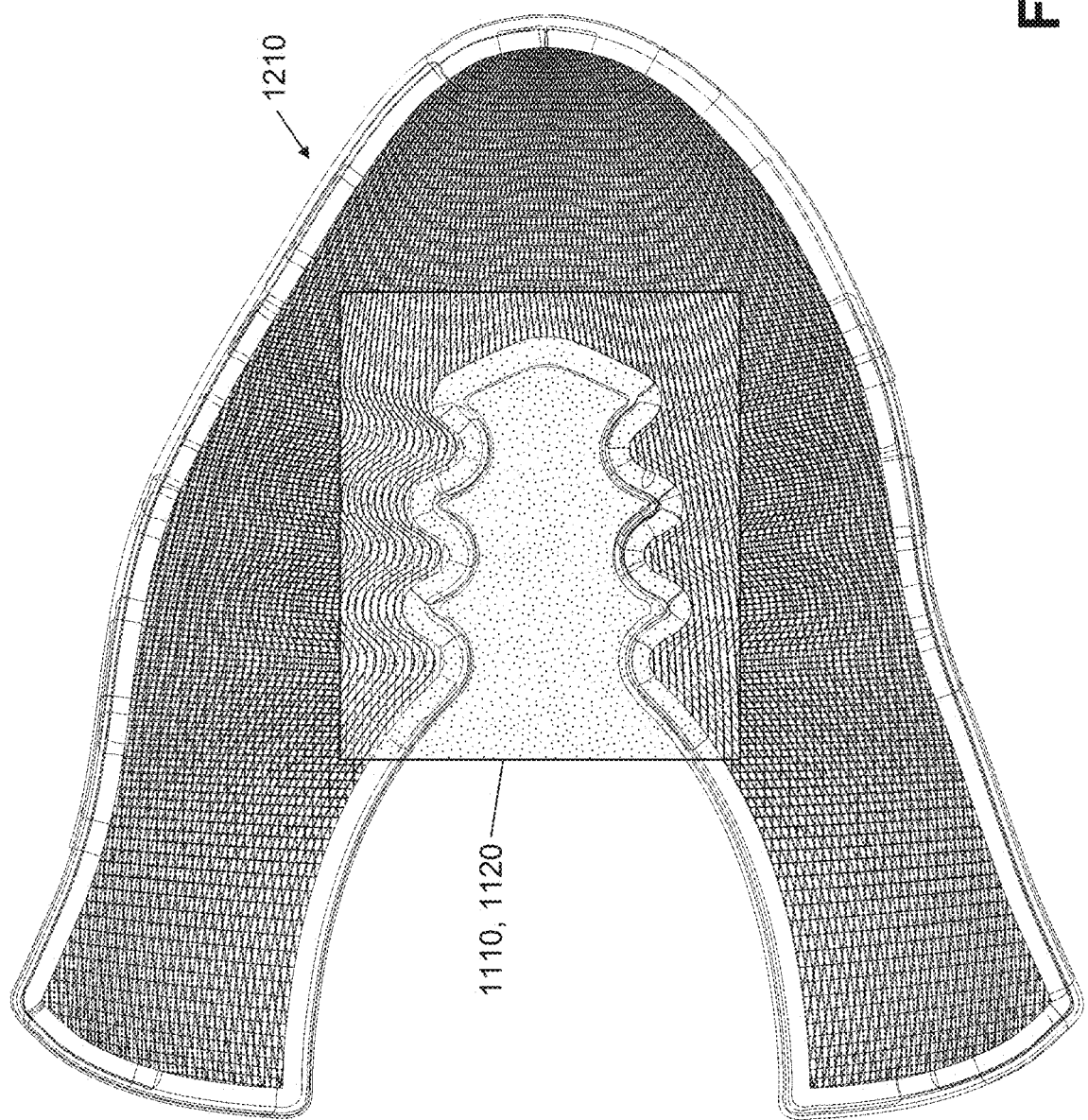

At this time, as shown in FIG. 6D, another upper component (e.g., fabric component 1110, 1120 like those described above) may be placed into the "pocket" formed between layers of the upper component 1210 where the release liner 1202 was removed. The upper component 1110 could be engaged with the upper component 1210 via adhesives, as described above in conjunction with FIG. 4C. Alternatively, when upper component 1120 includes a fusible material (e.g., a fabric element of the types described above in conjunction with FIGS. 5D-5F), then upper component 1120 can be engaged with the upper component 1210 in an adhesive free manner, e.g., by fusing the fusible material of the upper component 1120 with the extruded filament material(s) of the upper component 1210. This action can place and fix the upper component 1120 between individual layers of the upper component 1210, e.g., as shown in the cross section of FIG. 5C. If needed, this fusing step can include, for example, applying heat and/or pressure to the combined upper component 1120/upper component 1210, e.g., in the form shown in FIG. 6E. If necessary, the upper component 1120 (and/or 1210) can be trimmed, combined with other upper components, and/or otherwise processed, if necessary, e.g., in preparation for incorporation into a footwear structure. While FIGS. 6A to 6E show the upper component 1110/1120 between central layers of the filament based upper component 1210, this is not a requirement. Rather, the upper component 1110/1120 may be placed between any desired filament layers of upper component 1210 without departing from this invention (e.g., between layers closer to the upper interior and/or between layers closer to the upper exterior).

The upper component 1110, 1120 may form any desired portion or proportion of the footwear upper structure without departing from this invention. As some more specific examples, the upper component 1110, 1120 may provide or overlap with less than 50%, and in some examples, less than 40%, less than 30%, less than 20%, or even less than 10% of a total surface area of the upper component 1210 (the term "total surface area" as used herein in this context means the complete area defined within the outermost perimeter of the upper component 1210, including open space defined between individual filaments of the upper component 1210). The second (e.g., fabric) upper component 1110, 1120 may form any desired portion of the overall upper construction, including one or more of: an instep/tongue portion of the upper, a vamp portion of the upper, a lace-engaging portion of the upper, a foot-receiving opening of the upper, a collar of the upper, a rear heel engaging portion of the upper, etc.

Figure 7A:
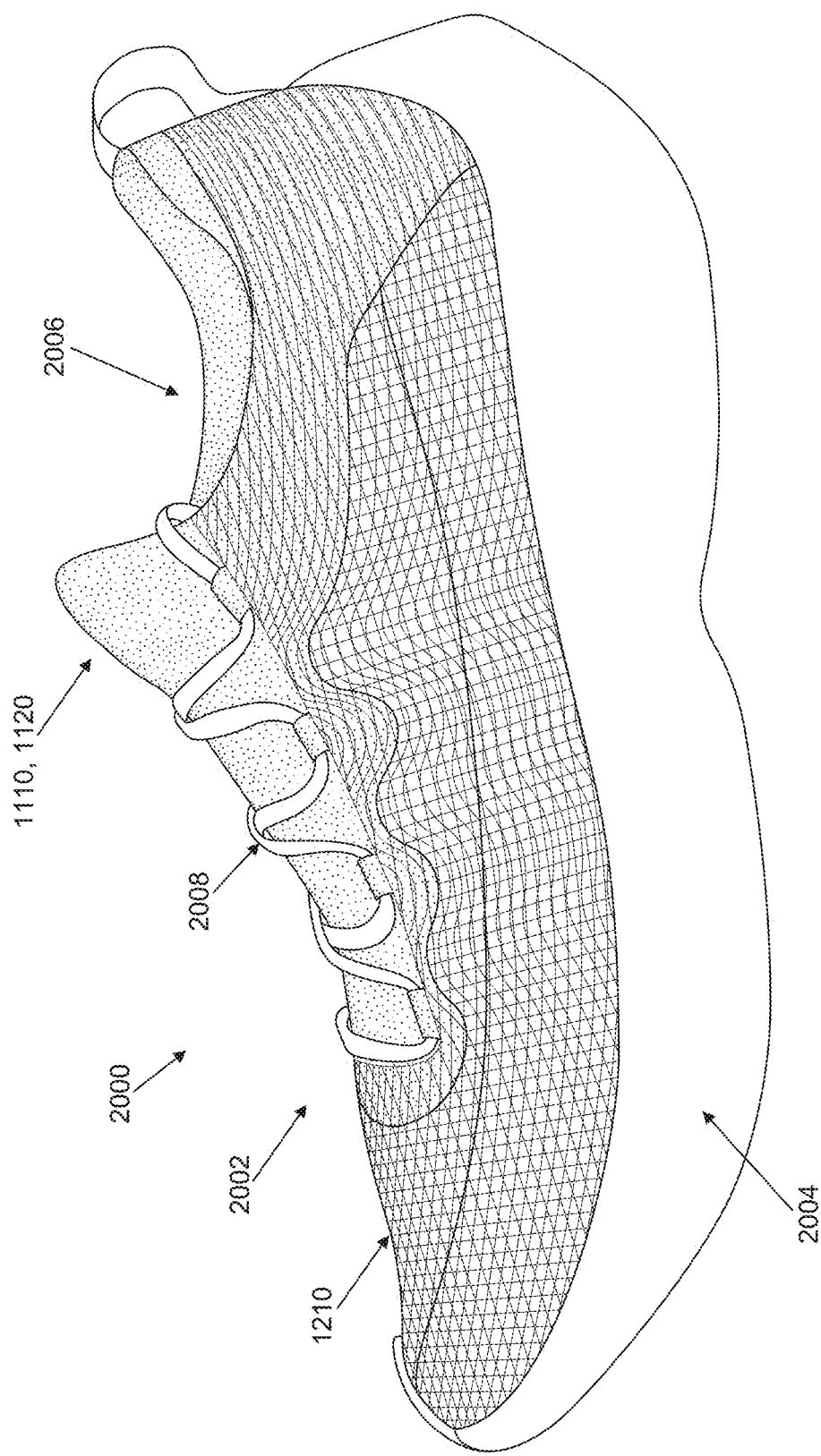
FIGS. 7A-7C illustrate an article of footwear including a multi-layer extruded filament component in accordance with one example of this invention.
Figure 7B:
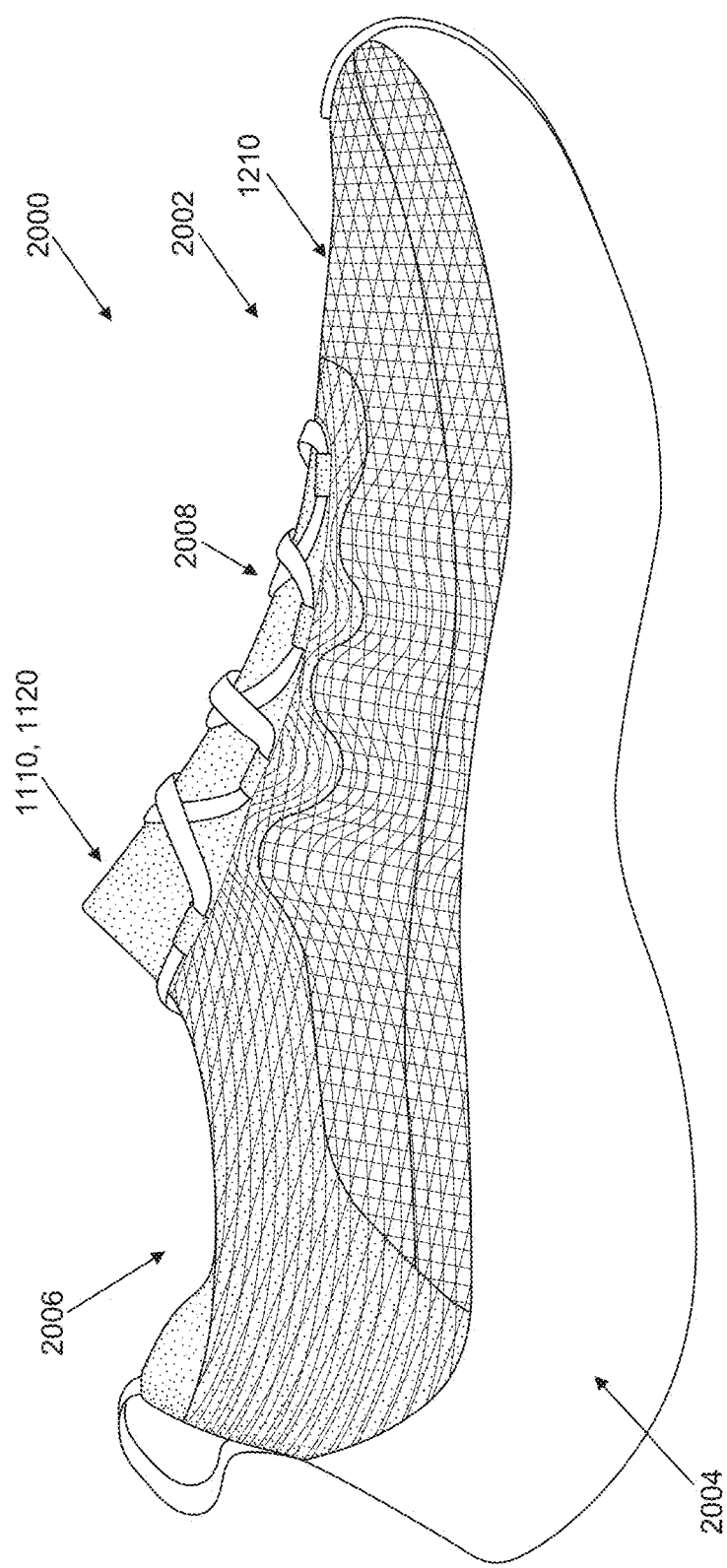
Figure 7C:
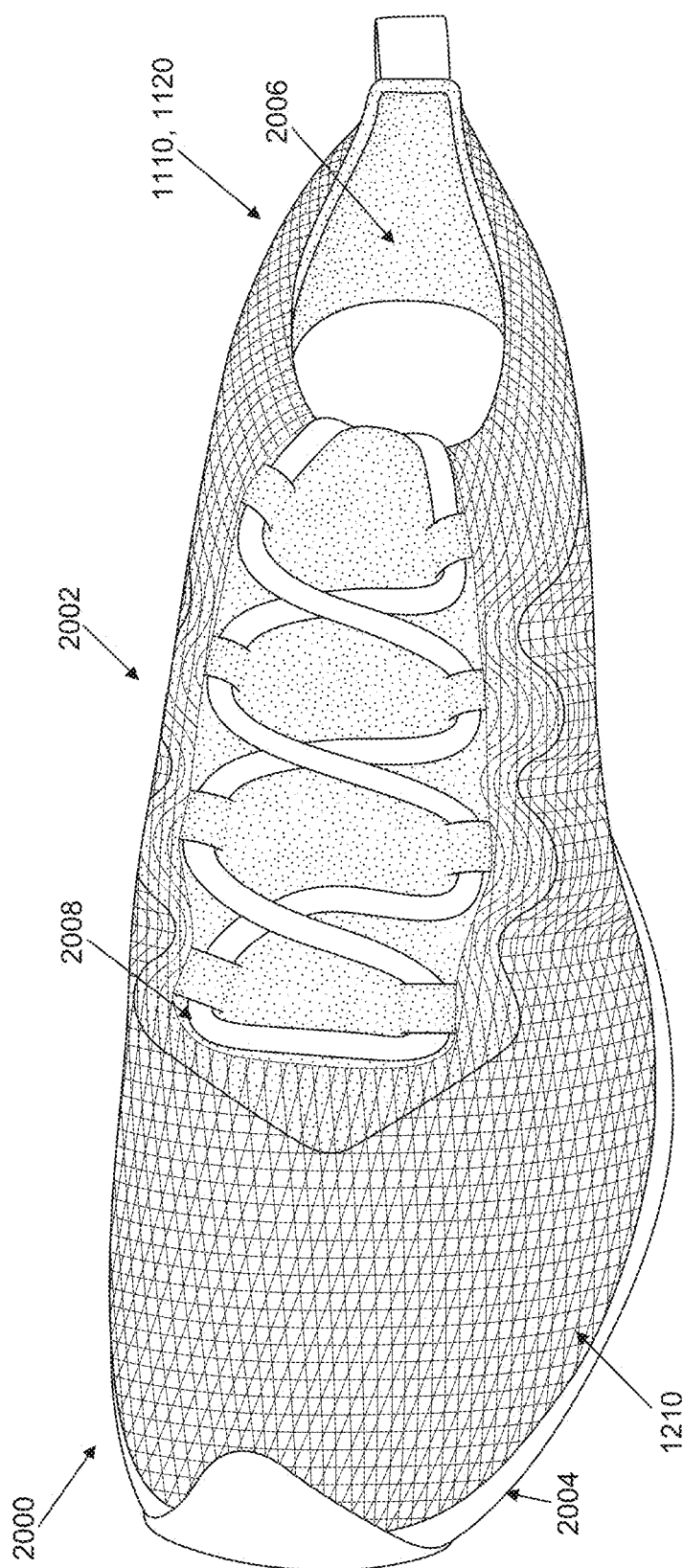

FIGS. 7A-7C illustrate an example article of footwear 2000 including an upper 2002 having at least a portion formed as a multi-layered filament type upper blank 1000 of the types described above. As shown in these figures, the upper 2002 includes the combined upper component 1110, 1120/upper component 1210, e.g., of the types described above in conjunction with FIGS. 6A-6E. The upper component 1110, 1120 may be combined with a filament based upper component (e.g., like upper blank 1000) in any desired manner, including the various manners described above in conjunction with FIGS. 4A-6E. As shown in these figures, upper component 1110, 1120 of this example is one or more fabric elements that extend along a lace-engaging region and an instep region of the upper 2002 (e.g., forming a "tongue" like element and/or vamp portion of the upper 2002), around the foot-insertion opening 2006 (e.g., to provide a comfort enhancing collar around the ankle), and down around a rear heel portion of the upper 2002 (e.g., to provide comfort at the heel).

Both the fabric upper component 1110, 1120 and the filament based upper component 1210 of this illustrated example include openings and/or other structures for engaging a shoe lace 2008. Alternatively, if desired, only one of fabric upper component 1110, 1120 and the filament based upper component 1210 may include lace engaging openings or structures. As another option or alternative, if desired, the fabric upper component 1110, 1120 may include lace engaging openings or structures in one or more areas of the upper 2002 and the filament based upper component 1210 may include lace engaging openings or structures in one or more other areas of the upper 2002. If desired, when the filament based upper component 1210 engages the lace 2008, the lace 2008 may extend through openings provided in the filament based upper component 1210 between individual filaments of a multi-layered upper structure.

The upper component 2002 may be engaged with a sole structure 2004 in any desired manner, including in conventional manners as are known and used in the footwear arts (e.g., adhesives, mechanical connectors, sewn seams, etc.). Any desired type of sole structure 2004 may be provided, including one or multi-part sole structures as are known and used in the footwear arts. In some examples of this invention, the sole structure 2004 will include a lightweight foam or fluid-filled bladder structure (optionally made from a hydrophobic, water-repelling, and/or non-water absorbing material(s)). The sole structure 2004 also may include track spikes, cleats, and/or other traction enhancing elements.

Footwear uppers in accordance with examples of this invention, including extruded filament based upper components of the types described above (including upper blank 1000, upper component 1210, and/or upper 2002), can provide many desirable properties, particularly for athletic footwear constructions. The upper blank 1000, upper component 1210, and/or upper 2002 can be made very lightweight and/or breathable in view of the large number of openings between the various filaments in the layers, the thin structures of the filaments, and the relatively reduced volume of heavier materials present. As another potential advantage, as noted above, the filament(s) may be made from hydrophobic material(s) and/or material(s) that do not substantially absorb water. Thus, if the upper 2002 is exposed to wet conditions during use, the filament(s) may shed/repel the water, maintaining a lightweight condition. The ability to maintain a lightweight condition even when used in wet conditions can be further enhanced in upper structures in which any fabric based upper component(s) (e.g., component 1110, 1120) included in the upper 2002 also is/are formed (at least in part) from hydrophobic material(s) and/or material(s) that do not substantially absorb water (such as thermoplastic polyurethane materials and/or other thermoplastic materials and/or other hydrophobic and/or water repelling materials that may be provided as the fusible component, e.g., in the manners described in one or more of FIGS. 5D-5F) and/or if the sole structure 2004 is formed (at least in part) from hydrophobic material(s) and/or material(s) that do not substantially absorb water (such as thermoplastic polyurethane materials and/or other thermoplastic materials and/or other hydrophobic and/or water repelling materials). When the upper component 1210 is formed at least in part as a multi-layered filament construction, many different colors and color combinations can be used to provide a wide range of aesthetic and design opportunities, including production of a moiré effect, e.g., as shown in FIGS. 1 and 3A-3P.

Also, the extruded filament type structures and production methods allow seamless transitions between upper structural features that provide different functions and/or characteristics (e.g., seamless transitions between areas providing increased support and lock down with areas providing improved flexibility; seamless changes in breathability in different areas; etc., by changing the filament sizes, spacings, materials, etc.). Moreover, a relatively uniform overall upper thickness with the multi-layered filament construction can provide varying stretch and/or breathability characteristics in different areas of the upper with a seamless, one piece, unitary construction. As another potential advantage/ feature, the upper blank 1000/upper component 1210 can be formed by the multi-layer extrusion process without producing tensile stresses to the individual filaments of the upper construction.

Figure 8A:
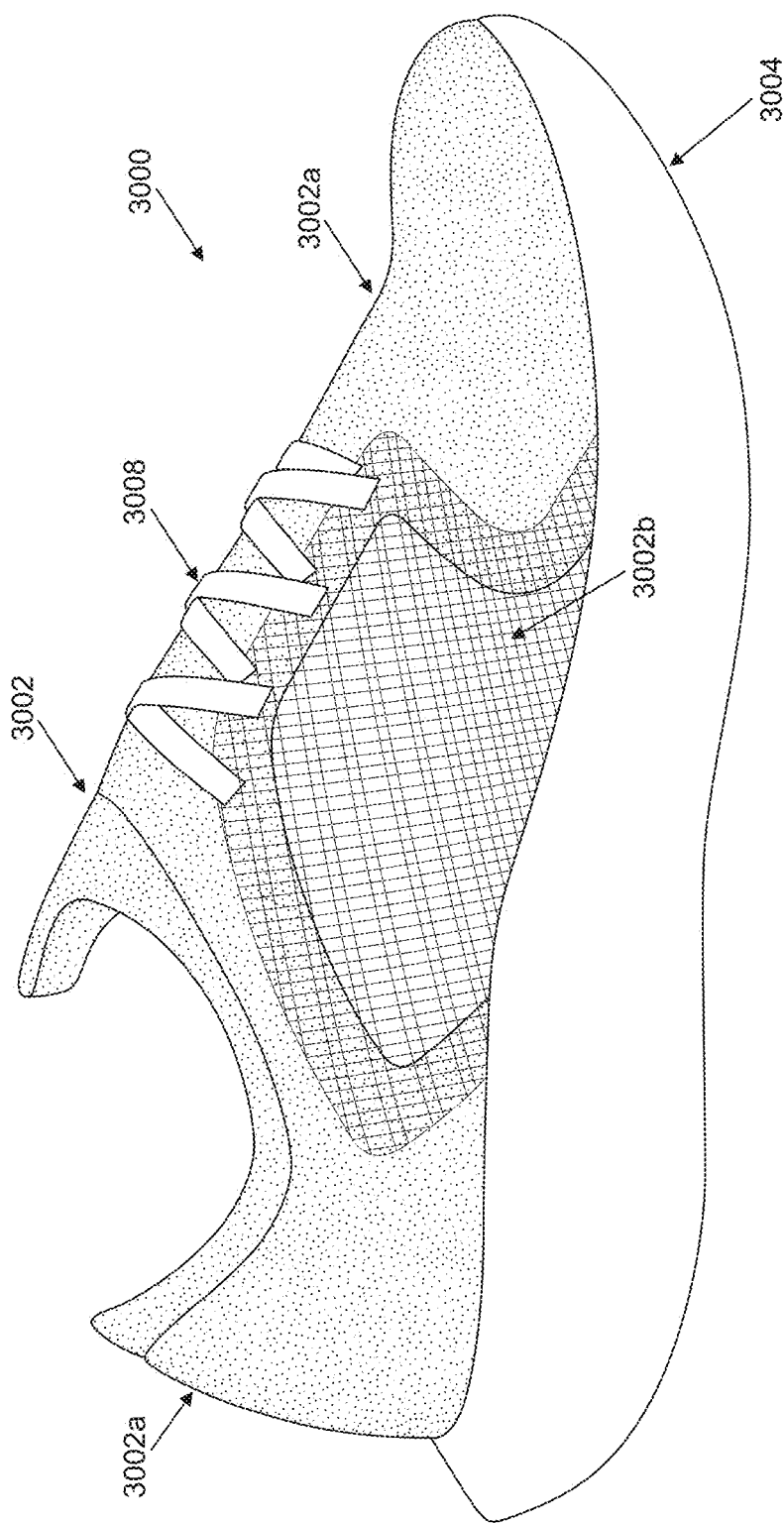
FIGS. 8A-8B illustrate an article of footwear including a multi-layer extruded filament component in accordance with another example of this invention.
Figure 8B:
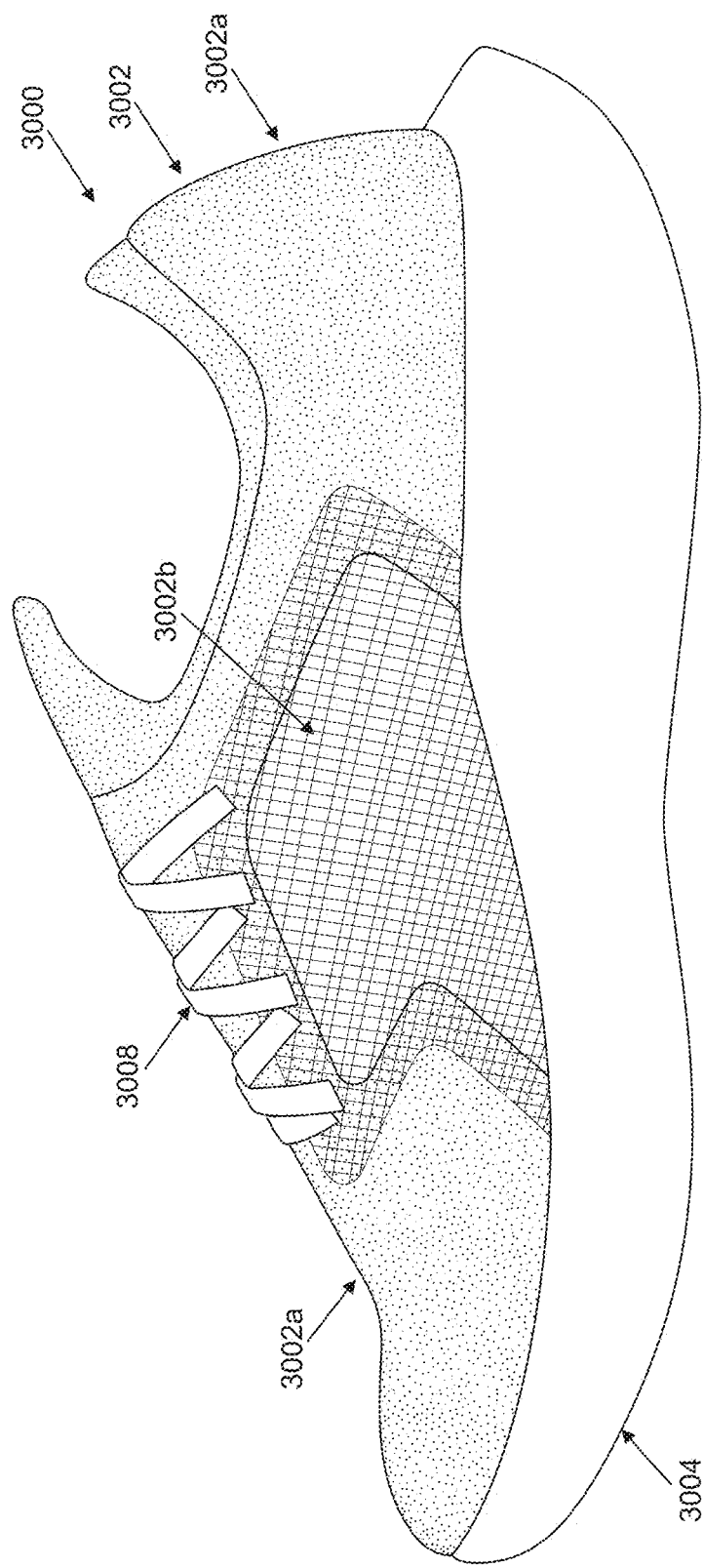

In the specific examples described above, the filament based upper component forms an upper component (such as an upper blank) that substantially covers or surrounds the wearer's foot (from the rear heel area, through the midfoot area, and to a forward toe area). Other options are possible in which the filament based upper component (e.g., having any desired number of extruded layers, including from 1 to 20 layers, and in some examples, from 2 to 16 layers, 3 to 12 layers, 4-10 layers, or even 8 layers) form one or more discrete portions of an overall upper. FIGS. 8A and 8B illustrate an article of footwear 3000 having such an upper 3002 engaged with a sole structure 3004. As shown in these figures, the upper 3002 of this example includes one or more fabric based upper components 3002a and one or more extruded filament based upper components 3002*b* (which may include one or more layers of extruded filaments of the types described above). The extruded filament based upper components 3002*b* of this example form a lateral side upper panel (FIG. 8A) and a separate medial side upper panel (FIG. 8B). These extruded filament based upper components 3002*b* may be engaged with the other upper component(s) 3002*a* in any desired manner, including any of the manners described above in conjunction with FIGS. 4A to 6E (including via adhesives and/or in an adhesive free manner).

As further shown in FIGS. 8A and 8B, in this illustrated example, both the fabric upper component 3002*a* and the filament based upper component 3002*b* include openings and/or other structures for engaging a shoe lace 3008. Alternatively, if desired, only one of fabric upper component 3002*a* and the filament based upper component 3002*b* may include lace engaging openings or structures. As another option or alternative, if desired, the fabric upper component 3002*a* may include lace engaging openings or structures in one or more areas of the upper 3002 and the filament based upper component 3002*b* may include lace engaging openings or structures in one or more other areas of the upper 3002. If desired, when the filament based upper component 3002*b* engages the lace 3008, the lace 3008 may extend through openings provided in the filament based upper component 3002*b* between individual filaments of a multi-layered upper structure.

The upper component 3002*a* may have any desired structure and/or may be made of any desired materials without departing from this invention, including conventional structures and/or materials as are known and used in the footwear arts and/or structures as described above in conjunction with FIGS. 5A-7C (including hydrophobic, water-repelling, and/or non-water absorbing material(s)). The sole structure 3004 may be any desired type of sole structure, including one or multi-part sole structures as are known and used in the footwear arts. In some examples of this invention, the sole structure 3004 will include a lightweight foam or fluid-filled bladder structure (optionally made from a hydrophobic, water-repelling, and/or non-water absorbing material(s)). The sole structure 3004 also may include track spikes, cleats, and/or other traction enhancing elements.

Even with only a portion of the upper 3002 formed by extruded filament based upper components 3002*b*, enhanced breathability and/or lightweight characteristics can be realized. The extruded filament based upper components 3002*b* can be placed at any locations where enhanced breathability may be required or desired. As to weight reduction, in the example structure of FIGS. 8A-8B, the use of the two extruded filament based upper components 3002*b* reduces the overall weight of upper 3002 by about 24 grams as compared to a similar upper made fully with component 3002*a* (i.e., with component 3002*a* extending through the medial and lateral midfoot regions). In some examples of this invention, the filament based upper component(s) 3002*b* may form from 15% to 100% of the overall upper surface area, and in some examples, from 25% to 100%, 35% to 100%, 50% to 100%, or 60% to 100%, or even 75% to 100% of the overall upper surface area.

If desired, as generally shown in FIG. 9, when one or more of the upper layers (e.g., one or more of layers 300, 350, 400, 500, 600, 700, 800, and/or 900) are formed by filament extrusion/solid deposition modeling (e.g., forming upper blank 1000), a footwear strobel component (or sock liner) 1020 may be formed along with one or more of the filament layer(s) by the extrusion/solid deposition modeling technique (optionally, as part of a continuous path with one or more of the filament layers). As shown in FIG. 9, the strobel component 1020 may be integrally formed with the upper component 1000, e.g., along one or more edges of the upper component 1000 (e.g., at a lateral lower perimeter edge, a medial lower perimeter edge, a forefoot edge, one or more rear heel edges, etc.). The strobel component 1020 may be formed as filaments, e.g., having any of the characteristics, features, and/or options for the filaments described above (e.g., with a grid or matrix structure, in multiple layers, with intersecting/overlapping filament path segments, etc.). Once the overall upper/strobel combination 1040 is formed, the strobel 1020 can be folded along its integral edge with the upper component 1000 and attached at its free perimeter edge 1020P with the bottom perimeter edge 1000P of the upper component 1000 (e.g., by adhesives, by fusing, etc.). The strobel component 1020 could be formed as two or more parts, e.g., at two or more separated locations along the upper perimeter 1000P.

III. CONCLUSION

The present invention is disclosed above and in the accompanying drawings with reference to a variety of embodiments and/or options. The purpose served by the disclosure, however, is to provide examples of various features and concepts related to the invention, not to limit the scope of the invention. One skilled in the relevant art will recognize that numerous variations and modifications may be made to the features of the invention described above without departing from the scope of the present invention, as defined by the appended claims.

For the avoidance of doubt, the present application includes at least the subject matter described in the following numbered Clauses:

Clause 1. An upper for an article of footwear, comprising:
  a first upper component that includes a first layer including a first material as a first filament including first plural, non-intersecting, spaced apart path segments, wherein the first filament has a width dimension of less than 1 mm wide; and
  a second upper component including a fabric element formed at least in part of a fusible material; and
  wherein the fusible material of the second upper component is fused to the first material of the first upper component.

Clause 2. The upper according to Clause 1, wherein the first upper component further includes a second layer including a second material as a second filament including second plural, non-intersecting, spaced apart path segments, wherein the second filament has a width dimension of less than 1 mm wide, and wherein the second layer is fused to the first layer at locations where the second layer contacts the first layer.

Clause 3. The upper according to Clause 2, wherein the second plural, non-intersecting, spaced apart path segments include at least 5 second non-intersecting path segments, wherein each non-intersecting path segment of the at least 5 second non-intersecting path segments is spaced apart from each directly adjacent second non-intersecting path segments by less than 5 mm over a length dimension of at least 25 mm.

Clause 4. The upper according to Clause 2, wherein the second plural, non-intersecting, spaced apart path segments include at least 5 second non-intersecting path segments, wherein each non-intersecting path segment of the at least 5 second non-intersecting path segments is spaced apart from each directly adjacent second non-intersecting path segments by less than 5 mm over a length dimension of at least 50 mm.

Clause 5. The upper according to any one of Clauses 2 to 4, wherein the second upper component has a first major surface and a second major surface opposite the first major surface, wherein the fusible material at the first major surface of the second upper component is fused to the first material, and wherein the fusible material at the second major surface of the second upper component is fused to the second material.

Clause 6. The upper according to any one of Clauses 2 to 5, wherein a plurality of the second plural, non-intersecting, spaced apart path segments of the second filament extend parallel to and partially overlap with a plurality of the first plural, non-intersecting, spaced apart path segments of the first filament over a path segment length of at least 25 mm.

Clause 7. The upper according to any one of Clauses 2 to 5, wherein a plurality of the second plural, non-intersecting, spaced apart path segments of the second filament extend parallel to and partially overlap with a plurality of the first plural, non-intersecting, spaced apart path segments of the first filament over a path segment length of at least 50 mm.

Clause 8. The upper according to Clause 6 or 7, wherein 15% to 60% of a width of one or more filaments of the plurality of the second plural, non-intersecting, spaced apart path segments of the second filament overlaps with a corresponding one or more filaments of the plurality of the first plural, non-intersecting, spaced apart path segments of the first filament over the path segment length.

Clause 9. The upper according to Clause 6 or 7, wherein 25% to 50% of a width of one or more filaments of the plurality of the second plural, non-intersecting, spaced apart path segments of the second filament overlaps with a corresponding one or more filaments of the plurality of the first plural, non-intersecting, spaced apart path segments of the first filament over the path segment length.

Clause 10. The upper according to any one of Clauses 2 to 5, wherein a plurality of the second plural, non-intersecting, spaced apart path segments of the second filament intersect and form an angle with a plurality of the first plural, non-intersecting, spaced apart path segments of the first filament.

Clause 11. The upper according to Clause 10, wherein the angle is within a range of 65° to 90°.

Clause 12. The upper according to Clause 10 or 11, wherein the plurality of the second plural, non-intersecting, spaced apart path segments of the second filament and the plurality of the first plural, non-intersecting, spaced apart path segments of the first filament cooperate to form one or more diamond shapes.

Clause 13. The upper according to Clause 12, wherein the diamond shapes are located at least in a forefoot region of the upper.

Clause 14. The upper according to Clause 12 or 13, wherein a long axis of a plurality of the diamond shapes extend in substantially an anterior-posterior direction of the upper.

Clause 15. The upper according to any one of Clauses 2 to 14, wherein the first filament has a first thickness at a first region of the upper, wherein the second filament has a second thickness at a second region of the upper, and wherein the first thickness differs from the second thickness.

Clause 16. The upper according to any one of Clauses 2 to 15, wherein the first filament has a first diameter at a first region of the upper, wherein the second filament has a second diameter at a second region of the upper, and wherein the first diameter differs from the second diameter.

Clause 17. The upper according to Clause 2, wherein portions of the first layer and the second layer form are oriented with respect to one another to form an intersecting grid of the first filament extending in a first direction and the second filament extending in a second direction.

Clause 18. The upper according to any one of Clauses 2 to 17, wherein the first upper component further includes a third layer including a third material as a third filament including third plural, non-intersecting, spaced apart path segments, wherein the third filament has a width dimension of less than 1 mm wide, and wherein the third layer is fused to either or both of the first layer and to the second layer at locations where the third layer contacts either or both of the first layer and the second layer, respectively.

Clause 19. The upper according to Clause 18, wherein the first upper component further includes a fourth layer including a fourth material as a fourth filament including fourth plural, non-intersecting, spaced apart path segments, wherein the fourth filament has a width dimension of less than 1 mm wide, and wherein the fourth layer is fused to any one of or any combination of the first layer, the second layer, and the third layer at locations where the fourth layer contacts to any one of or any combination of the first layer, the second layer, and the third layer, respectively.

Clause 20. The upper according to Clause 19, wherein the first upper component further includes a fifth layer including a fifth material as a fifth filament including fifth plural, non-intersecting, spaced apart path segments, wherein the fifth filament has a width dimension of less than 1 mm wide, and wherein the fifth layer is fused to any one of or any combination of the first layer, the second layer, the third layer, and the fourth layer at locations where the fifth layer contacts any one of or any combination of the first layer, the second layer, the third layer, and the fourth layer, respectively.

Clause 21. The upper according to Clause 20, wherein the first upper component further includes a sixth layer including a sixth material as a sixth filament including sixth plural, non-intersecting, spaced apart path segments, wherein the sixth filament has a width dimension of less than 1 mm wide, and wherein the sixth layer is fused to any one of or any combination of the first layer, the second layer, the third layer, the fourth layer, and the fifth layer at locations where the sixth layer contacts any one of or any combination of the first layer, the second layer, the third layer, the fourth layer, and the fifth layer, respectively.

Clause 22. The upper according to Clause 21, wherein the first upper component further includes a seventh layer including a seventh material as a seventh filament including seventh plural, non-intersecting, spaced apart path segments, wherein the seventh filament has a width dimension of less than 1 mm wide, and wherein the seventh layer is fused to any one of or any combination of the first layer, the second layer, the third layer, the fourth layer, the fifth layer, and the sixth layer at locations where the seventh layer contacts any one of or any combination of the first layer, the second layer, the third layer, the fourth layer, the fifth layer, and the sixth layer, respectively.

Clause 23. The upper according to Clause 22, wherein the first upper component further includes an eighth layer including an eighth material as an eighth filament including eighth plural, non-intersecting, spaced apart path segments, wherein the eighth filament has a width dimension of less than 1 mm wide, and wherein the eighth layer is fused to any one of or any combination of the first layer, the second layer, the third layer, the fourth layer, the fifth layer, the sixth layer, and the seventh layer at locations where the eighth layer contacts any one of or any combination of the first layer, the second layer, the third layer, the fourth layer, the fifth layer, the sixth layer, and the seventh layer, respectively.

Clause 24. The upper according to any one of Clauses 1 to 23, wherein the first filament of the first layer defines a perimeter, and wherein filament segments of the first filament extend between portions of the perimeter.

Clause 25. The upper according to any one of Clauses 1 to 24, wherein the first plural, non-intersecting, spaced apart path segments extend in a serpentine configuration including at least two peaks and at least two valleys.

Clause 26. The upper according to any one of Clauses 1 to 24, wherein the first plural, non-intersecting, spaced apart path segments extend in a substantially anterior-posterior direction of the upper and include a serpentine configuration having at least two peaks and at least two valleys.

Clause 27. The upper according to Clause 25 or 26, wherein the serpentine configuration is formed at least at a medial midfoot portion of the upper component.

Clause 28. The upper according to Clause 25 or 26, wherein the serpentine configuration is formed at least at a lateral midfoot portion of the upper component.

Clause 29. The upper according to any one of Clauses 1 to 28, wherein the first filament has a first thickness at a first region of the upper, wherein the first filament has a second thickness at a second region of the upper, and wherein the first thickness differs from the second thickness.

Clause 30. The upper according to any one of Clauses 1 to 28, wherein the first filament has a first diameter at a first region of the upper, wherein the first filament has a second diameter at a second region of the upper, and wherein the first diameter differs from the second diameter.

Clause 31. The upper according to any one of Clauses 1 to 30, wherein the first layer forms a perimeter of the upper.

Clause 32. The upper according to any one of Clauses 1 to 31, wherein the filament in each layer of the first upper component is made from the same material.

Clause 33. The upper according to any one of Clauses 1 to 32, wherein the filament in each layer of the first upper component comprises a thermoplastic polyurethane material or other thermoplastic material.

Clause 34. The upper according to any one of Clauses 1 to 33, wherein the filament in each layer of the first upper component comprises a material that does not substantially absorb water.

Clause 35. The upper according to any one of Clauses 1 to 34, wherein the filament in each layer of the first upper component comprises a hydrophobic material.

Clause 36. The upper according to any one of Clauses 1 to 35, wherein at least a portion of the first upper component exhibits a moiré effect.

Clause 37. The upper according to any one of Clauses 1 to 36, wherein the second upper component has a first major surface and a second major surface opposite the first major surface, and wherein the first upper component is engaged at least with the first major surface of the second upper component.

Clause 38. The upper according to any one of Clauses 1 to 37, wherein the first plural, non-intersecting, spaced apart path segments include at least 5 first non-intersecting path segments, wherein each non-intersecting path segment of the at least 5 first non-intersecting path segments is spaced apart from each directly adjacent first non-intersecting path segments by less than 5 mm over a length dimension of at least 25 mm.

Clause 39. The upper according to any one of Clauses 1 to 37, wherein the first plural, non-intersecting, spaced apart path segments include at least 5 first non-intersecting path segments, wherein each non-intersecting path segment of the at least 5 first non-intersecting path segments is spaced apart from each directly adjacent first non-intersecting path segments by less than 5 mm over a length dimension of at least 50 mm.

Clause 40. The upper according to any one of Clauses 1 to 39, wherein the second upper component forms an instep portion or a vamp portion of the upper.

Clause 41. The upper according to any one of Clauses 1 to 40, wherein the second upper component defines a foot-receiving opening or a collar of the upper.

Clause 42. The upper according to any one of Clauses 1 to 41, wherein the second upper component forms a rear heel engaging portion of the upper.

Clause 43. The upper according to any one of Clauses 40 to 42, wherein the first upper component is engaged with an exterior surface of the second upper component.

Clause 44. The upper according to any one of Clauses 1 to 43, wherein the second upper component overlaps with less than 30% of a total surface area of the first upper component.

Clause 45. The upper according to any one of Clauses 1 to 44, wherein the fabric element of the second upper component includes at least one yarn formed from the fusible material.

Clause 46. The upper according to any one of Clauses 1 to 44, wherein the fabric element of the second upper component includes a first yarn formed from the fusible material intertwined with a second yarn formed from a non-fusible material.

Clause 47. The upper according to any one of Clauses 1 to 44, wherein the fabric element of the second upper component includes a first yarn formed from a non-fusible material at least partially coated with the fusible material.

Clause 48. The upper according to Clause 46 or 47, wherein the non-fusible material comprises a polyester material.

Clause 49. The upper according to any one of Clauses 1 to 48, wherein the fusible material comprises a thermoplastic polyurethane material or other thermoplastic material.

Clause 50. An article of footwear, comprising: an upper according to any one of Clauses 1 to 49; and a sole structure engaged with the upper.

Clause 51. A method of forming an upper for an article of footwear, comprising: extruding a first material to form a first layer comprising a first extruded filament including first plural, non-intersecting, spaced apart path segments, wherein the first extruded filament has a width dimension of less than 1 mm wide, and wherein the first layer forms at least a portion of a first upper component; and fusing a second upper component to the first upper component, wherein the second upper component includes a fabric element formed at least in part of a fusible material, wherein fusible material of the second upper component is fused to the first material of the first upper component.

Clause 52. The method according to Clause 51, further comprising: extruding a second material to form a second layer comprising a second extruded filament including second plural, non-intersecting, spaced apart path segments, wherein the second extruded filament has a width dimension of less than 1 mm wide, wherein the step of extruding the second material includes fusing the second layer to the first layer at locations where the second layer contacts the first layer, and wherein the second layer forms a portion of the first upper component.

Clause 53. The method according to Clause 52, wherein a plurality of the second plural, non-intersecting, spaced apart path segments of the second filament are extruded to extend parallel to and partially overlap with a plurality of the first plural, non-intersecting, spaced apart path segments of the first filament over a path segment length of at least 25 mm.

Clause 54. The method according to Clause 52, wherein a plurality of the second plural, non-intersecting, spaced apart path segments of the second filament are extruded to extend parallel to and partially overlap with a plurality of the first plural, non-intersecting, spaced apart path segments of the first filament over a path segment length of at least 50 mm.

Clause 55. The method according to Clause 53 or 54, wherein 15% to 60% of a width of one or more filaments of the plurality of the second plural, non-intersecting, spaced apart path segments of the second filament are extruded to overlap with a corresponding one or more filaments of the plurality of the first plural, non-intersecting, spaced apart path segments of the first filament over the path segment length.

Clause 56. The method according to Clause 53 or 54, wherein 25% to 50% of a width of one or more filaments of the plurality of the second plural, non-intersecting, spaced apart path segments of the second filament are extruded to overlap with a corresponding one or more filaments of the plurality of the first plural, non-intersecting, spaced apart path segments of the first filament over the path segment length.

Clause 57. The method according to Clause 52, wherein a plurality of the second plural, non-intersecting, spaced apart path segments of the second filament are extruded to intersect and form an angle with a plurality of the first plural, non-intersecting, spaced apart path segments of the first filament.

Clause 58. The method according to Clause 57, wherein the angle is within a range of 65° to 90°.

Clause 59. The method according to Clause 57 or 58, wherein the plurality of the second plural, non-intersecting, spaced apart path segments of the second filament and the plurality of the first plural, non-intersecting, spaced apart path segments of the first filament are extruded to form diamond shapes.

Clause 60. The method according to Clause 59, wherein at least a portion of the diamond shapes located at least in a forefoot region of the upper.

Clause 61. The method according to Clause 59 or 60, wherein a long axis of at least a portion of the diamond shapes extend in substantially an anterior-posterior direction of the upper.

Clause 62. The method according to any one of Clauses 52 to 61, wherein the first filament is extruded to have a first thickness at a first region of the upper, wherein the second filament is extruded to have a second thickness at a second region of the upper, and wherein the first thickness differs from the second thickness.

Clause 63. The method according to any one of Clauses 52 to 62, wherein the first filament is extruded to have a first diameter at a first region of the upper, wherein the second filament is extruded to have a second diameter at a second region of the upper, and wherein the first diameter differs from the second diameter.

Clause 64. The method according to Clause 52, wherein portions of the first layer and the second layer form are extruded to be oriented with respect to one another to form an intersecting grid of the first filament extending in a first direction and the second filament extending in a second direction.

Clause 65. The method according to any one of Clauses 52 to 64, further comprising:
extruding a third material to form a third layer comprising a third extruded filament including third plural, non-intersecting, spaced apart path segments, wherein the third extruded filament has a width dimension of less than 1 mm wide, wherein the step of extruding the third material includes fusing the third layer to either or both of the first layer and the second layer at locations where the third layer contacts either or both of the first layer and the second layer, respectively, and wherein the third layer forms a portion of the first upper component.

Clause 66. The method according to Clause 65, further comprising:
extruding a fourth material to form a fourth layer comprising a fourth extruded filament including fourth plural, non-intersecting, spaced apart path segments, wherein the fourth extruded filament has a width dimension of less than 1 mm wide, wherein the step of extruding the fourth material includes fusing the fourth layer to any one of or any combination of the first layer, the second layer, and the third layer at locations where the fourth layer contacts any one of or any combination of the first layer, the second layer, and the third layer, respectively, and wherein the fourth layer forms a portion of the first upper component.

Clause 67. The method according to Clause 66, further comprising:
extruding a fifth material to form a fifth layer comprising a fifth extruded filament including fifth plural, non-intersecting, spaced apart path segments, wherein the fifth extruded filament has a width dimension of less than 1 mm wide, wherein the step of extruding the fifth material includes fusing the fifth layer to any one of or any combination of the first layer, the second layer, the third layer, and the fourth layer at locations where the fifth layer contacts any one of or any combination of the first layer, the second layer, the third layer, and the fourth layer, respectively, and wherein the fifth layer forms a portion of the first upper component.

Clause 68. The method according to Clause 67, further comprising:
extruding a sixth material to form a sixth layer comprising a sixth extruded filament including sixth plural, non-intersecting, spaced apart path segments, wherein the sixth extruded filament has a width dimension of less than 1 mm wide, wherein the step of extruding the sixth material includes fusing the sixth layer to any one of or any combination of the first layer, the second layer, the third layer, the fourth layer, and the fifth layer at locations where the sixth layer contacts any one of or any combination of the first layer, the second layer, the third layer, the fourth layer, and the fifth layer, respectively, and wherein the sixth layer forms a portion of the first upper component.

Clause 69. The method according to Clause 68, further comprising:
extruding a seventh material to form a seventh layer comprising a seventh extruded filament including seventh plural, non-intersecting, spaced apart path segments, wherein the seventh extruded filament has a width dimension of less than 1 mm wide, wherein the step of extruding the seventh material includes fusing the seventh layer to any one of or any combination of the first layer, the second layer, the third layer, the fourth layer, the fifth layer, and the sixth layer at locations where the seventh layer contacts any one of or any combination of the first layer, the second layer, the third layer, the fourth layer, the fifth layer, and the sixth layer, respectively, and wherein the seventh layer forms a portion of the first upper component.

Clause 70. The method according to Clause 69, further comprising:
extruding an eighth material to form an eighth layer comprising an eighth extruded filament including eighth plural, non-intersecting, spaced apart path segments, wherein the eighth extruded filament has a width dimension of less than 1 mm wide, wherein the step of extruding the eighth material includes fusing the eighth layer to any one of or any combination of the first layer, the second layer, the third layer, the fourth layer, the fifth layer, the sixth layer, and the seventh layer at locations where the eighth layer contacts any one of or any combination of the first layer, the second layer, the third layer, the fourth layer, the fifth layer, the sixth layer, and the seventh layer, respectively, and wherein the eighth layer forms a portion of the first upper component.

Clause 71. The method according to any one of Clauses 51 to 70, wherein the step of fusing the second upper component to the first upper component includes fusing an interior surface of first upper component with an exterior surface of the second upper component.

Clause 72. A method of forming an upper for an article of footwear, comprising:
extruding a first material to form a first layer comprising a first extruded filament including first plural, non-intersecting, spaced apart path segments, wherein the first extruded filament has a width dimension of less than 1 mm wide, and wherein the first layer forms a portion of a first upper component;
covering a portion of the first layer with a release liner;
extruding a second material to form a second layer comprising a second extruded filament including second plural, non-intersecting, spaced apart path segments, wherein the second extruded filament has a width dimension of less than 1 mm wide, wherein the step of extruding the second material includes: (a) applying a first portion of the second layer to the release liner such that the release liner extends between a first portion of the first layer and the first portion of the second layer and (b) fusing a second portion of the second layer to a second portion of the first layer at locations where the second layer contacts the first layer, and wherein the second layer forms a portion of the first upper component;
removing the release liner from between the first portion of the first layer and the first portion of the second layer;
placing a portion of a second upper component between the first portion of the first layer and the first portion of the second layer, wherein the portion of the second upper component includes a fabric element formed at least in part of a fusible material; and
fusing the second upper component to the first upper component, wherein fusible material of the second upper component is fused to the first material of the first upper component and to the second material of the first upper component.

Clause 73. The method according to Clause 72, wherein the second upper component includes a first major surface and a second major surface opposite the first major surface, wherein in the placing step, the portion of the second upper component is placed between the first portion of the first layer and the first portion of the second layer such that: (a) the first major surface directly contacts the first layer and does not directly contact the second layer and (b) the second major surface directly contacts the second layer and does not directly contact the first layer.

Clause 74. The method according to Clause 72 or 73, further comprising:
fusing the first material to the fusible material of the second upper component; and
fusing the second material to the fusible material of the second upper component.

Clause 75. The method according to any one of Clauses 72 to 74, wherein the step of extruding the first material includes extruding the first material onto a pre-existing layer including filament material.

Clause 76. The method according to any one of Clauses 72 to 75, wherein prior to fusing the second upper component to the first upper component, the method further comprises:
extruding a third material to form a third layer comprising a third extruded filament to at least partially overlap the first layer and the second layer, wherein the third extruded filament has a width dimension of less than 1 mm wide, wherein the step of extruding the third material includes: (a) applying a first portion of the third layer to the release liner such that the release liner extends between the first portion of the first layer and the first portion of the third layer and (b) fusing a second portion of the third layer to either or both of portions of the first layer and the second layer at locations where the third layer contacts either or both of the first layer and the second layer, respectively, and wherein the third layer forms a portion of the first upper component.

Clause 77. The method according to any one of Clauses 51 to 76, wherein the first upper component is completely formed before the second upper component is fused to the first upper component.

Clause 78. The method according to any one of Clauses 51 to 77, wherein the first filament of the first layer is extruded to define a perimeter and to produce filament segments of the first filament extending between portions of the perimeter.

Clause 79. The method according to any one of Clauses 51 to 78, wherein the first plural, non-intersecting, spaced apart path segments are extruded to extend in a serpentine configuration including at least two peaks and at least two valleys.

Clause 80. The method according to any one of Clauses 51 to 78, wherein the first plural, non-intersecting, spaced apart path segments are extruded to extend in a substantially anterior-posterior direction of the upper and include a serpentine configuration having at least two peaks and at least two valleys.

Clause 81. The method according to Clause 79 or 80, wherein the first plural, non-intersecting, spaced apart path segments are extruded to form the serpentine configuration at least at a medial midfoot portion of the upper component.

Clause 82. The method according to Clause 79 or 80, wherein the first plural, non-intersecting, spaced apart path segments are extruded to form the serpentine configuration at least at a lateral midfoot portion of the upper component.

Clause 83. The method according to any one of Clauses 51 to 82, wherein the first filament is extruded to have a first thickness at a first region of the upper, wherein the first filament is extruded to have a second thickness at a second region of the upper, and wherein the first thickness differs from the second thickness.

Clause 84. The method according to any one of Clauses 51 to 82, wherein the first filament is extruded to have a first diameter at a first region of the upper, wherein the first filament is extruded to have a second diameter at a second region of the upper, and wherein the first diameter differs from the second diameter.

Clause 85. The method according to any one of Clauses 51 to 84, wherein the first filament is extruded to form a perimeter of the upper.

Clause 86. The method according to any one of Clauses 51 to 85, wherein the extruded filament in each layer of the first upper component is made from the same material.

Clause 87. The method according to any one of Clauses 51 to 86, wherein the extruded filament in each layer of the first upper component comprises a thermoplastic polyurethane material or other thermoplastic material.

Clause 88. The method according to any one of Clauses 51 to 87, wherein the extruded filament in each layer of the first upper component comprises a material that does not substantially absorb water.

Clause 89. The method according to any one of Clauses 51 to 88, wherein the extruded filament in each layer of the first upper component comprises a hydrophobic material.

Clause 90. The method according to any one of Clauses 51 to 89, wherein at least a portion of the first upper component exhibits a moiré effect.

Clause 91. The method according to any one of Clauses 51 to 90, wherein the second upper component forms an instep portion or a vamp portion of the upper.

Clause 92. The method according to any one of Clauses 51 to 91, wherein the second upper component defines a foot-receiving opening or a collar of the upper.

Clause 93. The method according to any one of Clauses 51 to 92, wherein the second upper component forms a rear heel engaging portion of the upper.

Clause 94. The method according to any one of Clauses 51 to 93, wherein the second upper component overlaps with less than 30% of a total surface area of the first upper component.

Clause 95. The method according to any one of Clauses 51 to 94, wherein the fabric element of the second upper component includes at least one yarn formed from the fusible material.

Clause 96. The method according to any one of Clauses 51 to 94, wherein the fabric element of the second upper component includes a first yarn formed from the fusible material intertwined with a second yarn formed from a non-fusible material.

Clause 97. The method according to any one of Clauses 51 to 94, wherein the fabric element of the second upper component includes a first yarn formed from a non-fusible material at least partially coated with the fusible material.

Clause 98. The method according to Clause 96 or 97, wherein the non-fusible material comprises a polyester material.

Clause 99. The method according to any one of Clauses 51 to 98, wherein the fusible material comprises a thermoplastic polyurethane material or other thermoplastic material.

Clause 100. A method of forming an upper for an article of footwear, comprising:
  extruding a first material to form a first layer comprising a first extruded filament including first plural, non-intersecting, spaced apart path segments, wherein the first extruded filament has a width dimension of less than 1 mm wide, and wherein the first layer forms at least a portion of a first upper component;
  covering a portion of the first layer with a release liner;
  extruding a second material to form a second layer comprising a second extruded filament including second plural, non-intersecting, spaced apart path segments, wherein the second extruded filament has a width dimension of less than 1 mm wide, wherein the step of extruding the second material includes: (a) applying a first portion of the second layer to the release liner such that the release liner extends between a first portion of the first layer and the first portion of the second layer and (b) fusing a second portion of the second layer to a second portion of the first layer at locations where the second layer contacts the first layer, and wherein the second layer forms a portion of the first upper component; and
  removing the release liner from between the first portion of the first layer and the first portion of the second layer.

Clause 101. The method according to Clause 100, wherein the step of extruding the first material includes extruding the first material onto a pre-existing layer including filament material.

Clause 102. The method according to Clause 100 or 101, wherein the first filament of the first layer is extruded to define a perimeter and to produce filament segments of the first filament extending between portions of the perimeter.

Clause 103. The method according to any one of Clauses 100 to 102, wherein the first plural, non-intersecting, spaced apart path segments are extruded to extend in a serpentine configuration including at least two peaks and at least two valleys.

Clause 104. The method according to any one of Clauses 100 to 102, wherein the first plural, non-intersecting, spaced apart path segments are extruded to extend in a substantially anterior-posterior direction of the upper and include a serpentine configuration having at least two peaks and at least two valleys.

Clause 105. The method according to Clause 103 or 104, wherein the first plural, non-intersecting, spaced apart path segments are extruded to form the serpentine configuration at least at a medial midfoot portion of the upper component.

Clause 106. The method according to Clause 103 or 104, wherein the first plural, non-intersecting, spaced apart path segments are extruded to form the serpentine configuration at least at a lateral midfoot portion of the upper component.

Clause 107. The method according to any one of Clauses 100 to 106, wherein the first filament is extruded to have a first thickness at a first region of the upper, wherein the first filament is extruded to have a second thickness at a second region of the upper, and wherein the first thickness differs from the second thickness.

Clause 108. The method according to any one of Clauses 100 to 106, wherein the first filament is extruded to have a first diameter at a first region of the upper, wherein the first filament is extruded to have a second diameter at a second region of the upper, and wherein the first diameter differs from the second diameter.

Clause 109. The method according to any one of Clauses 100 to 108, wherein the first filament is extruded to form a perimeter of the upper.

Clause 110. The method according to any one of Clauses 100 to 109, wherein the first extruded filament and the second extruded filament are made from the same material.

Clause 111. The method according to any one of Clauses 100 to 109, wherein the first extruded filament and the second extruded filament are made from different materials.

Clause 112. The method according to any one of Clauses 100 to 111, wherein the first extruded filament and the second extruded filament each comprises a thermoplastic polyurethane material or other thermoplastic material.

Clause 113. The method according to any one of Clauses 100 to 112, wherein the first extruded filament and the second extruded filament each comprises a material that does not substantially absorb water.

Clause 114. The method according to any one of Clauses 100 to 113, wherein the first extruded filament and the second extruded filament each comprises a hydrophobic material.

Clause 115. The method according to any one of Clauses 100 to 114, wherein at least a portion of the first upper component exhibits a moiré effect.

Clause 116. The method according to any one of Clauses 100 to 115, wherein the portion of the first layer covered with the release liner step extends inwardly from a peripheral edge of the first layer.

Clause 117. A method of making an article of footwear, comprising: forming an upper according to any one of Clauses 51 to 116; and engaging the upper with a sole structure.

Clause 118. An upper formed by the method of any one of Clauses 51 to 116.

What is claimed is:

1. An upper for an article of footwear, comprising:
   a first upper component that includes:
      a first filament layer formed from a first material as a first continuous path of a first extruded filament, the first filament layer including first plural, non-intersecting, spaced apart path segments extending in a substantially medio-lateral direction of the upper, wherein the first extruded filament has a width dimension of less than 3 mm wide, and wherein the first continuous path of the first extruded filament forming the first filament layer extends continuously to form (i) a lateral rear heel portion of the first filament layer, (ii) a lateral midfoot portion of the first filament layer, (iii) a forefoot portion of the first filament layer, (iv) a medial midfoot portion of the first filament layer, and (v) a medial rear heel portion of the first filament layer, and
      a second filament layer formed from a second material as a second continuous path of a second extruded filament, the second filament layer including second plural, non-intersecting, spaced apart path segments extending in a substantially anterior-posterior direction of the upper, wherein the second extruded filament has a width dimension of less than 3 mm wide, wherein the second continuous path of the second extruded filament forming the second filament layer extends continuously to form (i) a lateral rear heel portion of the second filament layer, (ii) a lateral midfoot portion of the second filament layer, (iii) a forefoot portion of the second filament layer, (iv) a medial midfoot portion of the second filament layer, and (v) a medial rear heel portion of the second filament layer; and
   a second upper component including a fabric element formed at least in part of a fusible material,
   wherein the fusible material of the second upper component is fused to the first material of the first upper component.

2. The upper according to claim 1, wherein the second plural, non-intersecting, spaced apart path segments include at least 5 second non-intersecting path segments, and wherein each non-intersecting path segment of the at least 5 second non-intersecting path segments is spaced apart from each directly adjacent second non-intersecting path segments.

3. The upper according to claim 1, wherein the second upper component has a first major surface and a second major surface opposite the first major surface, wherein the fusible material located at the first major surface of the second upper component is fused to the first material forming the first filament layer, and wherein the fusible material located at the second major surface of the second upper component is fused to the second material forming the second filament layer.

4. The upper according to claim 3, wherein a plurality of the second plural, non-intersecting, spaced apart path segments of the second filament layer extend parallel to and partially overlap with a plurality of the first plural, non-intersecting, spaced apart path segments of the first filament layer.

5. The upper according to claim 1, wherein a plurality of the second plural, non-intersecting, spaced apart path segments of the second filament layer intersect and form an angle with a plurality of the first plural, non-intersecting, spaced apart path segments of the first filament layer.

6. The upper according to claim 5, wherein the plurality of the second plural, non-intersecting, spaced apart path segments of the second filament layer and the plurality of the first plural, non-intersecting, spaced apart path segments of the first filament layer cooperate to form one or more diamond shapes, and wherein a long axis of a plurality of the diamond shapes extend in the substantially anterior-posterior direction of the upper.

7. The upper according to claim 1, wherein the first upper component further includes a third filament layer formed from a third material as a third continuous path of a third extruded filament, the third filament layer including third plural, non-intersecting, spaced apart path segments, wherein the third extruded filament has a width dimension of less than 3 mm wide, wherein the third continuous path of the third extruded filament forming the third filament layer extends continuously to form (i) a lateral rear heel portion of the third filament layer, (ii) a lateral midfoot portion of the third filament layer, (iii) a forefoot portion of the third filament layer, (iv) a medial midfoot portion of the third filament layer, and (v) a medial rear heel portion of the third filament layer, and wherein the third filament layer is fused to either or both of the first filament layer and the second filament layer at locations where the third filament layer contacts either or both of the first filament layer and the second filament layer.

8. The upper according to claim 1, wherein the second extruded filament partially overlays the first extruded filament, and wherein the second filament layer is fused to the first filament layer at locations where the second filament layer contacts the first filament layer.

9. The upper according to claim 1, wherein the second plural, non-intersecting, spaced apart path segments extend in a serpentine configuration including at least two peaks and at least two valleys.

10. The upper according to claim 9, wherein the serpentine configuration is formed at least at a medial midfoot portion of the first upper component, or wherein the serpentine configuration is formed at least at a lateral midfoot portion of the first upper component.

11. The upper according to claim 1, wherein at least a portion of the first upper component exhibits a moiré effect.

12. An upper for an article of footwear, comprising:
a first upper component that includes a first filament layer and a second filament layer, wherein:
the first filament layer is formed from a first material as a first continuous path of a first extruded filament including first plural, non-intersecting, spaced apart path segments extending in a substantially mediolateral direction of the upper, and wherein the first continuous path of the first extruded filament forming the first filament layer extends continuously from a rear heel portion to a forefoot portion, and
the second filament layer is formed from a second material as a second continuous path of a second extruded filament including second plural, non-intersecting, spaced apart path segments extending in a substantially anterior-posterior direction of the upper, wherein the second continuous path of the second extruded filament forming the second filament layer extends continuously from the rear heel portion to the forefoot portion wherein the second extruded filament partially overlays the first extruded filament, and wherein the second filament layer is fused to the first filament layer at locations where the second filament layer contacts the first filament layer; and
a second upper component including a fabric element formed at least in part of a fusible material, wherein the fusible material of the second upper component is fused to the first material of the first upper component.

13. The upper according to claim 12, wherein the first extruded filament has a width dimension of less than 3 mm wide, and the second extruded filament has a width dimension of less than 2 mm wide.

14. The upper according to claim 12, wherein:
the first continuous path of the first extruded filament forming the first filament layer extends continuously to form (i) a lateral rear heel portion of the first filament layer, (ii) a lateral midfoot portion of the first filament layer, (iii) a forefoot portion of the first filament layer, (iv) a medial midfoot portion of the first filament layer, and (v) a medial rear heel portion of the first filament layer, and
the second continuous path of the second extruded filament forming the second filament layer extends continuously to form (i) a lateral rear heel portion of the second filament layer, (ii) a lateral midfoot portion of the second filament layer, (iii) a forefoot portion of the second filament layer, (iv) a medial midfoot portion of the second filament layer, and (v) a medial rear heel portion of the second filament layer.

15. The upper according to claim 12 wherein the first plural, non-intersecting, spaced apart path segments include at least 5 first non-intersecting path segments, and wherein each non-intersecting path segment of the at least 5 first non-intersecting path segments is spaced apart from each directly adjacent first non-intersecting path segments.

16. The upper according to claim 12, wherein:
(a) the second upper component forms an instep portion or a vamp portion of the upper;
(b) the second upper component defines a foot-receiving opening or a collar of the upper;
(c) the second upper component forms a rear heel engaging portion of the upper;
(d) the first upper component is engaged with an exterior surface of the second upper component; and/or
(e) the second upper component overlaps with less than 30% of a total surface area of the first upper component.

17. The upper according to claim 1, wherein:
the fabric element of the second upper component includes a first yarn formed from the fusible material intertwined with a second yarn formed from a non-fusible material; or
the fabric element of the second upper component includes a first yarn formed from a non-fusible material at least partially coated with the fusible material.

18. The upper according to claim 1, wherein the fusible material of the second upper component comprises a thermoplastic polyurethane located on both an inner side and an outer side of the second upper component.

19. An upper for an article of footwear, comprising:
a first upper component; and
a second upper component including a fabric element formed at least in part of a fusible material, wherein the fusible material of the second upper component is fused to the first upper component,
wherein the first upper component includes a first filament layer and a second filament layer,
wherein the first filament layer is formed from a first material as a first continuous path of a first extruded filament including first plural, non-intersecting, spaced apart path segments extending in a substantially mediolateral direction of the upper, and wherein the first continuous path of the first extruded filament forming the first filament layer extends continuously to form a plurality of portions extending from a rear heel portion to a forefoot portion, and
wherein the second filament layer is formed from a second material as a second continuous path of a second extruded filament including second plural, non-intersecting, spaced apart path segments extending in a substantially anterior-posterior direction of the upper, wherein the second continuous path of the second extruded filament forming the second filament layer extends continuously to form a plurality of portions extending from the rear heel portion to the forefoot portion.

20. The upper according to claim 19, wherein the second upper component has a first major surface and a second major surface opposite the first major surface, wherein the fusible material located at the first major surface of the second upper component is fused to the first material forming the first filament layer, wherein the fusible material located at the second major surface of the second upper component is fused to the second material forming the second filament layer, and wherein a plurality of the second plural, non-intersecting, spaced apart path segments of the second filament layer extend parallel to and partially overlap with a plurality of the first plural, non-intersecting, spaced apart path segments of the first filament layer.

* * * * *